United States Patent
Hwang et al.

(10) Patent No.: US 11,937,255 B2
(45) Date of Patent: Mar. 19, 2024

(54) METHOD FOR TRANSMITTING AND RECEIVING SIGNAL IN WIRELESS COMMUNICATION SYSTEM, AND APPARATUS THEREFOR

(71) Applicant: LG ELECTRONICS INC., Seoul (KR)

(72) Inventors: Seunggye Hwang, Seoul (KR); Changhwan Park, Seoul (KR); Seokmin Shin, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 439 days.

(21) Appl. No.: 17/286,115

(22) PCT Filed: Nov. 4, 2019

(86) PCT No.: PCT/KR2019/014831
§ 371 (c)(1),
(2) Date: Apr. 16, 2021

(87) PCT Pub. No.: WO2020/091557
PCT Pub. Date: May 7, 2020

(65) Prior Publication Data
US 2021/0385848 A1    Dec. 9, 2021

Related U.S. Application Data

(60) Provisional application No. 62/755,325, filed on Nov. 2, 2018.

(51) Int. Cl.
*H04W 72/12* (2023.01)
*H04L 5/00* (2006.01)
*H04W 72/23* (2023.01)

(52) U.S. Cl.
CPC ........... *H04W 72/23* (2023.01); *H04L 5/0053* (2013.01)

(58) Field of Classification Search
CPC ............................ H04W 72/23; H04L 5/0053
(Continued)

(56) References Cited

U.S. PATENT DOCUMENTS

2018/0092002 A1* 3/2018 Manolakos ........... H04W 72/04
2018/0249482 A1* 8/2018 Garcia .................. H04W 72/51

FOREIGN PATENT DOCUMENTS

WO     2017057989         4/2017
WO     2017222257        12/2017
WO     WO-2020029280 A1 * 2/2020

OTHER PUBLICATIONS

PCT International Application No. PCT/KR2019/014831, International Search Report dated Feb. 7, 2020, 13 pages.
(Continued)

*Primary Examiner* — Faisal Choudhury
(74) *Attorney, Agent, or Firm* — LEE, HONG, DEGERMAN, KANG & WAIMEY

(57) ABSTRACT

The present invention relates to a method for receiving a downlink signal in a wireless communication system, and apparatus therefor. More particularly, the present invention relates to a method and an apparatus therefor, the method comprising the steps of: receiving configuration information for multiple transport block scheduling; receiving downlink control information (DCI) on the basis of the received configuration information; and receiving at least one transport block on the basis of the received DCI, wherein on the basis of the DCI being received through a specific search space candidate in a search space for multiple transport block scheduling, a start position of the transport block is determined on the basis of an end position and a scheduling delay of the specific search space candidate, and the specific (Continued)

search space candidate and the scheduling delay are equally applied to the determination of the start position of the next transport block.

9 Claims, 36 Drawing Sheets

(58) Field of Classification Search
USPC .......................................................... 370/329
See application file for complete search history.

(56) References Cited

OTHER PUBLICATIONS

Mediatek Inc., "Scheduling of multiple DL/UL transport blocks in NB-IoT," R1-1812716, 3GPP TSG RAN WG1 Meeting #95, Nov. 2018, 5 pages.
Ericsson, "Updated Feature lead summary Scheduling of multiple DL UL transport blocks in LTE MTC," Tdoc R1-1811680, 3GPP TSG-RAN WG1 Meeting #94bis, Oct. 2018, 13 pages.
ZTE, "Summary on Multiple TB scheduling enhancement for NB-IoT," R1-1811660, 3GPP TSG RAN WG1 Meeting #94bis, Oct. 2018, 10 pages.

* cited by examiner (a) In-band system (b) Guard-band system (c) Stand-alone system (a) Preamble symbol group (b) Preamble transmission (a) UL transmission at UE    (b) DL reception at UE (a) UL reception at BS
(b) DL transmission at BS (a) UL data transmission and reception (b) DL data transmission and reception (a) Skipping DCI method (b) One-to N mapping DCI method (c) Combination of skipping DCI & One-to N mapping DCI methods

METHOD FOR TRANSMITTING AND RECEIVING SIGNAL IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2019/014831, filed on Nov. 4, 2019, which claims the benefit of U.S. Provisional Application No. 62/755,325 filed on Nov. 2, 2018, the contents of which is incorporated by reference herein in its entirety.

TECHNICAL FIELD

The present disclosure relates to a wireless communication system and, more particularly, to a method of transmitting and receiving signals in a wireless communication system supporting multi-transport block scheduling and apparatus therefor.

BACKGROUND ART

Mobile communication systems were developed to provide voice services while ensuring mobility of users. However, mobile communication systems have been extended to data services as well as voice services, and more advanced communication systems are needed as the explosive increase in traffic now leads to resource shortages and users demand higher speed services.

Requirements of the next generation mobile communication systems are to support accommodation of explosive data traffics, dramatic increases in throughputs per user, accommodation of significantly increased number of connected devices, very low end-to-end latency, and high energy efficiency. To this end, various technologies such as Dual Connectivity, Massive Multiple Input Multiple Output (Massive MIMO), In-band Full Duplex, Non-Orthogonal Multiple Access (NOMA), support of Super wideband, and Device Networking are under research.

DISCLOSURE

Technical Problem

One object of the present disclosure is to provide a method and apparatus for efficiently transmitting and receiving signals based on multi-transport block scheduling.

Another object of the present disclosure is to provide a method and apparatus for effectively resolving a collision between a search space for multi-transport block scheduling and signals/channels for other purposes.

A further object of the present disclosure is to provide a method and apparatus for efficiently determining resource allocation for a transport block related to a search space for multi-transport block scheduling.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In one aspect of the present disclosure, a method of receiving a downlink signal by a user equipment (UE) in a wireless communication system is provided. The method may include: receiving downlink control information (DCI) in a search space for multi-transport block scheduling; and receiving a transport block based on the received DCI. In this case, a location of the search space for the multi-transport block scheduling may be determined based on a location of another search space related to the transport block.

In another aspect of the present disclosure, a UE configured to receive a signal in a wireless communication system is provided. The UE may include: an RF transceiver; and a processor operatively connected to the RF transceiver. The processor may be configured to control the RF transceiver to: receive DCI in a search space for multi-transport block scheduling; and receive a transport block based on the received DCI. In this case, a location of the search space for the multi-transport block scheduling may be determined based on a location of another search space related to the transport block.

Preferably, the another search space may include a search space for single-transport block scheduling.

More preferably, an ending position of the search space for the multi-transport block scheduling may be determined based on a starting position of the search space for the single-transport block scheduling.

More preferably, the ending position of the search space for the multi-transport block scheduling may be determined to be contiguous with the starting position of the search space for the single-transport block scheduling.

More preferably, the ending position of the search space for the multi-transport block scheduling may be determined to have a gap with the starting position of the search space for the single-transport block scheduling.

More preferably, a size of the gap may be determined based on higher layer signaling.

Preferably, a relative position between the search space for the multi-transport block scheduling and the transport block may be configured to be fixed.

More preferably, information on the relative position between the search space for the multi-transport block scheduling and the transport block may be obtained from the DCI.

More preferably, the UE may receive configuration information for the multi-transport block scheduling, and the information on the relative position between the search space for the multi-transport block scheduling and the transport block may be obtained from the configuration information for the multi-transport block scheduling.

More preferably, the relative position between the search space for the multi-transport block scheduling and the transport block may have a predetermined value.

More preferably, the relative position between the search space for the multi-transport block scheduling and the transport block may represent a relative position between a starting position of the search space and a starting position of the transport block.

More preferably, the relative position between the search space for the multi-transport block scheduling and the transport block may represent a relative position between an ending position of the search space and a starting position of the transport block.

Advantageous Effects

According to the present disclosure, a signal may be efficiently transmitted and received based on multi-transport block scheduling.

Additionally/alternatively, a collision between a search space for multi-transport block scheduling and signals/channels for other purposes may be effectively solved.

Additionally/alternatively, resource allocation for a transport block related to a search space for multi-transport block scheduling may be efficiently determined.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the present disclosure, illustrate embodiments of the invention and together with the description serve to explain the principle of the present disclosure.

BEST MODE

Figure 1:
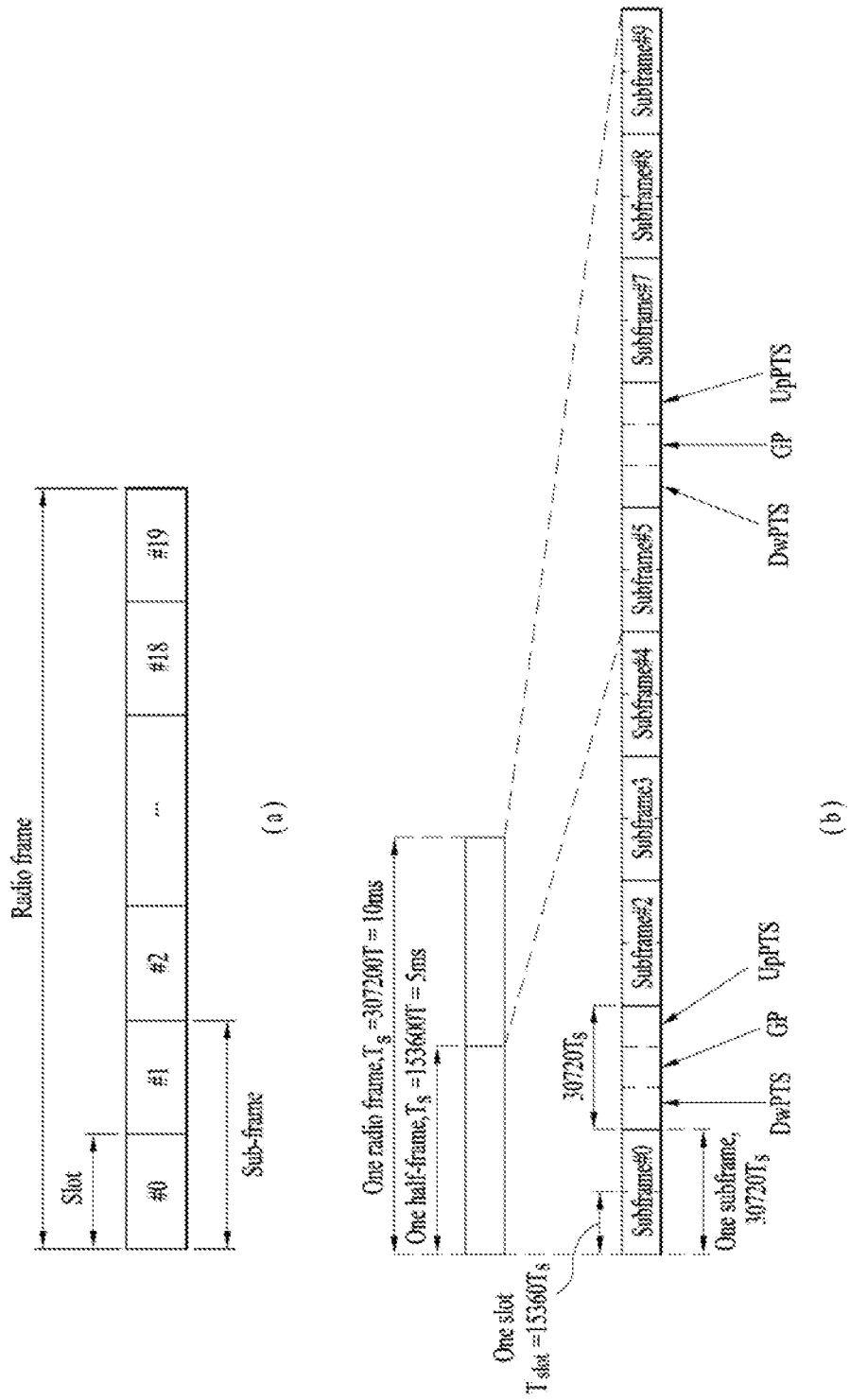
FIG. 1 illustrates a radio frame structure in Long Term Evolution (LTE)

In the following, DownLink (DL) refers to communication from a Base Station (BS) to a User Equipment (UE), and UpLink (UL) refers to communication from the UE to the BS. In the case of DL, a transmitter may be a part of the BS, and a receiver may be a part of the UE. In the case of UL, a transmitter may be a part of the UE, and a receiver may be a part of the BS.

The technology described herein is applicable to various wireless access systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented as radio technology such as universal terrestrial radio access (UTRA) or CDMA2000. The TDMA may be implemented as radio technology such as global system for mobile communications (GSM), general packet radio service (GPRS), or enhanced data rates for GSM evolution (EDGE). The OFDMA may be implemented as radio technology such as the Institute of Electrical and Electronics Engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). The 3rd generation partnership project (3GPP) long term evolution (LTE) is a part of an evolved UMTS (E-UMTS) using the E-UTRA. LTE-advance (LTE-A) or LTE-A pro is an evolved version of the 3GPP LTE. 3GPP new radio or new radio access technology (3GPP NR) is an evolved version of the 3GPP LTE, LTE-A, or LTE-A pro.

Although the present disclosure is described based on 3GPP communication systems (e.g., LTE-A, NR, etc.) for clarity of description, the spirit of the present disclosure is not limited thereto. The LTE refers to the technology beyond 3GPP technical specification (TS) 36.xxx Release 8. In particular, the LTE technology beyond 3GPP TS 36.xxx Release 10 is referred to as the LTE-A, and the LTE technology beyond 3GPP TS 36.xxx Release 13 is referred to as the LTE-A pro. The 3GPP NR refers to the technology beyond 3GPP TS 38.xxx Release 15. The LTE/NR may be called '3GPP system'. Herein, "xxx" refers to a standard specification number. The LTE/NR may be commonly referred to as '3GPP system'. Details of the background, terminology, abbreviations, etc. used herein may be found in documents published before the present disclosure. For example, the following documents may be referenced.

3GPP LTE 36.211: Physical channels and modulation 36.212: Multiplexing and channel coding 36.213: Physical layer procedures 36.300: Overall description 36.304: User Equipment (UE) procedures in idle mode 36.331: Radio Resource Control (RRC)

3GPP NR 38.211: Physical channels and modulation
38.212: Multiplexing and channel coding
38.213: Physical layer procedures for control
38.214: Physical layer procedures for data
38.300: NR and NG-RAN Overall Description
38.304: User Equipment (UE) procedures in Idle mode and RRC Inactive state
36.331: Radio Resource Control (RRC) protocol specification A. Frame Structure Hereinafter, an LTE frame structure will be described.

In the LTE standards, the sizes of various fields in the time domain are expressed in a time unit (Ts=1/(15000×2048) seconds) unless specified otherwise. DL and UL transmissions are organized in radio frames, each of which has a duration of 10 ms (Tf=307200×Ts=10 ms). Two radio frame structures are supported.

Type 1 is applicable to frequency division duplex (FDD).
Type 2 is applicable to time division duplex (TDD).

(1) Frame Structure Type 1

Frame structure type 1 is applicable to both full-duplex FDD and half-duplex FDD. Each radio frame has a duration of $T_f$=307200·$T_s$=10 ms and is composed of 20 slots, each of which has a length of $T_{slot}$=15360·$T_s$=0.5 ms. The 20 slots are indexed from 0 to 19. A subframe is composed of two consecutive slots. That is, subframe i is composed of slot 2i and slot (2i+1). In the FDD, 10 subframes may be used for DL transmission, and 10 subframes may be available for UL transmissions at every interval of 10 ms. DL and UL transmissions are separated in the frequency domain. However, the UE may not perform transmission and reception simultaneously in the half-duplex FDD system.

FIG. 1(a) illustrates a radio frame structure of frame structure type 1.

Referring to FIG. 1(a), the radio frame includes 10 subframes. Each subframe includes two slots in the time domain. The time to transmit one subframe is defined as a transmission time interval (TTI). For example, one subframe may have a length of 1 ms, and one slot may have a length of 0.5 ms. One slot may include a plurality of orthogonal frequency division multiplexing (OFDM) symbols in the time domain. Since the 3GPP LTE system uses OFDMA in DL, the OFDM symbol may represent one symbol period. The OFDM symbol may be referred to as an SC-FDMA symbol or a symbol period. A resource block (RB) is a resource allocation unit and includes a plurality of consecutive subcarriers in one slot. This radio frame structure is merely exemplary. Therefore, the number of subframes in a radio frame, the number of slots in a subframe, or the number of OFDM symbols in a slot may be changed in various ways.

(2) Frame Structure Type 2

Frame structure type 2 is applicable to TDD. Each radio frame has a length of $T_f$=307200×$T_s$=10 ms and includes two half-frames, each of which has a length of 15360·$T_s$=0.5 ms. Each half-frame includes five subframes, each of which has a length of 30720·$T_s$=1 ms. Supported UL-DL configurations are defined in the standards. In each subframe of a radio frame, "D" denotes a subframe reserved for DL transmission, "U" denotes a subframe reserved for UL transmission, and "S" denotes a special subframe including the following three fields: downlink pilot time slot (DwPTS), guard period (GP), and uplink pilot time slot (UpPTS). The DwPTS may be referred to as a DL period, and the UpPTS may be referred to as a UL period. The lengths of the DwPTS and UpPTS depend on the total length of the DwPTS, GP, and UpPTS, which is equal to 30720=·1 ms. Subframe i is composed of two slots, slot 2i and slot (2i+1), each of which has a length of $T_{slot}$=15360·$T_s$=0.5 ms.

FIG. 1(b) illustrates a radio frame structure of frame structure type 2.

FIG. 1(b) shows that a UL-DL configuration supports DL-to-UL switch-point periodicities of 5 ms and 10 ms. In the case of the 5-ms DL-to-UL switch-point periodicity, the special subframe exists across two half-frames. In the case of the 10-ms DL-to-UL switch-point periodicity, the special subframe exists only in the first half-frame. The DwPTS and subframe 0 and 5 are always reserved for DL transmission, and the UpPTS and a subframe next to the special subframe are always reserved for UL transmission.

Next, a description will be given of a frame structure of NR.

Figure 2:
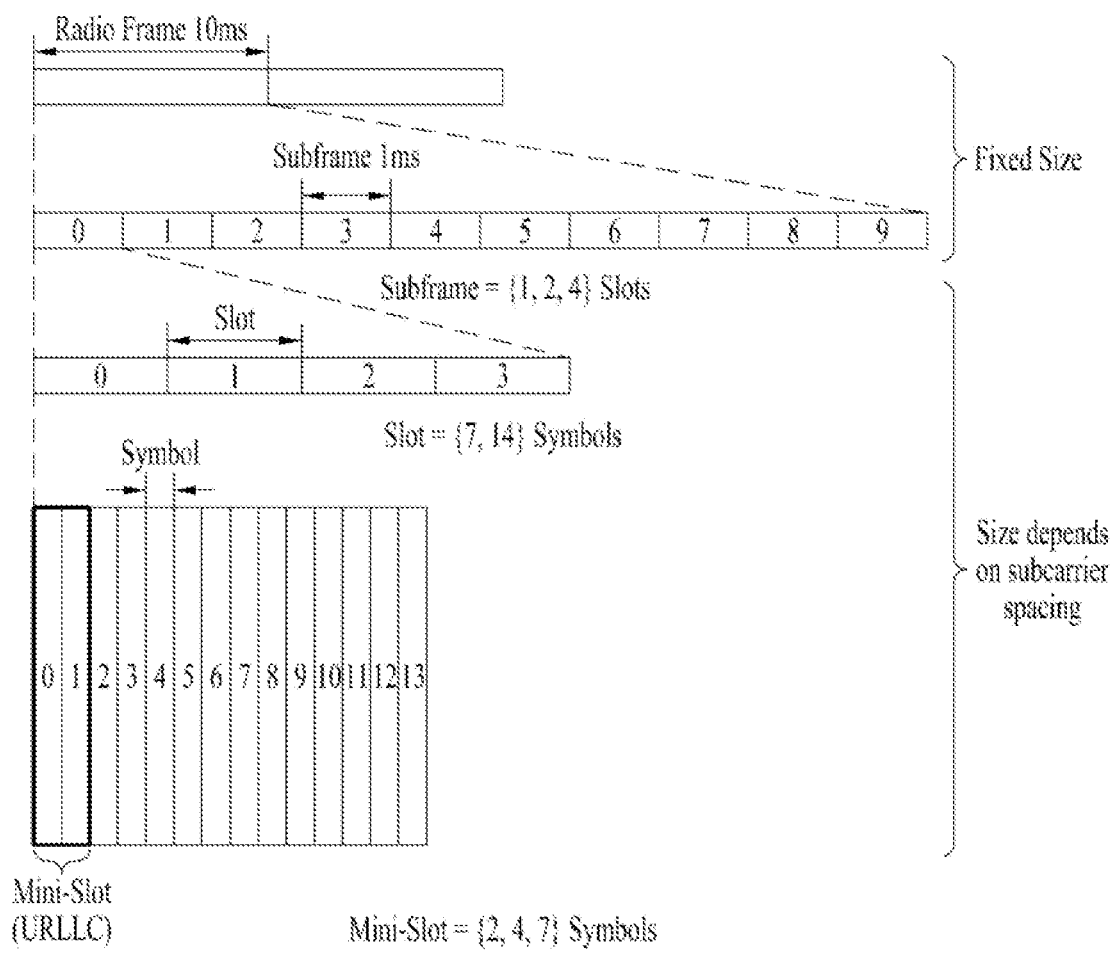
FIG. 2 illustrates an example of a frame structure in New Radio (NR).

FIG. 2 illustrates an example of a frame structure in NR.

The NR system may support various numerologies. The numerology may be defined by subcarrier spacing and cyclic prefix (CP) overhead. Multiple subcarrier spacing may be derived by scaling basic subcarrier spacing by an integer N (or μ). In addition, even though very low subcarrier spacing is assumed not to be used at a very high subcarrier frequency, a numerology to be used may be selected independently from frequency bands. In the NR system, various frame structures may be supported based on multiple numerologies.

Hereinafter, an OFDM numerology and a frame structure, which may be considered in the NR system, will be described. Table 1 shows multiple OFDM numerologies supported in the NR system.

TABLE 1

| μ | Δf = $2^μ$ · 15[kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

Regarding a frame structure in the NR system, the sizes of various fields in the time domain are expressed in multiples of a time unit, $T_s$=1/($Δf_{max}$·$N_f$). In this case, $Δf_{max}$=480·$10^3$ and $N_f$=4096. Downlink and uplink transmissions are configured in a radio frame having a duration of $T_f$=($Δf_{max}$·$N_f$/100)·$T_s$=10 ms. The radio frame is composed of 10 subframes, each having a duration of $T_{sf}$=($Δf_{max}$·$N_f$/1000)·$T_s$=1 ms. In this case, there may be a set of uplink frames and a set of downlink frames. Transmission of an uplink frame with frame number i from a UE needs to be performed earlier by $T_{TA}$=$N_{TA}T_s$ than the start of a corresponding downlink frame of the UE. Regarding the numerology μ, slots are numbered in a subframe in the following ascending order: $n_s^μ$∈{0, . . . , $N_{subframe}^{slots,μ}$−1} and numbered in a frame in the following ascending order: $n_{s,f}^μ$∈{0, . . . , $N_{frame}^{slots,μ}$−1}. One slot is composed of $N_{symb}^μ$ consecutive OFDM symbols, and $N_{symb}^μ$ is determined by the current numerology and slot configuration. The starts of $n_s^μ$ slots in a subframe are temporally aligned with those of $n_s^μ N_{symb}^μ$ OFDM symbols in the same subframe. Some UEs may not perform transmission and reception at the same time, and this means that some OFDM symbols in a downlink slot or an uplink slot are unavailable. Table 2 shows the number of OFDM symbols per slot ($N_{symb}^{slot}$), the number of slots per radio frame ($N_{slot}^{frame,μ}$), and the number of slots per subframe ($N_{slot}^{subframe,μ}$) in the case of a normal CP, and Table 3 shows the number of OFDM symbols per slot, the number of slots per radio frame, and the number of slots per subframe in the case of an extended CP.

TABLE 2

| $\mu$ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| $\mu$ | $N_{symb}^{slot}$ | $N_{slot}^{frame, \mu}$ | $N_{slot}^{subframe, \mu}$ |
|---|---|---|---|
| 2 | 12 | 40 | 4 |

FIG. 1(a) shows an example of $\mu=2$, i.e., 60 kHz subcarrier spacing (SCS). Referring to Table 2, one subframe may include four slots. FIG. 2 shows slots in a subframe (subframe={1, 2, 4}). In this case, the number of slots included in the subframe may be defined as shown in Table 2 above.

In addition, a mini-slot may be composed of 2, 4, or 7 symbols. Alternatively, the number of symbols included in the mini-slot may vary.

B. Physical Resource

Figure 3:
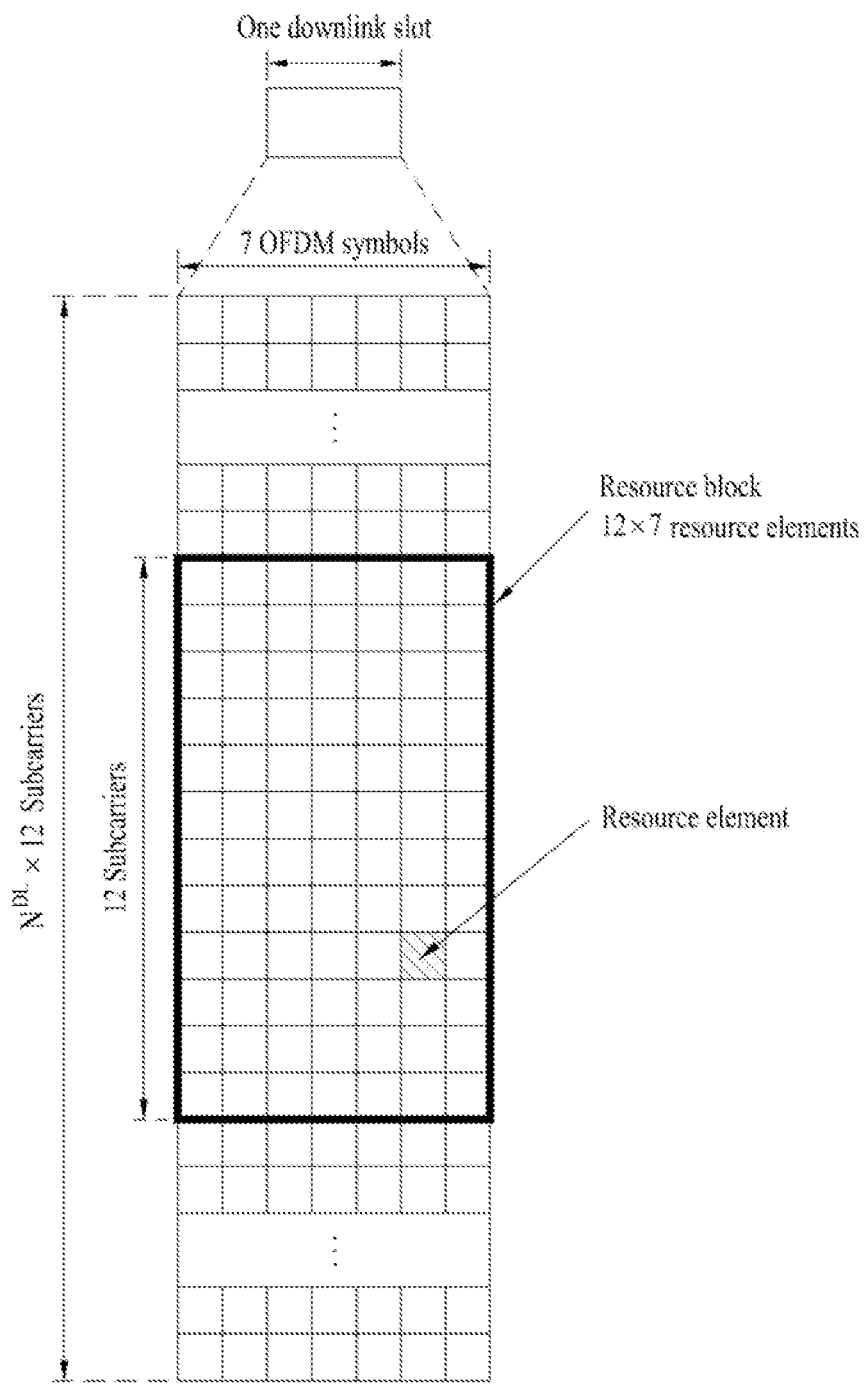
FIG. 3 illustrates a resource grid for one downlink slot.

FIG. 3 illustrates a resource grid for one DL slot.

Referring to FIG. 3, a downlink slot includes a plurality of OFDM symbols in the time domain. One downlink slot includes 7 OFDM symbols in the time domain, and a Resource Block (RB) for example includes 12 subcarriers in the frequency domain. However, the present disclosure is not limited thereto. Each element of the resource grid is referred to as a Resource Element (RE). One RB includes 12×7 REs. The number of RBs in the DL slot depends on a downlink transmission bandwidth. An uplink slot may have the same structure as the downlink slot.

Figure 4:
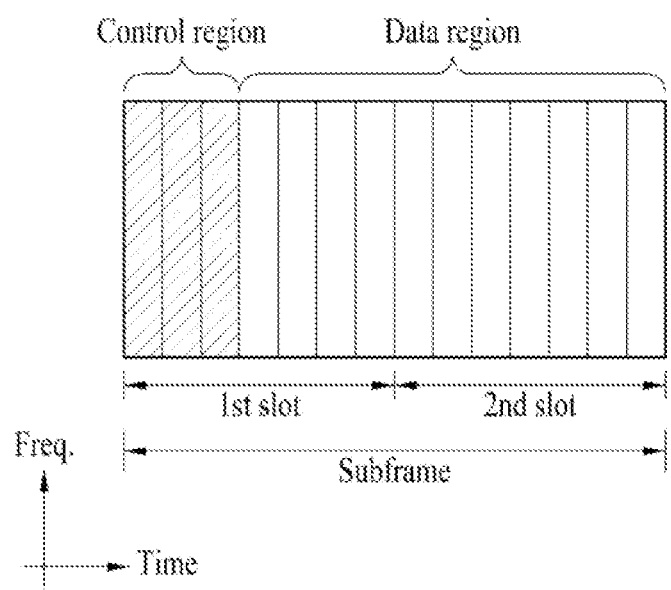
FIG. 4 illustrates the structure of a downlink subframe.

FIG. 4 illustrates the structure of a downlink subframe.

Referring to FIG. 4, up to three OFDM symbols at the start of the first slot in a downlink subframe are used as a control region to which a control channel is allocated. The remaining OFDM symbols are used as a data region to which a physical downlink shared channel (PDSCH) is allocated. Downlink control channels used in the 3GPP LTE system include a physical control format indicator channel (PCFICH), a physical downlink control channel (PDCCH), a physical hybrid ARQ indicator channel (PHICH), etc. The PCFICH is transmitted in the first OFDM symbol in a subframe and carries information for the number of OFDM symbols used for transmitting a control channel. The PHICH carries a hybrid automatic repeat request (HARQ) acknowledgement/negative-acknowledgement or not-acknowledgement (ACK/NACK) signal in response to uplink transmission. Control information transmitted on the PDCCH is referred to as downlink control information (DCI). The DCI contains uplink or downlink scheduling information or an uplink transmission (Tx) power control command for a random UE group. The PDCCH carries information for resource allocation for a downlink shared channel (DL-SCH), information for resource allocation for a uplink shared channel, paging information for a paging channel (PCH), and a DL-SCH voice over Internet protocol (VoIP) corresponding to resource allocation for a higher layer control message such as a random access response transmitted on the PDSCH, a set of Tx power control commands for individual UEs in a random UE group, a Tx power control command, activation of the Tx power control command, etc. Multiple PDCCHs may be transmitted in the control region, and the UE may monitor the multiple PDCCHs. The PDCCH may be transmitted on one control channel element (CCE) or aggregation of multiple consecutive CCEs. The CCE is a logical allocation unit used to provide the PDCCH with a coding rate based on the state of a radio channel. The CCE corresponds to a plurality of resource element groups (REGs). A PDCCH format and the number of available PDCCH bits are determined based on a relationship between the number of CCEs and the coding rate provided by the CCE. The base station determines the PDCCH format depending on DCI to be transmitted to the UE and adds a cyclic redundancy check (CRC) to control information. The CRC is masked with a unique identifier (e.g., radio network temporary identifier (RNTI)) according to the owner or usage of the PDCCH. If the PDCCH is for a specific UE, the CRC may be masked with a unique UE identifier (e.g., cell-RNTI). If the PDCCH is for a paging message, the CRC may be masked with a paging indication identifier (e.g., paging-RNTI (P-RNTI)). If the PDCCH is for system information (more specifically, for a system information block (SIB)), the CRC may be masked with a system information identifier and a system information RNTI (SI-RNTI). Further, the CRC may be masked with a random access-RNTI (RA-RNTI) to indicate a random access response in response to transmission of a random access preamble of the UE.

Figure 5:
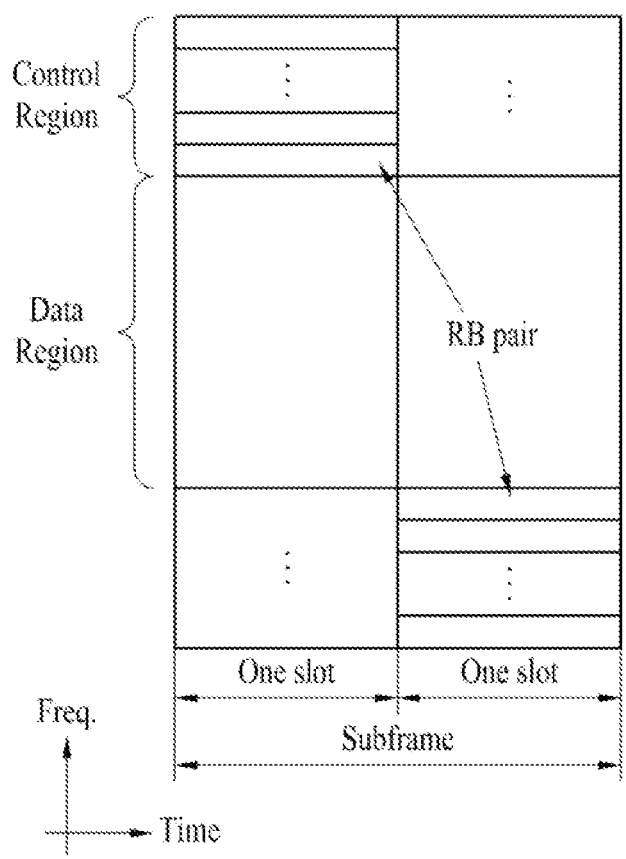
FIG. 5 illustrates the structure of an uplink subframe.

FIG. 5 illustrates the structure of an uplink subframe.

Referring to FIG. 5, an uplink subframe may be divided into a control region and a data region in the frequency domain. A physical uplink control channel (PUCCH) for carrying uplink control information may be allocated to the control region, and a physical uplink shared channel (PUSCH) for carrying user data may be allocated to the data region. The UE may not transmit the PUCCH and the PUSCH at the same time to maintain single-carrier characteristics. The PUCCH for the UE is allocated to an RB pair in a subframe. The RBs included in the RB pair occupy different subcarriers in two slots. In other words, the RB pair allocated for the PUCCH may be frequency-hopped at a slot boundary.

As physical resources in the NR system, an antenna port, a resource grid, a resource element, a resource block, a carrier part, etc. may be considered. Hereinafter, the above physical resources considered in the NR system will be described in detail. First, an antenna port may be defined such that a channel carrying a symbol on the antenna port is inferred from a channel carrying another symbol on the same antenna port. When the large-scale properties of a channel carrying a symbol on an antenna port are inferred from a channel carrying a symbol on another antenna port, the two antenna ports may be said to be in quasi co-located or quasi co-location (QC/QCL) relationship. The large-scale properties may include at least one of delay spread, Doppler spread, frequency shift, average received power, and received timing.

Figure 6:
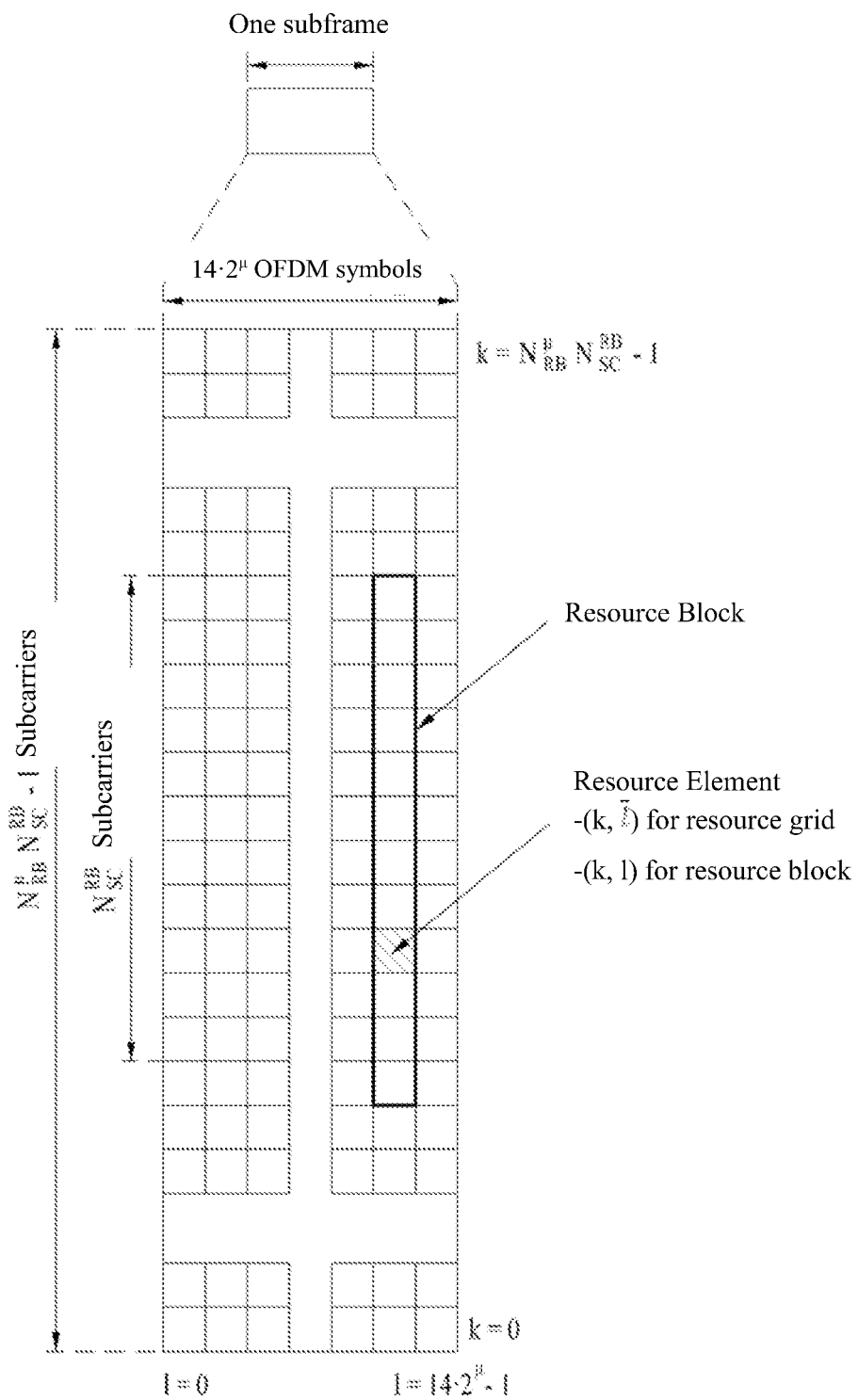
FIG. 6 illustrates an example of a resource grid in NR.

FIG. 6 illustrates an example of a resource grid in NR.

Referring to the resource grid of FIG. 6, there are $N_{RB}^{\mu} N_{sc}^{RB}$ subcarriers in the frequency domain, and there are $14 \cdot 2^{\mu}$ OFDM symbols in one subframe. However, the resource grid is merely exemplary and the present disclosure is not limited thereto. In the NR system, a transmitted signal is described by one or more resource grids, each including $N_{RB}^{\mu} N_{sc}^{RB}$ subcarriers, and $2^{\mu} N_{symb}^{(\mu)}$ OFDM symbols. In this case, $N_{RB}^\mu < N_{RB}^{max,\mu}$. $N_{RB}^{max,\mu}$ denotes the maximum transmission bandwidth and may change not only between numerologies but also between uplink and downlink. As shown in FIG. 6, one resource grid may be configured for each numerology μ and antenna port p. Each element of the resource grid for the numerology μ and antenna port p is referred to as a resource element, and it is uniquely identified by an index pair (k, Ī), where k is an index in the frequency domain (k=0, . . . , $N_{RB}^\mu N_{sc}^{RB} - 1$) and denotes the location of a symbol in the subframe (Ī=0, . . . , $2^\mu N_{symb}^{(\mu)} - 1$). The resource element (k, Ī) for the numerology μ and antenna port p corresponds to a complex value $a_{k,\bar{l}}^{(p,\mu)}$. When there is no risk of confusion or when a specific antenna port or numerology is not specified, the indexes p and μ may be dropped, and as a result, the complex value may be $a_{k,\bar{l}}^{(p)}$ or $a_{k,\bar{l}}$. In addition, a resource block (RB) is defined as $N_{sc}^{RB}=12$ consecutive subcarriers in the frequency domain.

Point A serves as a common reference point for resource block grids and may be obtained as follows.

OffsetToPointA for primary cell (PCell) downlink represents a frequency offset between point A and the lowest subcarrier of the lowest resource block in an SS/PBCH block used by the UE for initial cell selection. OffsetToPointA is expressed in the unit of resource block on the assumption of 15 kHz SCS for frequency range 1 (FR1) and 60 kHz SCS for frequency range 2 (FR2).

AbsoluteFrequencyPointA represents the frequency location of point A expressed as in absolute radio-frequency channel number (ARFCN).

Common resource blocks are numbered from 0 upwards in the frequency domain for SCS configuration μ.

The center of subcarrier 0 of common resource block 0 for the SCS configuration is equivalent to point A.

The relation between a common RB number $n_{CRB}^\mu$ in the frequency domain and a resource element (k,l) for the SCS configuration i is determined as shown in Equation 1.

$$n_{CRB}^\mu = \left\lfloor \frac{k}{N_{sc}^{RB}} \right\rfloor \qquad \text{[Equation 1]}$$

In Equation 1, k is defined relative to point A such that k=0 corresponds to a subcarrier centered on point A.

Physical resource blocks are defined within a bandwidth part (BWP) and numbered from 0 to $N_{BWP,i}^{size}=1$, where i denotes the number of the BWP.

The relationship between a physical resource block $n_{PRB}$ and a common resource block $n_{CRB}$ in BWP i is given by Equation 2.

$$n_{CRB} = n_{PRB} + N_{BWP,i}^{start} \qquad \text{[Equation 2]}$$

In Equation 2, $N_{BWP,i}^{start}$ is a common resource block where the BWP starts relative to common resource block 0.

Figure 7:
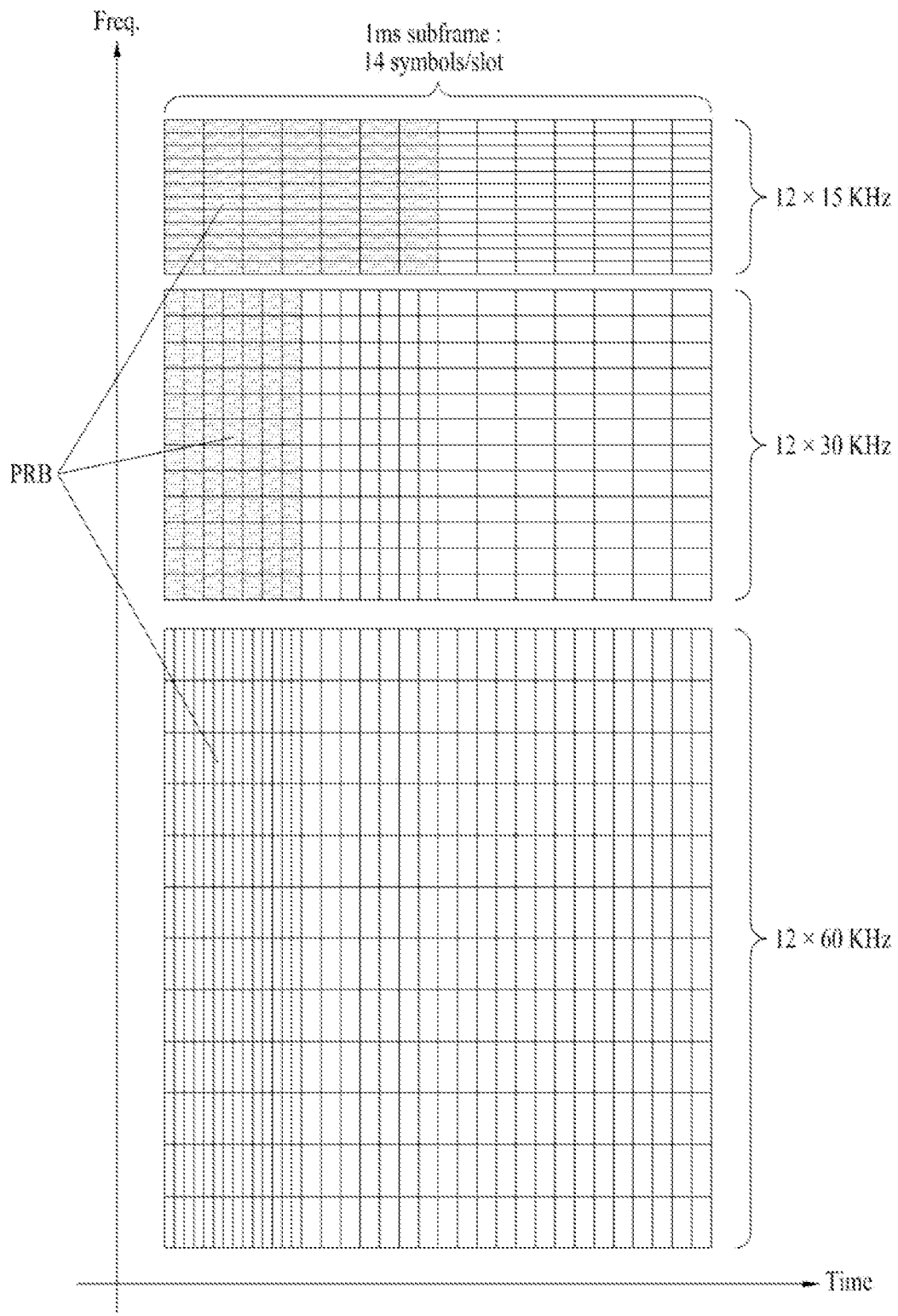
FIG. 7 illustrates an example of a physical resource block in NR

FIG. 7 illustrates an example of a physical resource block in NR

C. MTC (Machine Type Communication)

The Machine Type Communication (MTC) refers to communication technology adopted by $3^{rd}$ Generation Partnership Project (3GPP) to meet Internet of Things (IoT) service requirements. Since the MTC does not require high throughput, it may be used as an application for machine-to-machine (M2M) and Internet of Things (IoT).

The MTC may be implemented to satisfy the following requirements: (i) low cost and low complexity; (ii) enhanced coverage; and (iii) low power consumption.

The MTC was introduced in 3GPP release 10. Hereinafter, the MTC features added in each 3GPP release will be described.

The MTC load control was introduced in 3GPP releases 10 and 11.

The load control method prevents IoT (or M2M) devices from creating a heavy load on the base station suddenly.

Specifically, according to release 10, when a load occurs, the base station may disconnect connections with IoT devices to control the load. According to release 11, the base station may prevent the UE from attempting to establish a connection by informing the UE that access will become available through broadcasting such as SIB14.

In release 12, the features of low-cost MTC were added, and to this end, UE category 0 was newly defined. The UE category indicates the amount of data that the UE is capable of processing using a communication modem.

Specifically, a UE that belongs to UE category 0 may use a reduced peak data rate, a half-duplex operation with relaxed RF requirements, and a single reception antenna, thereby reducing the baseband and RF complexity of the UE.

In Release 13, enhanced MTC (eMTC) was introduced. In the eMTC, the UE operates in a bandwidth of 1.08 MHz, which is the minimum frequency bandwidth supported by legacy LTE, thereby further reducing the cost and power consumption.

Although the following description relates to the eMTC, the description is equally applicable to the MTC, 5G (or NR) MTC, etc. For convenience of description, all types of MTC are commonly referred to as 'MTC'.

In the following description, the MTC may be referred to as another terminology such as eMTC 'LTE-M1/M2', 'bandwidth reduced low complexity/coverage enhanced (BL/CE)', 'non-BL UE (in enhanced coverage)', 'NR MTC', or 'enhanced BL/CE'. Further, the term "MTC" may be replaced with a term defined in the future 3GPP standards.

1) General Features of MTC (1) The MTC operates only in a specific system bandwidth (or channel bandwidth).

The specific system bandwidth may use 6 RBs of the legacy LTE as shown in Table 4 below and defined by considering the frequency range and subcarrier spacing (SCS) shown in Tables 5 to 7. The specific system bandwidth may be referred to as narrowband (NB). Here, the legacy LTE may encompass the contents described in the 3GPP standards expect the MTC. In the NR, the MTC may use RBs corresponding to the smallest system bandwidth in Tables 6 and 7 as in the legacy LTE. Alternatively, the MTC may operate in at least one BWP or in a specific band of a BWP.

TABLE 4

| | Channel bandwidth BWChannel [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

Table 5 shows the frequency ranges (FRs) defined for the NR.

TABLE 5

| Frequency range designation | Corresponding frequency range |
|---|---|
| FR1 | 450 MHz-6000 MHz |
| FR2 | 24250 MHz-52600 MHz |

Table 6 shows the maximum transmission bandwidth configuration (NRB) for the channel bandwidth and SCS in NR FR1.

TABLE 6

| SCS (kHz) | 5 MHz NRB | 10 MHz NRB | 15 MHz NRB | 20 MHz NRB | 25 MHz NRB | 30 MHz NRB | 40 MHz NRB | 50 MHz NRB | 60 MHz NRB | 80 MHz NRB | 90 MHz NRB | 100 MHz NRB |
|---|---|---|---|---|---|---|---|---|---|---|---|---|
| 15 | 25 | 52 | 79 | 106 | 133 | 160 | 216 | 270 | N/A | N/A | N/A | N/A |
| 30 | 11 | 24 | 38 | 51 | 65 | 78 | 106 | 133 | 162 | 217 | 245 | 273 |
| 60 | N/A | 11 | 18 | 24 | 31 | 38 | 51 | 65 | 79 | 107 | 121 | 135 |

Table 7 shows the maximum transmission bandwidth configuration (NRB) for the channel bandwidth and SCS in NR FR2.

TABLE 7

| SCS (kHz) | 50 MHz NRB | 100 MHz NRB | 200 MHz NRB | 400 MHz NRB |
|---|---|---|---|---|
| 60 | 66 | 132 | 264 | N.A |
| 120 | 32 | 66 | 132 | 264 |

Hereinafter, the MTC narrowband (NB) will be described in detail.

The MTC follows narrowband operation to transmit and receive physical channels and signals, and the maximum channel bandwidth is reduced to 1.08 MHz or 6 (LTE) RBs.

The narrowband may be used as a reference unit for allocating resources to some downlink and uplink channels, and the physical location of each narrowband in the frequency domain may vary depending on the system bandwidth.

The 1.08 MHz bandwidth for the MTC is defined to allow an MTC UE to follow the same cell search and random access procedures as those of the legacy UE.

The MTC may be supported by a cell with a much larger bandwidth (e.g., 10 MHz), but the physical channels and signals transmitted/received in the MTC are always limited to 1.08 MHz.

The larger bandwidth may be supported by the legacy LTE system, NR system, 5G system, etc.

The narrowband is defined as 6 non-overlapping consecutive physical RBs in the frequency domain.

If $N_{NB}^{UL} \geq 4$, a wideband is defined as four non-overlapping narrowbands in the frequency domain. If $N_{NB}^{UL} < 4$, $N_{WB}^{UL} \geq 1$ and a single wideband is composed of $N_{NB}^{UL}$ non-overlapping narrowband(s).

For example, in the case of a 10 MHz channel, 8 non-overlapping narrowbands are defined.

Figure 8:
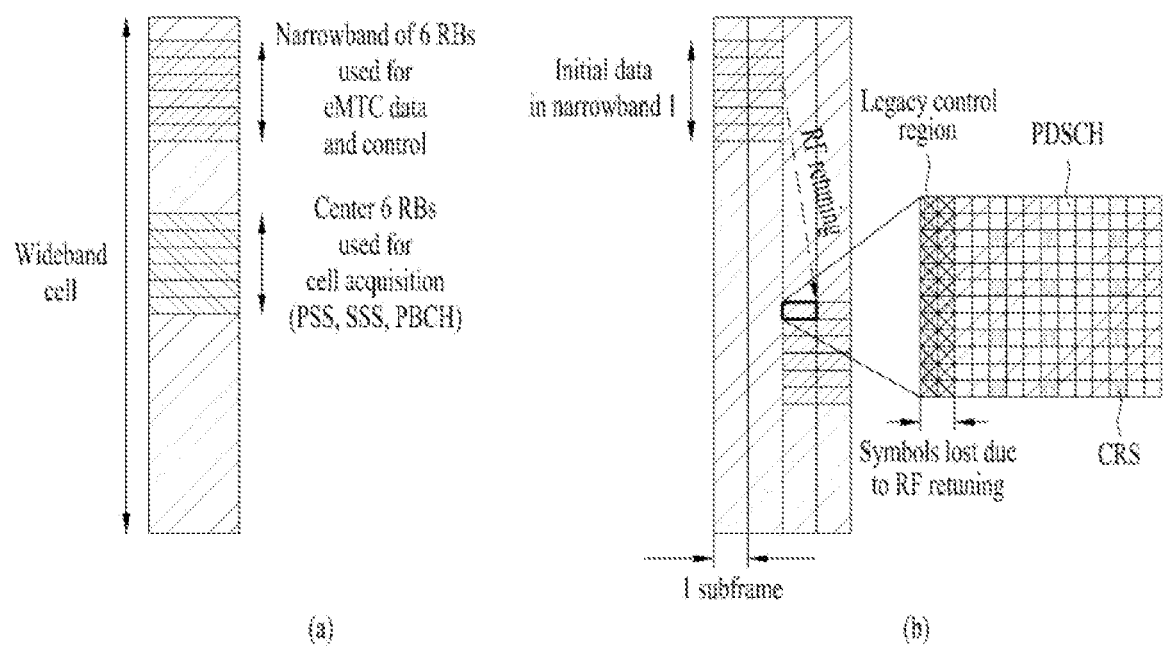
FIG. 8 illustrates an example of narrowband operation and frequency diversity.

FIG. 8 illustrates examples of narrowband operations and frequency diversity.

Specifically, FIG. 8 (a) illustrates an example of the narrowband operation, and FIG. 8(b) illustrates an example of repetitions with RF retuning.

Hereinafter, frequency diversity by RF retuning will be described with reference to FIG. 8(b).

The MTC supports limited frequency, spatial, and time diversity due to the narrowband RF, single antenna, and limited mobility. To reduce the effects of fading and outages, frequency hopping is supported between different narrowbands by the RF retuning.

The frequency hopping is applied to different uplink and downlink physical channels when repetition is enabled.

For example, if 32 subframes are used for PDSCH transmission, the first 16 subframes may be transmitted on the first narrowband. In this case, the RF front-end is retuned to another narrowband, and the remaining 16 subframes are transmitted on the second narrowband.

The MTC narrowband may be configured by system information or DCI.

(2) The MTC operates in half-duplex mode and uses limited (or reduced) maximum transmission power.

(3) The MTC does not use a channel (defined in the legacy LTE or NR) that should be distributed over the full system bandwidth of the legacy LTE or NR.

For example, the MTC does not use the following legacy LTE channels: PCFICH, PHICH, and PDCCH.

Thus, a new control channel, an MTC PDCCH (MPDCCH), is defined for the MTC since the above channels are not monitored.

The MPDCCH may occupy a maximum of 6 RBs in the frequency domain and one subframe in the time domain.

The MPDCCH is similar to an evolved PDCCH (EPDCCH) and supports a common search space for paging and random access.

In other words, the concept of the MPDCCH is similar to that of the EPDCCH used in the legacy LTE.

(4) The MTC uses newly defined DCI formats. For example, DCI formats 6-0A, 6-0B, 6-1A, 6-1B, 6-2, etc. may be used.

(5) In the MTC, a physical broadcast channel (PBCH), physical random access channel (PRACH), MPDCCH, PDSCH, PUCCH, and PUSCH may be repeatedly transmitted. The MTC repeated transmission enables decoding of an MTC channel in a poor environment such as a basement, that is, when the signal quality or power is low, thereby increasing the radius of a cell or supporting the signal propagation effect. The MTC may support a limited number of transmission modes (TMs), which are capable of operating on a single layer (or single antenna), or support a channel or reference signal (RS), which are capable of operating on a single layer. For example, the MTC may operate in TM 1, 2, 6, or 9.

(6) In the MTC, HARQ retransmission is adaptive and asynchronous and performed based on a new scheduling assignment received on the MPDCCH.

(7) In the MTC, PDSCH scheduling (DCI) and PDSCH transmission occur in different subframes (cross-subframe scheduling).

(8) All resource allocation information (e.g., a subframe, a transport block size (TBS), a subband index, etc.) for SIB1 decoding is determined by a master information block (MIB) parameter (in the MTC, no control channel is used for the SIB1 decoding).

(9) All resource allocation information (e.g., a subframe, a TBS, a subband index, etc.) for SIB2 decoding is determined by several SIB1 parameters (in the MTC, no control channel is used for the SIB2 decoding).

(10) The MTC supports an extended discontinuous reception (DRX) cycle.

(11) The MTC may use the same primary synchronization signal/secondary synchronization signal/common reference signal (PSS/SSS/CRS) as that used in the legacy LTE or NR. In the NR, the PSS/SSS is transmitted in the unit of SS block (or SS/PBCH block or SSB), and a tracking RS (TRS) may be used for the same purpose as the CRS. That is, the TRS is a cell-specific RS and may be used for frequency/time tracking.

2) MTC Operation Mode and Level

Hereinafter, MTC operation modes and levels will be described. To enhance coverage, the MTC may be divided into two operation modes (first and second modes) and four different levels as shown in Table 8 below.

The MTC operation mode may be referred to CE mode. The first and second modes may be referred to CE mode A and CE mode B, respectively.

TABLE 8

| Mode | Level | Description |
| --- | --- | --- |
| Mode A | Level 1 | No repetition for PRACH |
|  | Level 2 | Small Number of Repetition for PRACH |
| Mode B | Level 3 | Medium Number of Repetition for PRACH |
|  | Level 4 | Large Number of Repetition for PRACH |

The first mode is defined for small coverage where full mobility and channel state information (CSI) feedback are supported. In the first mode, the number of repetitions is zero or small. The operation in the first mode may have the same operation coverage as that of UE category 1. The second mode is defined for a UE with a very poor coverage condition where CSI feedback and limited mobility are supported. In the second mode, the number of times that transmission is repeated is large. The second mode provides up to 15 dB coverage enhancement with reference to the coverage of UE category 1. Each level of the MTC is defined differently in random access channel (RACH) and paging procedures.

Hereinafter, a description will be given of how to determine the MTC operation mode and level.

The MTC operation mode is determined by the base station, and each level is determined by the MTC UE. Specifically, the base station transmits RRC signaling including information for the MTC operation mode to the UE. The RRC signaling may include an RRC connection setup message, an RRC connection reconfiguration message, or an RRC connection reestablishment message. Here, the term "message" may refer to an information element (IE).

The MTC UE determines a level within the operation mode and transmits the determined level to the base station. Specifically, the MTC UE determines the level within the operation mode based on measured channel quality (e.g., RSRP, RSRQ, SINR, etc.) and informs the base station of the determined level using a PRACH resource (e.g., frequency, time, preamble, etc.).

3) MTC Guard Period

As described above, the MTC operates in the narrowband. The position of the narrowband may vary in each specific time unit (e.g., subframe or slot). The MTC UE tunes to a different frequency in every time unit. Thus, all frequency retuning may require a certain period of time. In other words, the guard period is required for transition from one time unit to the next time unit, and no transmission and reception occurs during the corresponding period.

The guard period varies depending on whether the current link is downlink or uplink and also varies depending on the state thereof. An uplink guard period (i.e., guard period defined for uplink) varies depending on the characteristics of data carried by a first time unit (time unit N) and a second time unit (time unit N+1). In the case of a downlink guard period, the following conditions need to be satisfied: (1) a first downlink narrowband center frequency is different from a second narrowband center frequency; and (2) in TDD, a first uplink narrowband center frequency is different from a second downlink center frequency.

The MTC guard period defined in the legacy LTE will be described. A guard period consisting of at most $N_{symb}^{retune}$ SC-FDMA symbols is created for Tx-Tx frequency retuning between two consecutive subframes. When the higher layer parameter ce-RetuningSymbols is configured, $N_{symb}^{retune}$ is equal to ce-RetuningSymbols. Otherwise, $N_{symb}^{retune}$ is 2. For an MTC UE configured with the higher layer parameter srs-UpPtsAdd, a guard period consisting of SC-FDMA symbols is created for Tx-Tx frequency retuning between a first special subframe and a second uplink subframe for frame structure type 2.

Figure 9:
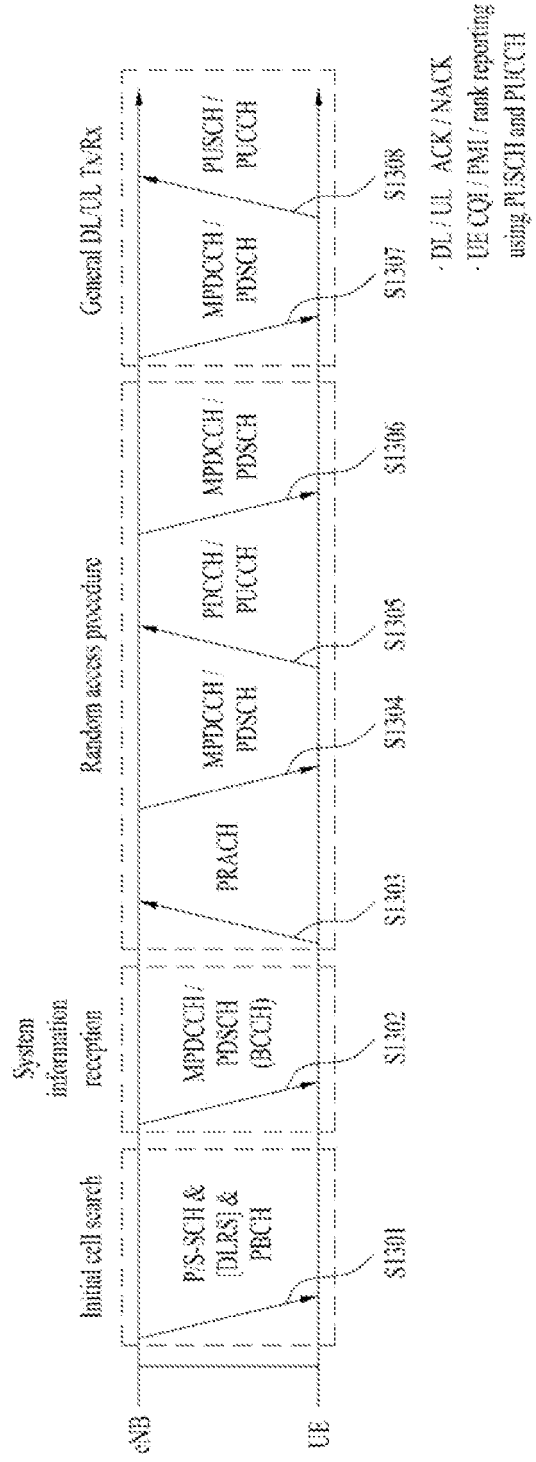
FIG. 9 illustrates physical channels available for machine type communications (MTC) and a general signal transmission method using the same.

FIG. 9 illustrates physical channels available in MTC and a general signal transmission method using the same.

When an MTC UE is powered on or enters a new cell, the MTC UE performs initial cell search in step S1301. The initial cell search involves acquisition of synchronization with a base station. Specifically, the MTC UE synchronizes with the base station by receiving a primary synchronization signal (PSS) and a second synchronization signal (SSS) from the base station and obtains information such as a cell identifier (ID). The PSS/SSS used by the MTC UE for the initial cell search may be equal to a PSS/SSS or a resynchronization signal (RSS) of the legacy LTE.

Thereafter, the MTC UE may acquire broadcast information in the cell by receiving a PBCH signal from the base station.

During the initial cell search, the MTC UE may monitor the state of a downlink channel by receiving a downlink reference signal (DL RS). The broadcast information transmitted on the PBCH corresponds to the MIB. In the MTC, the MIB is repeated in the first slot of subframe #0 of a radio frame and other subframes (subframe #9 in FDD and subframe #5 in the TDD).

The PBCH repetition is performed such that the same constellation point is repeated on different OFDM symbols to estimate an initial frequency error before attempting PBCH decoding.

Figure 10:
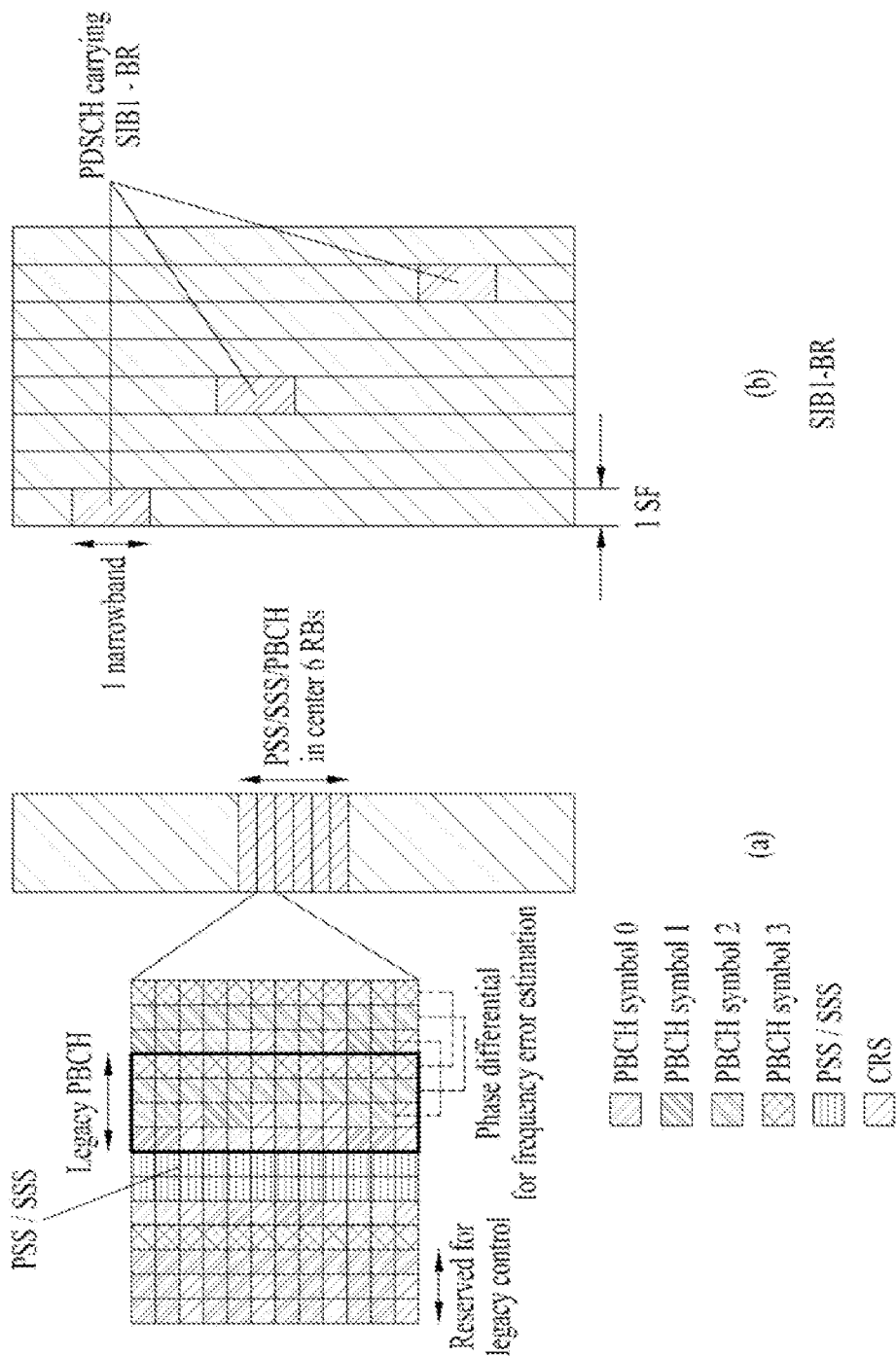
FIG. 10 illustrates an example of system information transmission in MTC.

FIG. 10 illustrates an example of system information transmissions in MTC.

Specifically, FIG. 10 (*a*) illustrates an example of a repetition pattern for subframe #0 in FDD and a frequency error estimation method for a normal CP and repeated symbols, and FIG. 10 (*b*) illustrates an example of transmission of an SIB-BR on a wideband LTE channel.

Five reserved bits in the MIB are used in the MTC to transmit scheduling information for a new system information block for bandwidth reduced device (SIB1-BR) including a time/frequency location and a TBS.

The SIB-BR is transmitted on a PDSCH directly without any related control channels.

The SIB-BR is maintained without change for 512 radio frames (5120 ms) to allow a large number of subframes to be combined.

Table 9 shows an example of the MIB.

TABLE 9

| -- ASN1START | |
|---|---|
| MasterInformationBlock ::= | SEQUENCE { |
| dl-Bandwidth | ENUMERATED { |
| | n6, n15, n25, n50, n75, n100}, |
| phich-Config | PHICH-Config, |
| systemFrameNumber | BIT STRING (SIZE (8)), |
| schedulingInfoSIB1-BR-r13 | INTEGER (0..31), |
| systemInfoUnchanged-BR-r15 | BOOLEAN, |
| spare | BIT STRING (SIZE (4)) |
| } | |
| -- ASN1STOP | |

In Table 9, the schedulingInfoSIB1-BR field indicates the index of a table that defines SystemInformationBlockType1-BR scheduling information. The zero value means that SystemInformationBlockType1-BR is not scheduled. The overall function and information carried by SystemInformationBlockType1-BR (or SIB1-BR) is similar to SIB1 of the legacy LTE. The contents of SIB1-BR may be categorized as follows: (1) PLMN; (2) cell selection criteria; and (3) scheduling information for SIB2 and other SIBs.

After completing the initial cell search, the MTC UE may acquire more detailed system information by receiving a MPDCCH and a PDSCH based on information in the MPDCCH in step S1302. The MPDCCH has the following features: (1) The MPDCCH is very similar to the EPDCCH; (2) The MPDCCH may be transmitted once or repeatedly (the number of repetitions is configured through higher layer signaling); (3) Multiple MPDCCHs are supported and a set of MPDCCHs are monitored by the UE; (4) the MPDCCH is generated by combining enhanced control channel elements (eCCEs), and each CCE includes a set of REs; and (5) the MPDCCH supports an RA-RNTI, SI-RNTI, P-RNTI, C-RNTI, temporary C-RNTI, and semi-persistent scheduling (SPS) C-RNTI.

To complete the access to the base station, the MTC UE may perform a random access procedure in steps S1303 to S1306. The basic configuration of an RACH procedure is carried by SIB2. SIB2 includes parameters related to paging. A paging occasion (PO) is a subframe in which the P-RNTI is capable of being transmitted on the MPDCCH. When a P-RNTI PDCCH is repeatedly transmitted, the PO may refer to a subframe where MPDCCH repetition is started. A paging frame (PF) is one radio frame, which may contain one or multiple POs. When DRX is used, the MTC UE monitors one PO per DRX cycle. A paging narrowband (PNB) is one narrowband, on which the MTC UE performs paging message reception.

To this end, the MTC UE may transmit a preamble on a PRACH (S1303) and receive a response message (e.g., random access response (RAR)) for the preamble on the MPDCCH and the PDSCH related thereto (S1304). In the case of contention-based random access, the MTC UE may perform a contention resolution procedure including transmission of an additional PRACH signal (S1305) and reception of a MPDCCH signal and a PDSCH signal related thereto (S1306). In the MTC, the signals and messages (e.g., Msg 1, Msg 2, Msg 3, and Msg 4) transmitted during the RACH procedure may be repeatedly transmitted, and a repetition pattern may be configured differently depending on coverage enhancement (CE) levels. Msg 1 may represent the PRACH preamble, Msg 2 may represent the RAR, Msg 3 may represent uplink transmission for the RAR at the MTC UE, and Msg 4 may represent downlink transmission for Msg 3 from the base station.

For random access, signaling of different PRACH resources and different CE levels is supported. This provides the same control of the near-far effect for the PRACH by grouping UEs that experience similar path loss together. Up to four different PRACH resources may be signaled to the MTC UE.

The MTC UE measures RSRP using a downlink RS (e.g., CRS, CSI-RS, TRS, etc.) and selects one of random access resources based on the measurement result. Each of four random access resources has an associated number of PRACH repetitions and an associated number of RAR repetitions.

Thus, the MTC UE in poor coverage requires a large number of repetitions so as to be detected by the base station successfully and needs to receive as many RARs as the number of repetitions such that the coverage levels thereof are satisfied.

The search spaces for RAR and contention resolution messages are defined in the system information, and the search space is independent for each coverage level.

A PRACH waveform used in the MTC is the same as that in the legacy LTE (for example, OFDM and Zadoff-Chu sequences).

After performing the above-described processes, the MTC UE may perform reception of an MPDCCH signal and/or a PDSCH signal (S1307) and transmission of a PUSCH signal and/or a PUCCH signal (S1308) as a normal uplink/downlink signal transmission procedure. Control information that the MTC UE transmits to the base station is commonly referred to as uplink control information (UCI). The UCI includes a HARQ-ACK/NACK, scheduling request, channel quality indicator (CQI), precoding matrix indicator (PMI), rank indicator (RI), etc.

When the MTC UE has established an RRC connection, the MTC UE blindly decodes the MPDCCH in a configured search space to obtain uplink and downlink data assignments.

In the MTC, all available OFDM symbols in a subframe are used to transmit DCI. Accordingly, time-domain multiplexing is not allowed between control and data channels in the subframe. Thus, the cross-subframe scheduling may be performed between the control and data channels as described above.

If the MPDCCH is last repeated in subframe #N, the MPDCCH schedules a PDSCH assignment in subframe #N+2.

DCI carried by the MPDCCH provides information for how many times the MPDCCH is repeated so that the MTC UE may know the number of repetitions when PDSCH transmission is started.

The PDSCH assignment may be performed on different narrowbands. Thus, the MTC UE may need to perform retuning before decoding the PDSCH assignment.

For uplink data transmission, scheduling follows the same timing as that of the legacy LTE. The last MPDCCH in subframe #N schedules PUSCH transmission starting in subframe #N+4.

Figure 11:
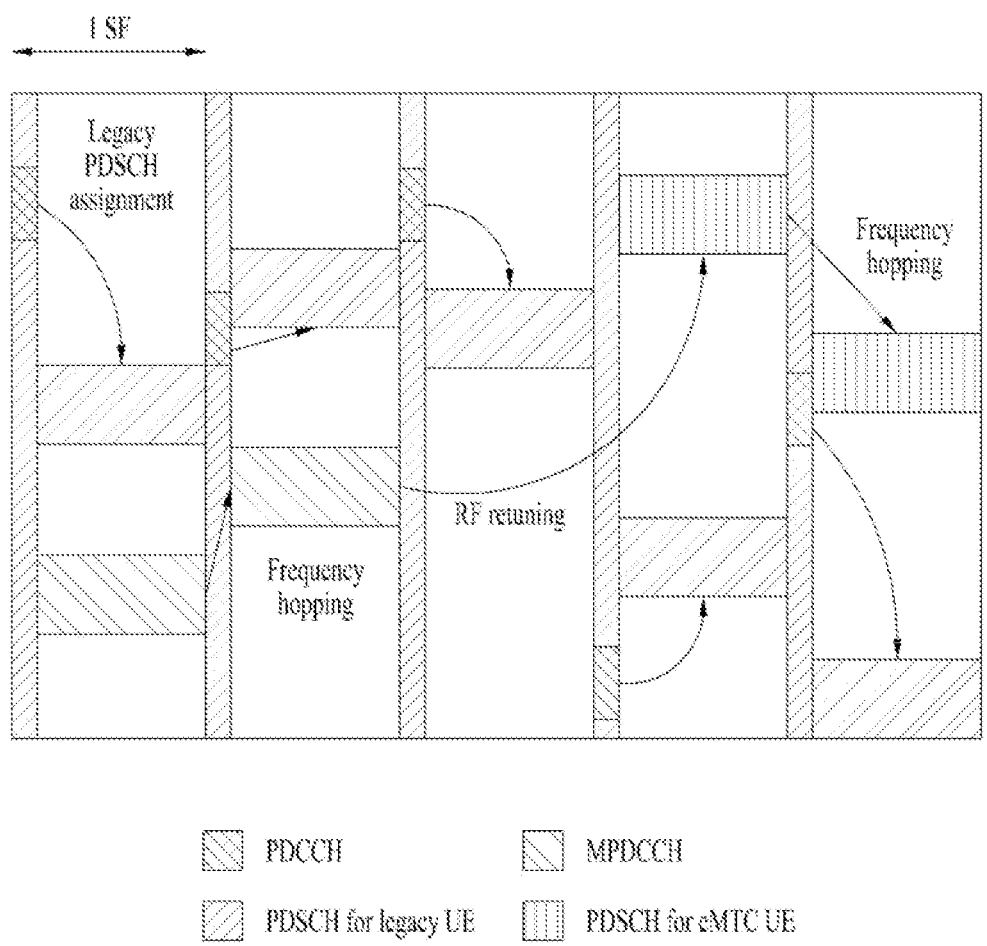
FIG. 11 illustrates an example of scheduling for each of MTC and legacy LTE.

FIG. 11 illustrates an example of scheduling for each of MTC and legacy LTE.

A legacy LTE assignment is scheduled using the PDCCH and uses the initial OFDM symbols in each subframe. The PDSCH is scheduled in the same subframe in which the PDCCH is received.

On the other hand, the MTC PDSCH is cross-subframe scheduled, and one subframe is defined between the MPDCCH and PDSCH to allow MPDCCH decoding and RF retuning.

MTC control and data channels may be repeated for a large number of subframes to be decoded in an extreme coverage condition. Specifically, the MTC control and data channels may be repeated for a maximum of 256 subframes for the MPDCCH and a maximum of 2048 subframes for the PDSCH D. NB-IoT (Narrowband-Internet of Things)

The NB-IoT may refer to a system for providing low complexity and low power consumption based on a system bandwidth (BW) corresponding to one physical resource block (PRB) of a wireless communication system (e.g., LTE system, NR system, etc.).

Herein, the NB-IoT may be referred to as another terminology such as 'NB-LTE', 'NB-IoT enhancement', 'further enhanced NB-IoT', or 'NB-NR'. The NB-IoT may be replaced with a term defined or to be defined in the 3GPP standards. For convenience of description, all types of NB-IoT is commonly referred to as 'NB-IoT'.

The NB-IoT may be used to implement the IoT by supporting an MTC device (or MTC UE) in a cellular system. Since one PRB of the system BW is allocated for the NB-IoT, frequency may be efficiently used. In addition, considering that in the NB-IoT, each UE recognizes a single PRB as one carrier, the PRB and carrier described herein may be considered to have the same meaning.

Although the present disclosure describes frame structures, physical channels, multi-carrier operation, operation modes, and general signal transmission and reception of the NB-IoT based on the LTE system, it is apparent that the present disclosure is applicable to the next-generation systems (e.g., NR system, etc.). In addition, the details of the NB-IoT described in the present disclosure may be applied to the MTC, which has similar purposes (e.g., low power, low cost, coverage enhancement, etc.).

1) Frame Structure and Physical Resource of NB-IoT

The NB-IoT frame structure may vary depending on subcarrier spacing.

Figure 12:
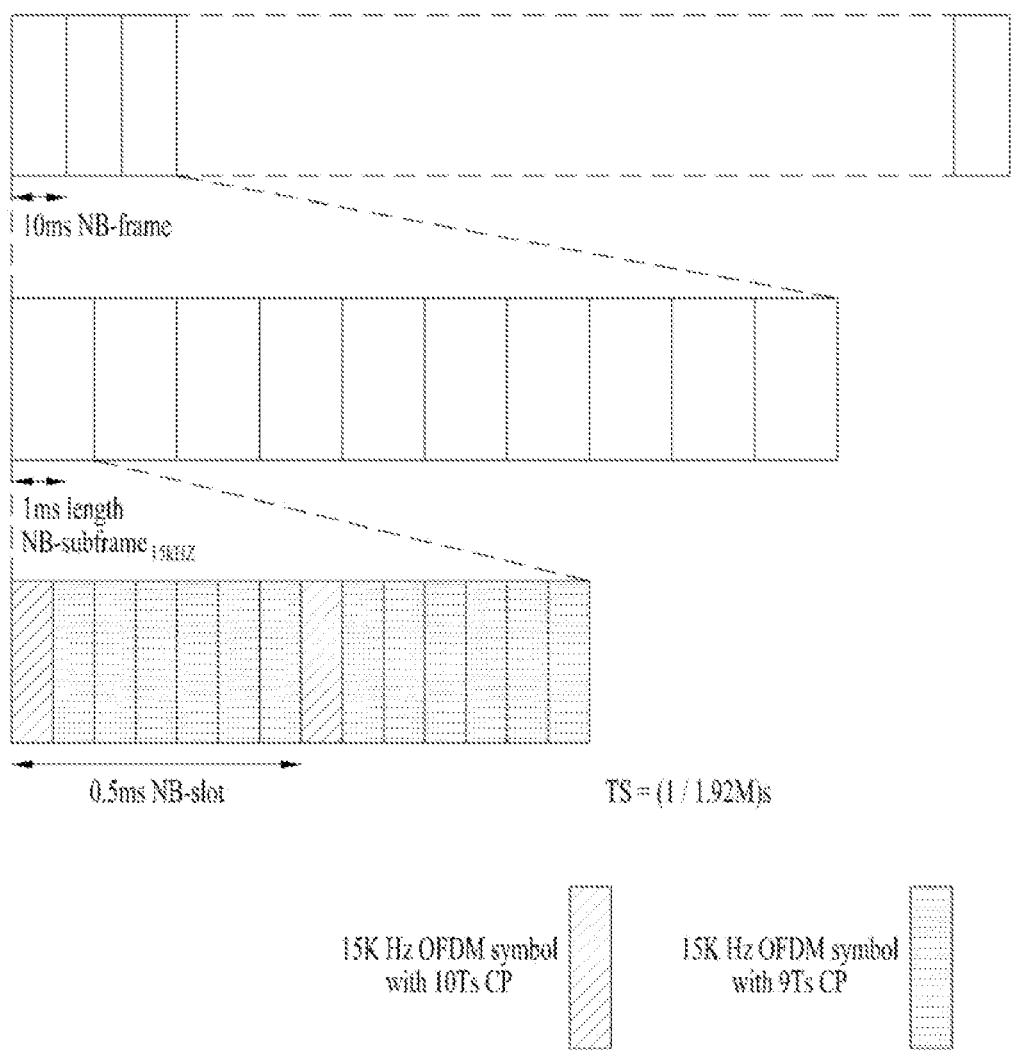
FIGS. 12 and 13 illustrate examples of narrowband Internet of Things (NB-IoT) frame structures according to subcarrier spacing.
Figure 13:
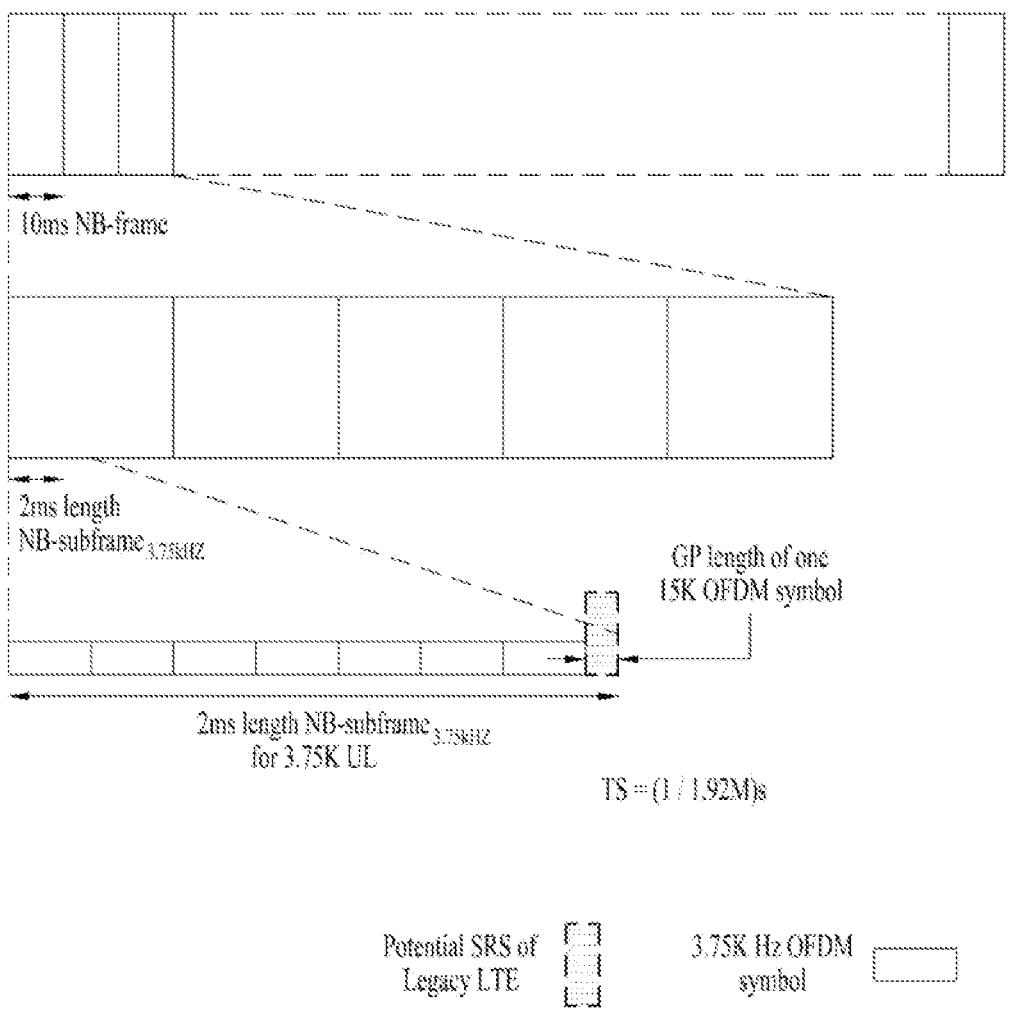
Figure 16:
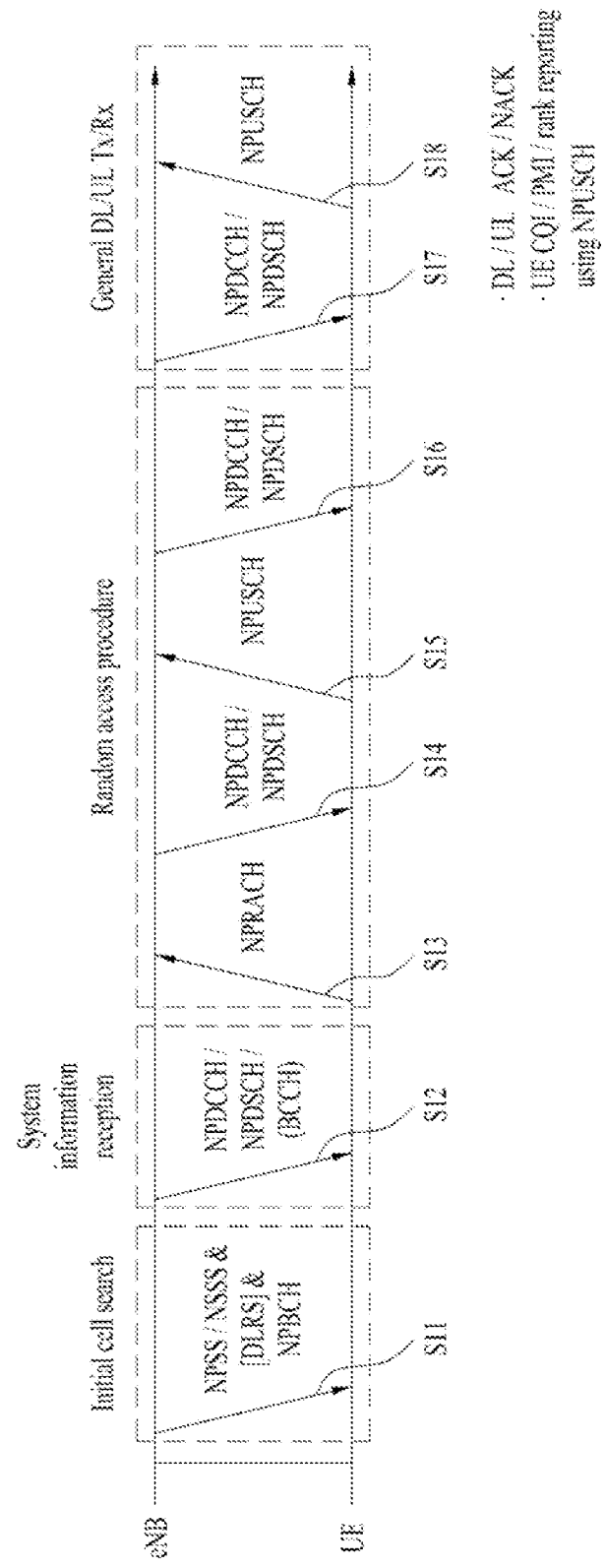
FIG. 16 illustrates physical channels available for NB-IoT and a general signal transmission method using the same.
Figure 17:
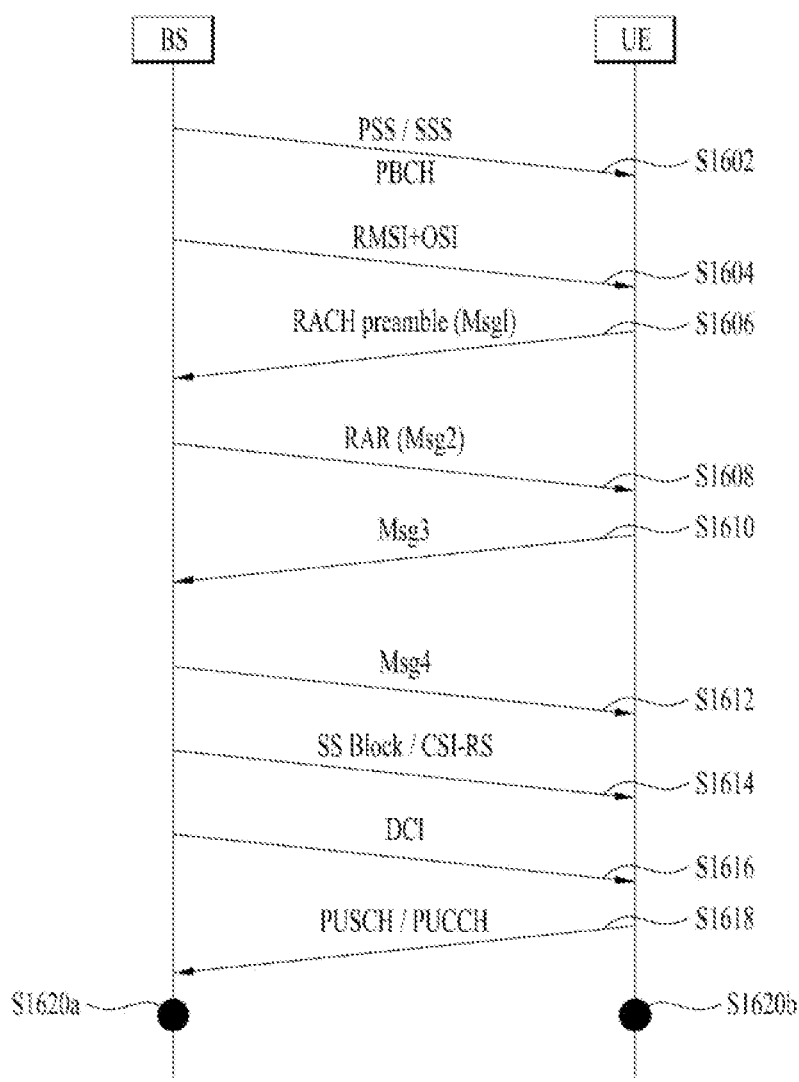
FIG. 17 illustrates initial network access and subsequent communication processes in the NR system.

FIGS. 16 and 17 illustrate examples of NB-IoT frame structures according to subcarrier spacing (SCS). Specifically, FIG. 12 illustrates a frame structure with SCS of 15 kHz, and FIG. 13 illustrates a frame structure with SCS of 3.75 kHz. However, the NB-IoT frame structure is not limited thereto, and different SCS (e.g., 30 kHz, etc.) may be applied to the NB-IoT by changing the time/frequency unit.

Although the present disclosure describes the NB-IoT frame structure based on the LTE frame structure, this is merely for convenience of description and the present disclosure is not limited thereto. That is, the embodiments of the present disclosure are applicable to the NB-IoT based on the frame structure of the next-generation system (e.g., NR system).

Referring to FIG. 12, the NB-IoT frame structure for the 15 kHz subcarrier spacing is the same as the frame structure of the legacy system (LTE system). Specifically, a 10 ms NB-IoT frame may include 10 NB-IoT subframes of 1 ms each, and the 1 ms NB-IoT subframe may include two NB-IoT slots, each having a duration of 0.5 ms. Each 0.5 ms NB-IoT slot ms may include 7 OFDM symbols.

Referring to FIG. 13, a 10 ms NB-IoT frame may include five NB-IoT subframes of 2 ms each, and the 2 ms NB-IoT subframe may include 7 OFDM symbols and one guard period (GP). The 2 ms NB-IoT subframe may be expressed as an NB-IoT slot or an NB-IoT resource unit (RU).

Hereinafter, downlink and uplink physical resources for the NB-IoT will be described.

The NB-IoT downlink physical resource may be configured based on physical resources of other communication systems (e.g., LTE system, NR system, etc.) except that the system BW is composed of a specific number of RBs (e.g., one RB=180 kHz). For example, when NB-IoT downlink supports only the 15 kHz subcarrier spacing as described above, the NB-IoT downlink physical resource may be configured by limiting the resource grid of the LTE system illustrated in FIG. 6 to one RB (i.e., one PRB) in the frequency domain.

Figure 14:
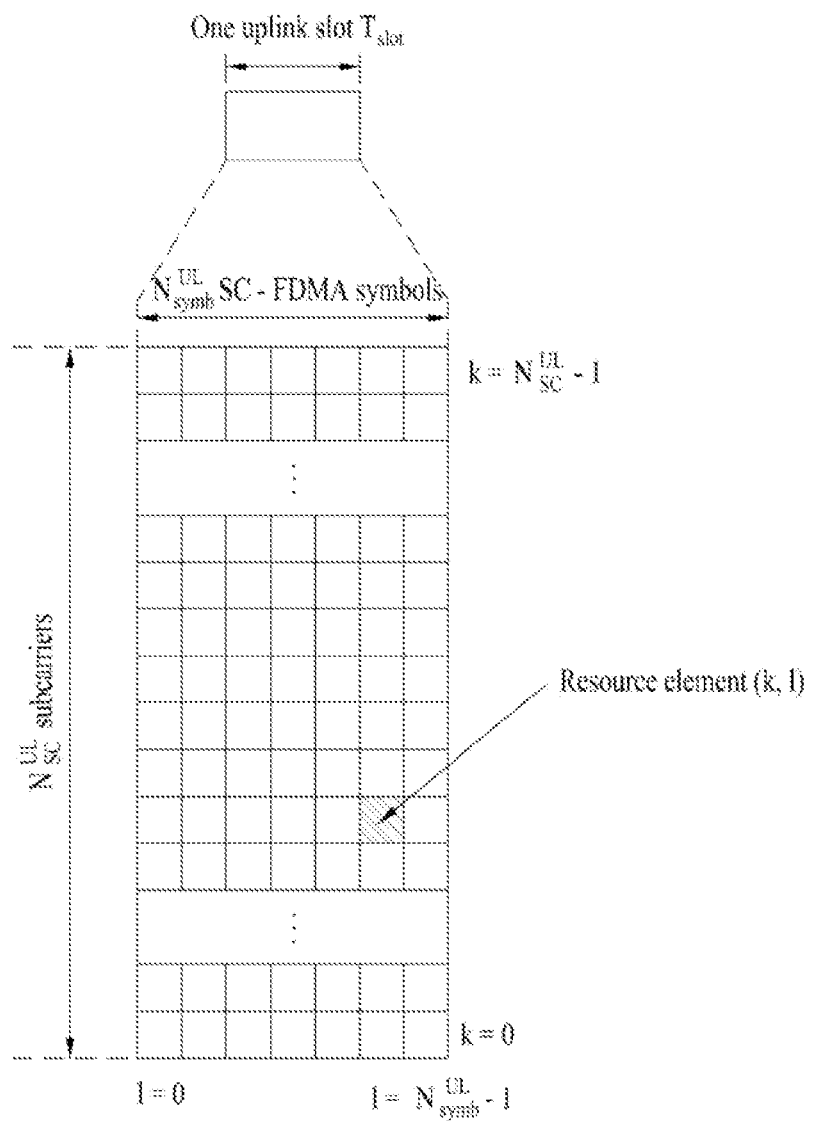
FIG. 14 illustrates an example of a resource grid for NB-IoT uplink.

The NB-IoT uplink physical resource may be configured by limiting to the system bandwidth to one RB as in the NB-IoT downlink. For example, when NB-IoT uplink supports the 15 kHz and 3.75 kHz subcarrier spacing as described above, a resource grid for the NB-IoT uplink may be represented as shown in FIG. 14. The number of subcarriers $N_{sc}^{UL}$ and the slot period $T_{slot}$ may be given in Table 10 below.

FIG. 14 illustrates an example of the resource grid for NB-IoT uplink.

TABLE 10

| Subcarrier spacing | $N_{sc}^{UL}$ | $T_{slot}$ |
|---|---|---|
| Δf = 3.75 kHz | 48 | 61440 · $T_s$ |
| Δf = 15 kHz | 12 | 15360 · $T_s$ |

A resource unit (RU) for the NB-IoT uplink may include SC-FDMA symbols in the time domain and $N_{symb}^{UB}N_{slots}^{UL}$ consecutive subcarriers in the frequency domain. In frame structure type 1 (i.e., FDD), the values of $N_{sc}^{RU}$ and $N_{symb}^{UL}$ may be given in Table 11 below. In frame structure type 2 (i.e., TDD), the values of $N_{sc}^{RU}$ and $N_{symb}^{UL}$ may be given in Table 12.

TABLE 11

| NPUSCH format | Δf | $N_{sc}^{RU}$ | $N_{slots}^{UL}$ | $N_{symb}^{UL}$ |
|---|---|---|---|---|
| 1 | 3.75 kHz | 1 | 16 | 7 |
|  | 15 kHz | 1 | 16 |  |
|  |  | 3 | 8 |  |
|  |  | 6 | 4 |  |
|  |  | 12 | 2 |  |
| 2 | 3.75 kHz | 1 | 4 |  |
|  | 15 kHz | 1 | 4 |  |

TABLE 12

| NPUSCH format | Δf | Supported uplink-downlink configurations | $N_{sc}^{RU}$ | $N_{slots}^{UL}$ | $N_{symb}^{UL}$ |
|---|---|---|---|---|---|
| 1 | 3.75 kHz | 1, 4 | 1 | 16 | 7 |
|  | 15 kHz | 1, 2, 3, 4, 5 | 1 | 16 |  |
|  |  |  | 3 | 8 |  |
|  |  |  | 6 | 4 |  |
|  |  |  | 12 | 2 |  |

TABLE 12-continued

| NPUSCH format | Δf | Supported uplink-downlink configurations | $N_{sc}^{RU}$ | $N_{slots}^{UL}$ | $N_{symb}^{UL}$ |
|---|---|---|---|---|---|
| 2 | 3.75 kHz | 1, 4 | 1 | 4 | |
| | 15 kHz | 1, 2, 3, 4, 5 | 1 | 4 | |

2) Physical Channels of NB-IoT

A base station and/or UE that support the NB-IoT may be configured to transmit and receive physical channels and signals different from those in the legacy system. Hereinafter, the physical channels and/or signals supported in the NB-IoT will be described in detail.

First, the NB-IoT downlink will be described. For the NB-IoT downlink, an OFDMA scheme with the 15 kHz subcarrier spacing may be applied. Accordingly, orthogonality between subcarriers may be provided, thereby supporting coexistence with the legacy system (e.g., LTE system, NR system, etc.).

To distinguish the physical channels of the NB-IoT system from those of the legacy system, 'N (narrowband)' may be added. For example, DL physical channels may be defined as follows: 'narrowband physical broadcast channel (NPBCH)', 'narrowband physical downlink control channel (NPDCCH)', 'narrowband physical downlink shared channel (NPDSCH)', etc. DL physical signals may be defined as follows: 'narrowband primary synchronization signal (NPSS)', 'narrowband secondary synchronization signal (NSSS)', 'narrowband reference signal (NRS)', 'narrowband positioning reference signal (NPRS)', 'narrowband wake-up signal (NWUS)', etc.

Generally, the above-described downlink physical channels and physical signals for the NB-IoT may be configured to be transmitted based on time-domain multiplexing and/or frequency-domain multiplexing.

The NPBCH, NPDCCH, and NPDSCH, which are downlink channels of the NB-IoT system, may be repeatedly transmitted for coverage enhancement.

The NB-IoT uses newly defined DCI formats. For example, the DCI formats for the NB-IoT may be defined as follows: DCI format NO, DCI format N1, DCI format N2, etc.

Next, the NB-IoT uplink will be described. For the NB-IoT uplink, an SC-FDMA scheme with the subcarrier spacing of 15 kHz or 3.75 kHz may be applied. The NB-IoT uplink may support multi-tone and single-tone transmissions. For example, the multi-tone transmission may support the 15 kHz subcarrier spacing, and the single-tone transmission may support both the 15 kHz and 3.75 kHz subcarrier spacing.

In the case of the NB-IoT uplink, 'N (narrowband)' may also be added to distinguish the physical channels of the NB-IoT system from those of the legacy system, similarly to the NB-IoT downlink. For example, uplink physical channels may be defined as follows: 'narrowband physical random access channel (NPRACH)', 'narrowband physical uplink shared channel (NPUSCH)', etc. UL physical signals may be defined as follows: 'narrowband demodulation reference signal (NDMRS)'.

The NPUSCH may be configured with NPUSCH format 1 and NPUSCH format 2. For example, NPUSCH format 1 is used for UL-SCH transmission (or transfer), and NPUSCH format 2 may be used for UCI transmission such as HARQ ACK signaling.

The NPRACH, which is a downlink channel of the NB-IoT system, may be repeatedly transmitted for coverage enhancement. In this case, frequency hopping may be applied to the repeated transmission.

3) Multi-Carrier Operation in NB-IoT

Hereinafter, the multi-carrier operation in the NB-IoT will be described. The multi-carrier operation may mean that when the base station and/or UE uses different usage of multiple carriers (i.e., different types of multiple carriers) in transmitting and receiving a channel and/or a signal in the NB-IoT.

In general, the NB-IoT may operate in multi-carrier mode as described above. In this case, NB-IoT carriers may be divided into an anchor type carrier (i.e., anchor carrier or anchor PRB) and a non-anchor type carrier (i.e., non-anchor carrier or non-anchor PRB).

From the perspective of the base station, the anchor carrier may mean a carrier for transmitting the NPDSCH that carries the NPSS, NSSS, NPBCH, and SIB (N-SIB) for initial access. In other words, in the NB-IoT, the carrier for initial access may be referred to as the anchor carrier, and the remaining carrier(s) may be referred to as the non-anchor carrier. In this case, there may be one or multiple anchor carriers in the system.

4) Operation Mode of NB-IoT

Figure 15:
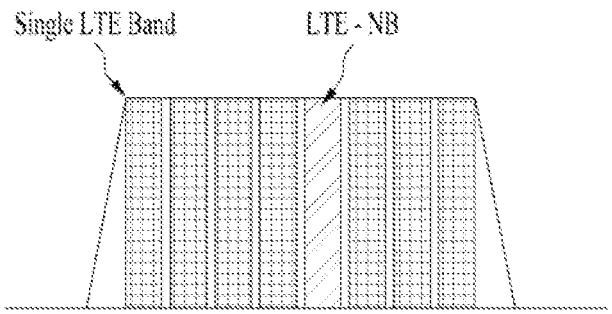
FIG. 15 illustrates examples of operating modes supported in the NB-IoT system.
Figure 15:
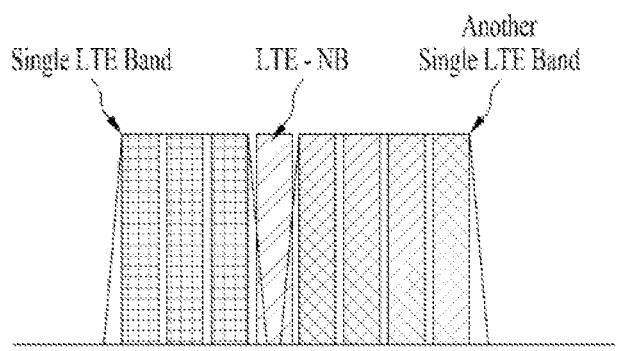
Figure 15:
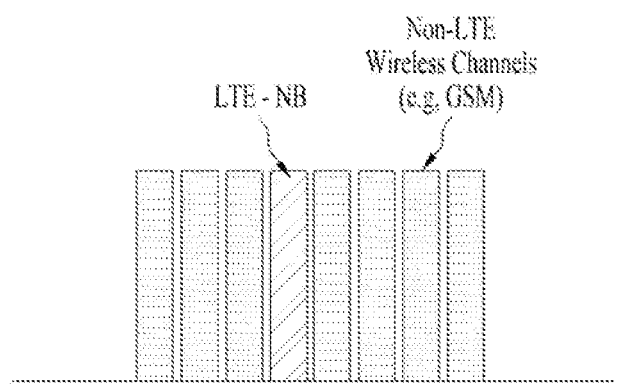

The operation mode of the NB-IoT will be described. The NB-IoT system may support three operation modes. FIG. 15 illustrates examples of operation modes supported in the NB-IoT system. Although the present disclosure describes the NB-IoT operation mode based on the LTE band, this is merely for convenience of description and the present disclosure is also applicable to other system bands (e.g., NR system band).

FIG. 15 (a) illustrates an in-band system, FIG. 15 (b) illustrates a guard-band system, and FIG. 15 (c) illustrates a stand-alone system. The in-band system, guard-band system, and stand-alone system may be referred to as in-band mode, guard-band mode, and stand-alone mode, respectively.

The in-band system may mean a system or mode that uses one specific RB (PRB) in the legacy LTE band for the NB-IoT. To operate the in-band system, some RBs of the LTE system carrier may be allocated.

The guard-band system may mean a system or mode that uses a space reserved for the guard band of the legacy LTE band for the NB-IoT. To operate the guard-band system, the guard band of the LTE carrier which is not used as the RB in the LTE system may be allocated. For example, the legacy LTE band may be configured such that each LTE band has the guard band of minimum 100 kHz at the end thereof. In order to use 200 kHz, two non-contiguous guard bands may be used.

The in-band system and the guard-band system may operate in a structure where the NB-IoT coexists in the legacy LTE band.

Meanwhile, the stand-alone system may mean a system or mode independent from the legacy LTE band. To operate the stand-alone system, a frequency band (e.g., reallocated GSM carrier) used in a GSM EDGE radio access network (GERAN) may be separately allocated.

The above three operation modes may be applied independently, or two or more operation modes may be combined and applied.

5) General Signal Transmission and Reception Procedure in NB-IoT

FIG. 16 illustrates an example of physical channels available in the NB-IoT and a general signal transmission method using the same. In a wireless communication system, an NB-IoT UE may receive information from a base station in downlink (DL) and transmit information to the base station in uplink (UL). In other words, the base station may transmit the information to the NB-IoT UE in downlink and receive the information from the NB-IoT UE in uplink in the wireless communication system.

Information transmitted and received between the base station and the NB-IoT UE may include various data and control information, and various physical channels may be used depending on the type/usage of information transmitted and received therebetween. The NB-IoT signal transmission and reception method described with reference to FIG. 16 may be performed by the aforementioned wireless communication apparatuses (e.g., base station and UE in FIG. 11).

When the NB-IoT UE is powered on or enters a new cell, the NB-IoT UE may perform initial cell search (S11). The initial cell search involves acquisition of synchronization with the base station. Specifically, the NB-IoT UE may synchronize with the base station by receiving an NPSS and an NSSS from the base station and obtain information such as a cell ID. Thereafter, the NB-IoT UE may acquire information broadcast in the cell by receiving an NPBCH from the base station. During the initial cell search, the NB-IoT UE may monitor the state of a downlink channel by receiving a downlink reference signal (DL RS).

In other words, when the NB-IoT UE enters the new cell, the BS may perform the initial cell search, and more particularly, the base station may synchronize with the UE. Specifically, the base station may synchronize with the NB-IoT UE by transmitting the NPSS and NSSS to the UE and transmit the information such as the cell ID. The base station may transmit the broadcast information in the cell by transmitting (or broadcasting) the NPBCH to the NB-IoT UE. The BS may transmit the DL RS to the NB-IoT UE during the initial cell search to check the downlink channel state.

After completing the initial cell search, the NB-IoT UE may acquire more detailed system information by receiving a NPDCCH and a NPDSCH related to thereto (S12). In other words, after the initial cell search, the base station may transmit the more detailed system information by transmitting the NPDCCH and the NPDSCH related to thereto to the NB-IoT UE.

Thereafter, the NB-IoT UE may perform a random access procedure to complete the access to the base station (S13 to S16).

Specifically, the NB-IoT UE may transmit a preamble on an NPRACH (S13). As described above, the NPRACH may be repeatedly transmitted based on frequency hopping for coverage enhancement. In other words, the base station may (repeatedly) receive the preamble from the NB-IoT UE over the NPRACH.

Then, the NB-IoT UE may receive a random access response (RAR) for the preamble from the base station on the NPDCCH and the NPDSCH related thereto (S14). That is, the base station may transmit the random access response (RAR) for the preamble to the base station on the NPDCCH and the NPDSCH related thereto.

The NB-IoT UE may transmit an NPUSCH using scheduling information in the RAR (S15) and perform a contention resolution procedure based on the NPDCCH and the NPDSCH related thereto (S16). That is, the base station may receive the NPUSCH from the NB-IoT UE based on the scheduling information in the RAR and perform the contention resolution procedure.

After performing the above-described processes, the NB-IoT UE may perform NPDCCH/NPDSCH reception (S17) and NPUSCH transmission (S18) as a normal UL/DL signal transmission procedure. After the above-described processes, the base station may transmit the NPDCCH/NPDSCH to the NB-IoT UE and receive the NPUSCH from the NB-IoT UE during the normal uplink/downlink signal transmission procedure.

In the NB-IoT, the NPBCH, NPDCCH, NPDSCH, etc. may be repeatedly transmitted for the coverage enhancement as described above. In addition, UL-SCH (normal uplink data) and UCI may be transmitted on the NPUSCH. In this case, the UL-SCH and UCI may be configured to be transmitted in different NPUSCH formats (e.g., NPUSCH format 1, NPUSCH format 2, etc.)

As described above, the UCI means control information transmitted from the UE to the base station. The UCI may include the HARQ ACK/NACK, scheduling request (SR), CSI, etc. The CSI may include the CQI, PMI, RI, etc. Generally, the UCI may be transmitted over the NPUSCH in the NB-IoT as described above. In particular, the UE may transmit the UCI on the NPUSCH periodically, aperiodically, or semi-persistently according to the request/indication from the network (e.g., base station).

E. Network Access and Communication Process

The UE may perform a network access process to perform the above-described/proposed procedures and/or methods. For example, the UE may receive and store system information and configuration information required to perform the above-described/proposed procedures and/or methods during network (BS) access. The configuration information required for the present disclosure may be received through higher layer signaling (e.g., RRC layer, medium access control (MAC) layer, etc.).

FIG. 17 illustrates initial network access and subsequent communication processes in the NR system. In NR, a physical channel and an RS may be transmitted by beamforming. When beamforming-based signal transmission is supported, a beam management process may be performed to align beams between the BS and UE. Further, a signal proposed in the present disclosure may be transmitted/received by beamforming. In RRC_IDLE mode, beam alignment may be performed based on an SSB, whereas in RRC_CONNECTED mode, beam alignment may be performed based on a CSI-RS (in DL) and an SRS (in UL). When beamforming-based signal transmission is not supported, a beam-related operation may be skipped in the following description.

Referring to FIG. 17, the BS may periodically transmit an SSB (S1602). The SSB includes a PSS/SSS/PBCH. The SSB may be transmitted by beam sweeping. The PBCH may include an MIB, and the MIB may include scheduling information about remaining minimum system information (RMSI). Subsequently, the BS may transmit the RMSI and other system information (OSI) (S1604). The RMSI may include information (e.g., PRACH configuration information) required for the UE to initially access the BS. After performing SSB detection, the UE identifies the best SSB. The UE may transmit a RACH preamble (Message 1 (Msg1)) to the BS on a PRACH resource linked/corresponding to the index (i.e., beam) of the best SSB (S1606). The beam direction of the RACH preamble is associated with the PRACH resource. The association between the PRACH resource (and/or RACH preamble) and the SSB (index) may be configured by system information (e.g., RMSI). Subsequently, as a part of a random access procedure (or RACH procedure), the BS may transmit a random access response (RAR) (Msg2) in response to the RACH preamble (S1608), and the UE may transmit Msg3 (e.g., RRC Connection Request) using a UL grant in the RAR (S1610). The BS may transmit a contention resolution message (Msg4) (S1620). Msg4 may include an RRC Connection Setup message.

When an RRC connection is established between the BS and UE through the random access procedure (or RACH procedure), subsequent beam alignment may be performed based on an SSB/CSI-RS (in DL) and an SRS (in UL). For example, the UE may receive the SSB/CSI-RS (S1614). The UE may use the SSB/CSI-RS to generate a beam/CSI report. The BS may request the beam/CSI report to the UE by DCI (S1616). In this case, the UE may generate the beam/CSI report based on the SSB/CSI-RS, and transmit the generated beam/CSI report to the BS on a PUSCH/PUCCH (S1618). The beam/CSI report may include a beam measurement result, information about a preferred beam information, and so on. The BS and UE may switch beams based on the beam/CSI report (S1620a and S1620b).

Thereafter, the UE and BS may perform the above-described/proposed procedures and/or methods. For example, each of the UE and BS may transmit a radio signal by processing information stored in a memory or process a received radio signal and store the processed radio signal in the memory, based on configuration information obtained in the network access process (e.g., system information acquisition process, RRC connection process through an RACH, and so on). The radio signal may include at least one of a PDCCH, a PDSCH, or an RS on DL, and at least one of a PUCCH, a PUSCH, or an SRS on UL.

Basically, the above description may be commonly applied to MTC and NB-IoT. The parts that may be different in MTC and NB-IoT will be additionally described below.

MTC Network Access Process

An MTC network access process will be described based on LTE. The following description may be extended to NR as well. The PDCCH of FIG. 17 is replaced by an MPDCCH (see FIG. 9 and the related description).

In LTE, the MIB includes 10 reserved bits. For MTC, 5 most significant bits (MSBs) of the 10 reserved bits in the MIB are used to indicate scheduling information about a system information block for bandwidth reduced devices (SIB1-BR). The 5 MSBs are used to indicate the repetition number and transport block size (TBS) of SIB1-BR. SIB1-BR may be unchanged in 512 radio frames (5120 ms) to allow multiple subframes to be combined. The information carried in SIB1-BR is similar to that of SIB1 in the LTE system.

The random access procedure (or RACH procedure) in MTC is basically the same as the random access process (or RACH procedure) in LTE, but the following differences are present: The MTC random access procedure (or RACH procedure) is performed based on coverage enhancement (CE) levels. For example, whether the PRACH is repeated and/or how many times the PRACH is repeated may vary for each CE level to improve PRACH coverage. As described above with reference to Table 8, a mode supporting repeated signal transmission for coverage enhancement or extension is referred to as the CE mode, and the number of times that signal transmission is repeated for coverage enhancement or extension is referred to as the CE level. For example, as shown in Table 8, the first mode (e.g., CE mode A) is a mode for small coverage enhancement in which complete mobility and CSI feedback are supported. In the first mode, there may be no repetition or the number of repetitions may be set to be small. The second mode (e.g., CE mode B) is a mode for a UE in an extremely poor coverage environment in which mobility and CSI feedback are limited. In the second mode, the number of repetitions may be set large.

The BS broadcasts system information including a plurality of (e.g., three) reference signal received power (RSRP) threshold values, and the UE may determine the CE level by comparing an RSRP measurement value with the RSRP threshold values. For each CE level, the following information may be independently configured by system information.

PRACH resource information: the period/offset of a PRACH opportunity (opportunity) and PRACH frequency resources Preamble group: a preamble set allocated for each CE level The number of repetitions per preamble attempt and the maximum number of preamble attempts RAR window time: the length of a time period in which RAR reception is expected (e.g., the number of subframes)

Contention resolution window time: the length of a time period in which contention resolution message reception is expected After selecting a PRACH resource corresponding to the CE level of the UE, the UE may perform PRACH transmission based on the selected PRACH resource. The PRACH waveform used in MTC is the same as the PRACH waveform used in LTE (e.g., OFDM and Zadoff-Chu sequence). Signals/messages transmitted after the PRACH may also be repeatedly transmitted, and the number of repetitions may be configured independently depending on the CE mode/level.

NB-IoT Network Access Process

An NB-IoT network access process will be described based on LTE. The following description may be extended to NR as well. In NB-IoT, the PSS, SSS, and PBCH of FIG. 17 are replaced by an NPSS, NSSS and NPBCH, respectively. In addition, the PDCCH, PDSCH, PUSCH, and PRACH of 17 are replaced with an NPDCCH, NPDSCH, NPUSCH, and NPRACH, respectively.

The random access procedure (or RACH procedure) in NB-IOT is basically the same as the random access procedure (or RACH procedure) in LTE, but the following differences are present. First, RACH preamble formats are different. In LTE, the preamble is based on a code/sequence (e.g., Zadoff-Chu sequence), whereas in NB-IoT, the preamble is a subcarrier. Second, the NB-IoT random access procedure (or RACH procedure) is performed based on the CE level. Therefore, a different PRACH resource is allocated for each CE level. Third, since no SR resources are configured in NB-IoT, a UL resource allocation request is performed during the random access procedure (or RACH procedure) in NB-IoT.

Figure 18:
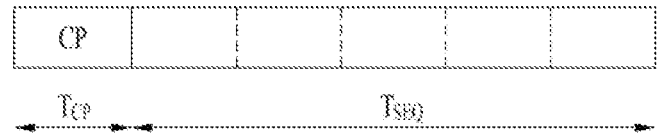
FIG. 18 illustrates random access channel (RACH) preamble transmission in NB-IoT.
Figure 18:
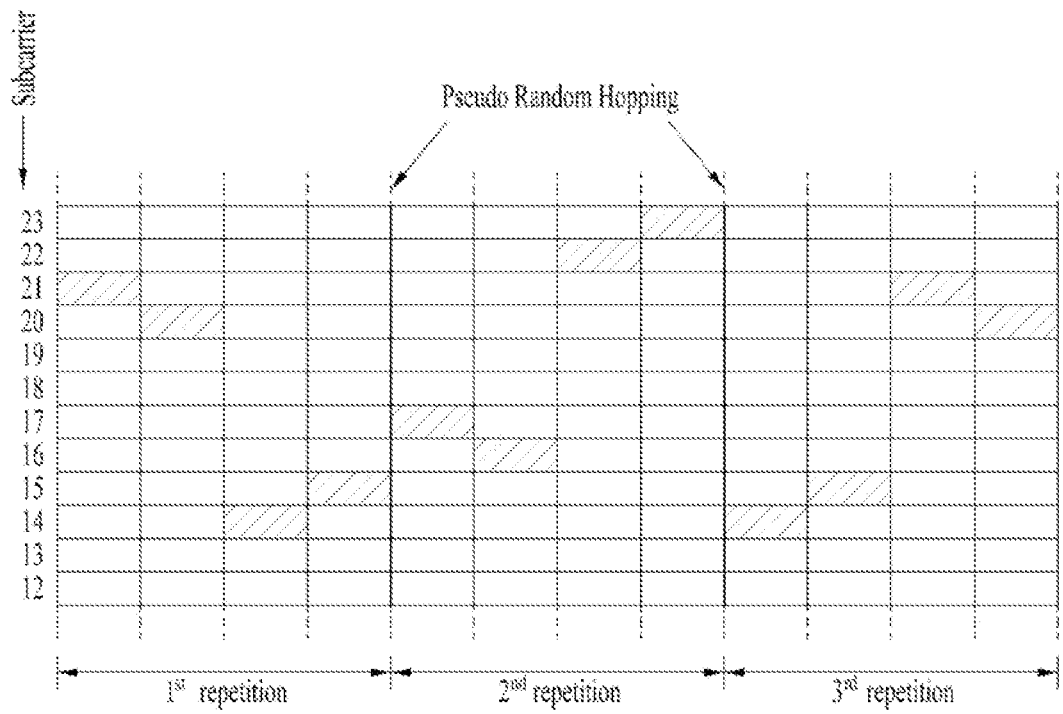

FIG. 18 illustrates RACH preamble transmission in NB-IoT.

Referring to FIG. 18, an NPRACH preamble may include four symbol groups, and each symbol group may include a CP and a plurality of (e.g., 5) SC-FDMA symbols. In NR, the SC-FDMA symbol may be replaced by an OFDM symbol or a DFT-s-OFDM symbol. An NPRACH supports only single-tone transmission with a subcarrier spacing of 3.75 kHz and provides CPs of 66.7 µs and 266.67 µs in length to support different cell radiuses. Frequency hopping is performed for each symbol group, and the following hopping pattern is used. A subcarrier carrying the first symbol group is determined in a pseudo-random manner. One subcarrier is hopped for the second symbol group, 6 subcarriers are hopped for the third symbol group, and one subcarrier is hopped for the fourth symbol group. For repeated transmission, the frequency hopping procedure is repeatedly applied. The NPRACH preamble may be repeatedly transmitted {1, 2, 4, 8, 16, 32, 64, 128} times for coverage enhancement. An NPRACH resource may be configured for each CE level. The UE may determine its CE level according to DL measurement results (e.g., RSRP), select the NPRACH resource based on the determined CE level, and then transmit the RACH preamble on the selected NPRACH resource. The NPRACH may be transmitted on an anchor carrier or a non-anchor carrier in which NPRACH resources are configured.

F. Discontinuous Reception (DRX) Operation

A UE may perform a DRX operation while performing the procedures and/or methods described/proposed in the present specification. A DRX configured UE may reduce power consumption by receiving a DL signal discontinuously. DRX may be performed in Radio Resource Control_IDLE (RRC_IDLE) state, RRC_INACTIVE STATE, or RRC_CONNECTED state.

RRC CONNECTED DRX

In RRC_CONNECTED state, DRX is used for discontinuous reception of PDCCH. For clarity, DRX performed in RRC_CONNECTED state will be referred to as RRC_CONNECTED DRX.

Figure 19:
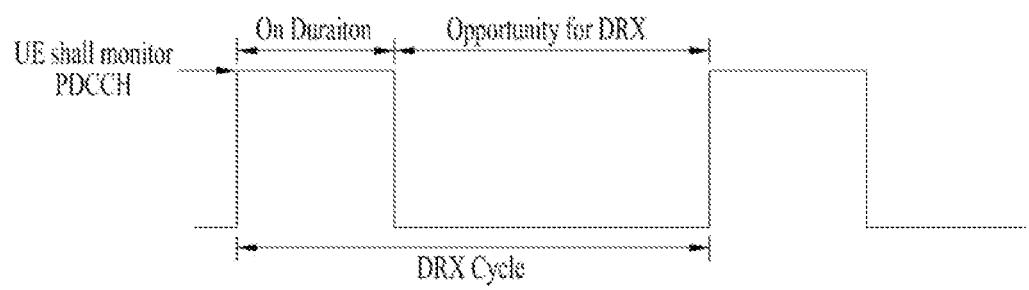
FIG. 19 illustrates a discontinuous reception (DRX) cycle for discontinuous reception of a physical downlink control channel (PDCCH).

FIG. 19 illustrates a DRX cycle for discontinuous reception of PDCCH.

Referring to FIG. 19, a DRX cycle is configured with On Duration and Opportunity for DRX. The DRX cycle defines a time interval in which the On Duration is repeated periodically. The On Duration refers to a time interval monitored by a UE to receive PDCCH (e.g., MPDCCH or NPDCCH). Once DRX is configured, a UE performs PDCCH monitoring for On Duration. If there is a PDCCH successfully detected for the PDCCH monitoring, the UE activates an inactivity timer and maintains an awake state. On the contrary, if there is no PDCCH successfully detected for the PDCCH monitoring, the UE enters a sleep mode after the end of the On Duration. Hence, in case that DRX is configured, PDCCH monitoring/reception may be performed discontinuously in time domain in performing the procedure and/or method described/proposed in the foregoing description. For example, in case that DRX is configured, PDCCH monitoring in the present disclosure may be performed discontinuously according to the DRX configuration in activated cell(s). Particularly, in case that a PDCCH occasion (e.g., a time interval (e.g., one or more continuous OFDM symbols) set to monitor PDCCH) corresponds to On Duration, PDCCH monitoring is performed. If a PDCCH occasion corresponds to Opportunity for DRX, PDCCH monitoring may be skipped. On the contrary, if DRX is not configured, PDCCH monitoring/reception may be performed continuously in time domain in performing the procedure and/or method described/proposed in the foregoing description. For example, if DRX is not configured, a PDCCH reception occasion may be configured continuously in the present disclosure. On the other hand, irrespective of presence or non-presence of DRX configuration, PDCCH monitoring may be restricted in a time interval set as a measurement gap.

RRC_IDLE DRX

DRX is used to receive a paging signal discontinuously in RRC_IDLE or RRC_INACTIVE state. For clarity, DRX performed in RRC_IDLE (or RRC_INACTIVE) state will be referred to as RRC_IDLE DRX. Hence, in case that DRX is configured, PDCCH monitoring/reception may be performed discontinuously in time domain in performing the procedure and/or method described/proposed in the present specification.

Figure 20:
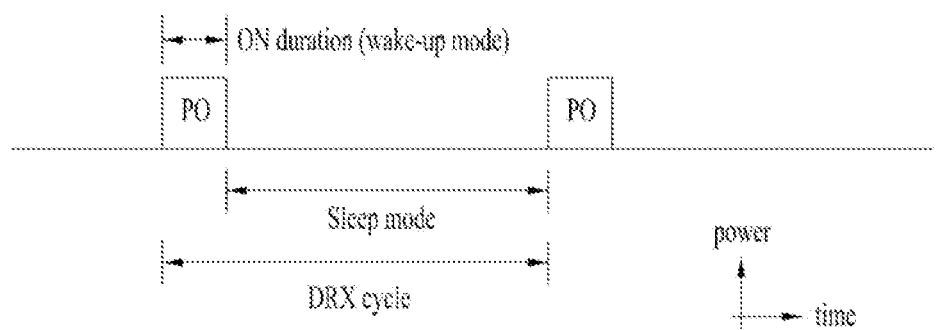
FIG. 20 illustrates a DRX cycle for paging.

FIG. 20 illustrates a DRX cycle for paging.

Referring to FIG. 20, DRX may be configured for discontinuous reception of a paging signal. A UE may receive DRX configuration information from a Base Station (BS) through higher layer (e.g., RRC) signaling. The DRX configuration information may include configuration information on a DRX cycle, a DRX offset, and a DRX timer, etc. The UE repeats On Duration and Sleep Duration. The UE may operate in wakeup mode for On Duration or operate in sleep mode for Sleep Duration. In the wakeup mode, the UE may monitor PO to receive a paging message. The PO means a time resource/interval (e.g., subframe, slot) for the UE to expect a reception of a paging message. The PO monitoring includes the monitoring of PDCCH (or, MPDCCH, NPDCCH) (referred to as paging PDCCH) scrambled with P-RNTI in PO. The paging message may be included in the paging PDCCH or PDSCH scheduled by the paging PDCCH. One or more PO(s) are included in a Paging Frame (PF), and the PF may be periodically configured based on UE ID. Here, the PF corresponds to a single radio frame, and the UE ID may be determined based on International Mobile Subscriber Identity (IMSI) of the UE. If DRX is configured, the UE monitors only a single PO per DRX cycle. In case of receiving a paging message indicating a change of ID and/or system information of its own in PO, the UE may perform an RACH process to initialize (or reset) connection with the BS or receive (or obtain) new system information from the BS. Hence, in performing the procedure and/or method described/proposed in the foregoing description, in order to perform RACH for the connection to the BS or receive (or obtain) new system information from the BS, PO monitoring may be performed discontinuously in time domain.

Figure 21:
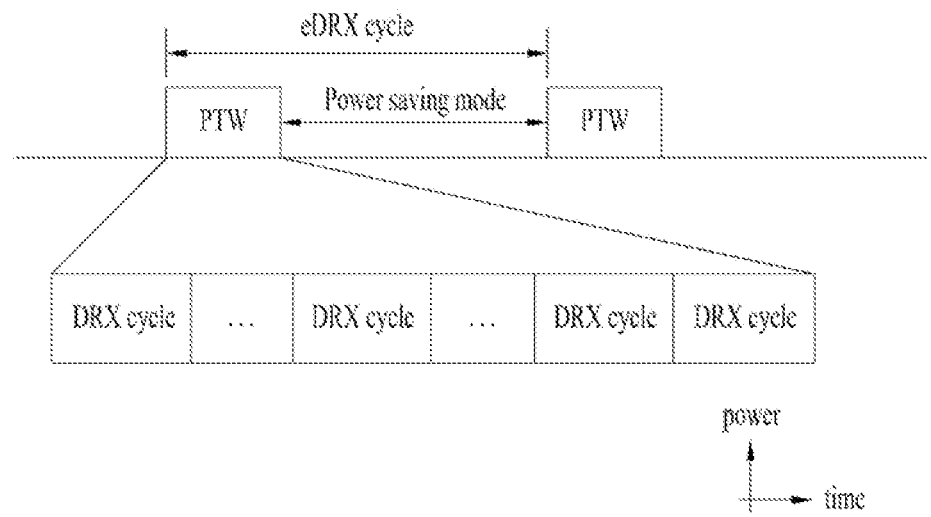
FIG. 21 illustrates an extended DRX (eDRX) cycle.

FIG. 21 illustrates an extended DRX (eDRX) cycle.

According to DRX cycle configuration, a maximum cycle duration may be limited to 2.56 seconds. Yet, In case of a UE that performs data transmission and reception intermittently like an MTC or NB-IoT UE, unnecessary power consumption may occur during a DRX cycle. To further reduce UE's power consumption, a scheme of greatly extending a DRX cycle based on a Power Saving Mode (PSM) and a Paging Time Window (PTW) has been introduced, and an extended DRX cycle is schematically referred to as an eDRX cycle. Particularly, Paging Hyper-frames (PH) are periodically configured based on UE ID, and PTW is defined in the PH. A UE may monitor a paging signal in a manner of switching to a wakeup mode in PO of its own by performing a DRX cycle in a PTW duration. In the PTW duration, one or more DRX cycles (e.g., a wakeup mode and a sleep mode) shown in FIG. 19 may be included. The number of DRX cycles in the PTW duration may be configured by a BS through a higher layer (e.g., RRC) signal.

G. Symbols, Abbreviations, and Terms

The following symbols/abbreviations/terms are used in this specification.

TB: Transport Block
Multi-TB: Multiple Transport Blocks
BD: Blind Decoding 또는 Blind Detection
CB: Code Block
CBG: Code Block Group
PDCCH: Physical Downlink Control Channel
NPDCCH: Narrowband Physical Downlink Control Channel
MPDCCH: MTC Physical Downlink Control Channel
PDSCH: Physical Downlink Shared Channel NPDSCH: Narrowband Physical Downlink Shared Channel
PUCCH: Physical Uplink Control Channel
PUSCH: Physical Uplink Shared Channel
NPUSCH: Narrowband Physical Uplink Shared Channel
DCI: Downlink Control Information H. Proposed Methods The above-described details (3GPP system, frame structure, MTC/NB-IoT system, etc.) may be applied in conjunction with the methods proposed in the present disclosure, which will be described later, or supplemented to clarify the technical characteristics of the methods proposed in the present disclosure.

An operation related to collision handling for multi-TB scheduling proposed in the present disclosure, which will be described later, may be applied in conjunction with either or both the above-described initial access (IA) procedure and random access (RA) procedure.

First, a description will be given of how the UE operates when the operation related to collision handling for multi-TB scheduling proposed in the present disclosure is performed in relation to the above-described IA procedure and RA procedure.

The UE may receive parameters (or control information) defined or configured to perform the methods proposed in the present disclosure from the BS (1) through signaling (e.g., DCI, MAC CE, RS, synchronization signal, etc.) received during the IA procedure (or the RA procedure included in the IA procedure) or (2) through signaling (e.g., DCI, MAC CE, RS, synchronization signal, RRC signaling, etc.) received in the RRC_CONNECTED state after the IA procedure (or the RA procedure included in the IA procedure).

The UE may perform the methods proposed in the present disclosure based on the received parameters after the IA procedure (or the RA procedure included in the IA procedure).

Next, a description will be given of how the BS operates.

The BS may (1) configure parameters (or control information) for performing the methods proposed in the present disclosure during the IA procedure (or the RA procedure included in the IA procedure) and transmit the configured parameters to the UE through specific signaling (e.g., DCI, MAC CE, RS, synchronization signal, etc.) or (2) configure the parameters (or control information) for performing the methods proposed in the present disclosure in the RRC_CONNECTED state after the IA procedure (or the RA procedure included in the IA procedure) and transmit the configured parameters to the UE through specific signaling (e.g., DCI, MAC CE, RS, synchronization signal, RRC signaling, etc.).

In addition, the BS may perform the methods proposed in the present disclosure based on the corresponding parameters after the IA procedure (or the RA procedure included in the IA procedure).

Second, a description will be given of how the UE and BS operates separately when the operation related to collision handling for multi-TB scheduling proposed by the present disclosure is performed in relation to the above-described procedure of receiving an NPDCCH (or MPDCCH) during the ON duration of a DRX cycle and transitioning to the RRC_CONNECTED state.

The following procedure may be performed independently or in relation to the above-described IA procedure and/or RA procedure.

When the following procedure is performed in relation with the above-described IA procedure and/or the RA procedure, cell (re)selection after transmission/reception of a paging message in DRX mode may be related to IA and/or RA performed by the UE or BS.

Hereinafter, how the UE operates will be described.

The UE may receive parameters (or control information) defined or configured to perform the methods proposed in the present disclosure from the BS (1) through signaling received for DRX operation (e.g., DCI, MAC CE, RS, synchronization signal, RRC signaling, etc.), (2) through a paging message, or (3) through RRC signaling in the RRC_CONNECTED state.

The UE may receive paging in the DRX mode based on the received parameters and perform the methods proposed in the present disclosure in the RRC_CONNECTED state.

Next, how the BS operates will be described.

After configuring parameters (or control information) for performing the methods proposed in the present disclosure through a DRX-related process, the BS may transmit the configured parameters to the UE (1) through specific signaling (e.g., DCI, MAC CE, RS, synchronization signal, RRC signaling, etc.), (2) through a paging message, or (3) through RRC signaling.

Thereafter, the BS may perform the methods proposed in the present disclosure after transmitting paging in the DRX mode based on the corresponding parameters.

However, the above-described operations are merely exemplary, and parameter configurations for performing the methods proposed in the present disclosure and UE/BS operations may be performed in relation to operations mentioned throughout this document.

The present disclosure proposes a method for solving a collision between a control or traffic channel and other signals or channels in a multi-TB scheduling transmission structure where transmission of a plurality of traffic channels is controlled by one control channel.

To reduce resource overhead of the BS and reduce power consumption of the UE, the multi-TB scheduling structure may be used. In the multi-TB scheduling structure, a plurality of TBs may be scheduled by one DCI. Here, the TB refers to a data transmission unit to be transmitted by the BS or UE, and one TB may include one or more CBs or CBGs.

When the multi-TB scheduling structure is used, the UE may obtain scheduling information about transmission of a plurality of TBs by acquiring one DCI. Then, the UE may perform transmission and reception by assuming information on transmission resources on which the TBs are transmitted and the encoding format thereof based on the scheduling information. That is, the BS may provide scheduling information about transmission of a plurality of TBs to the UE through one DCI and perform transmission and reception by determining transmission resources on which the TBs are transmitted and the encoding format thereof based on the scheduling information.

Figure 22:
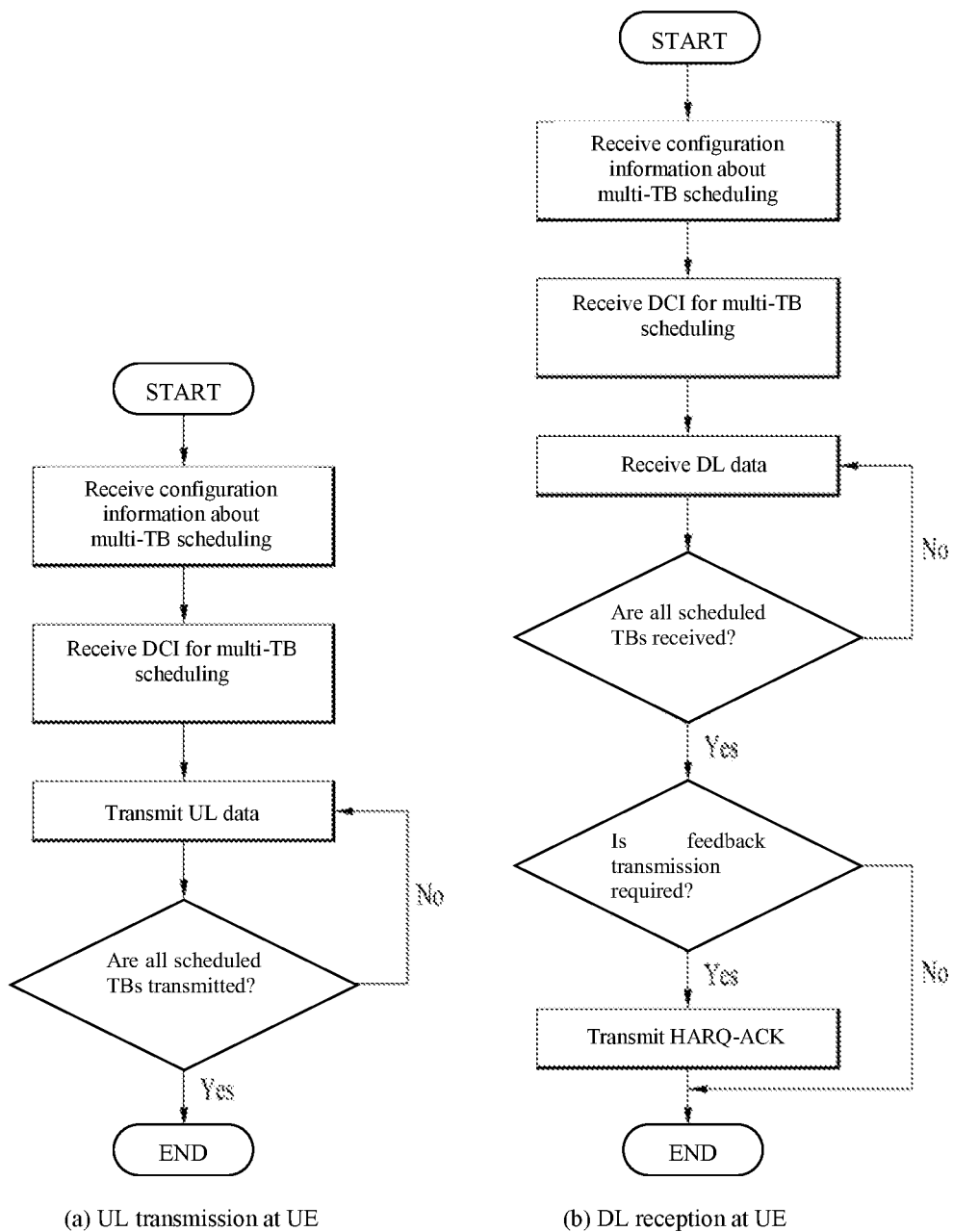
FIG. 22 illustrates operation sequences of uplink (UL) transmission and downlink (DL) reception at a user equipment (UE) supporting a multi-transport block (TB) scheduling structure.
Figure 23:
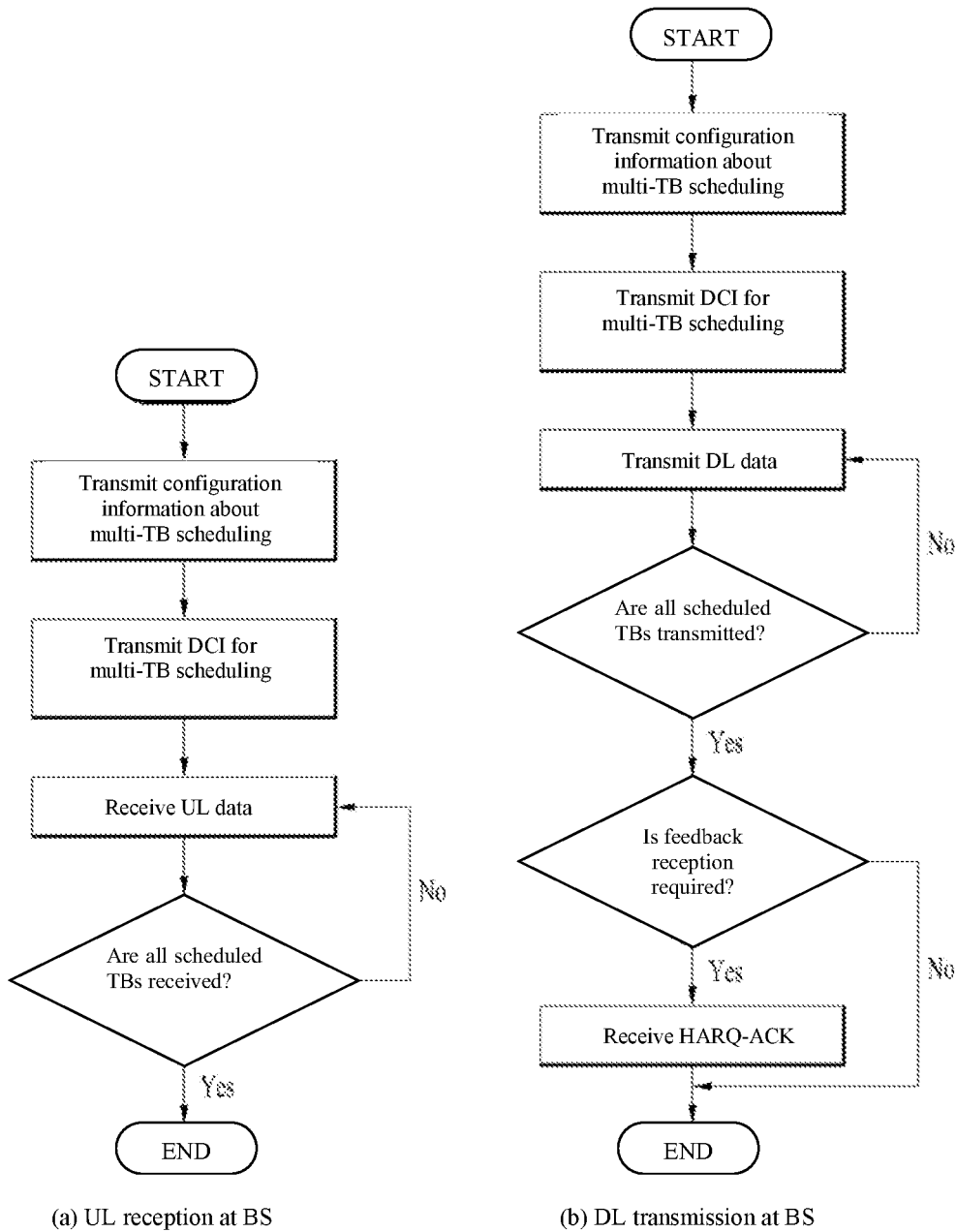
FIG. 23 illustrates operation sequences of UL reception and DL transmission at a base station (BS) supporting a multi-TB scheduling structure.
Figure 24:
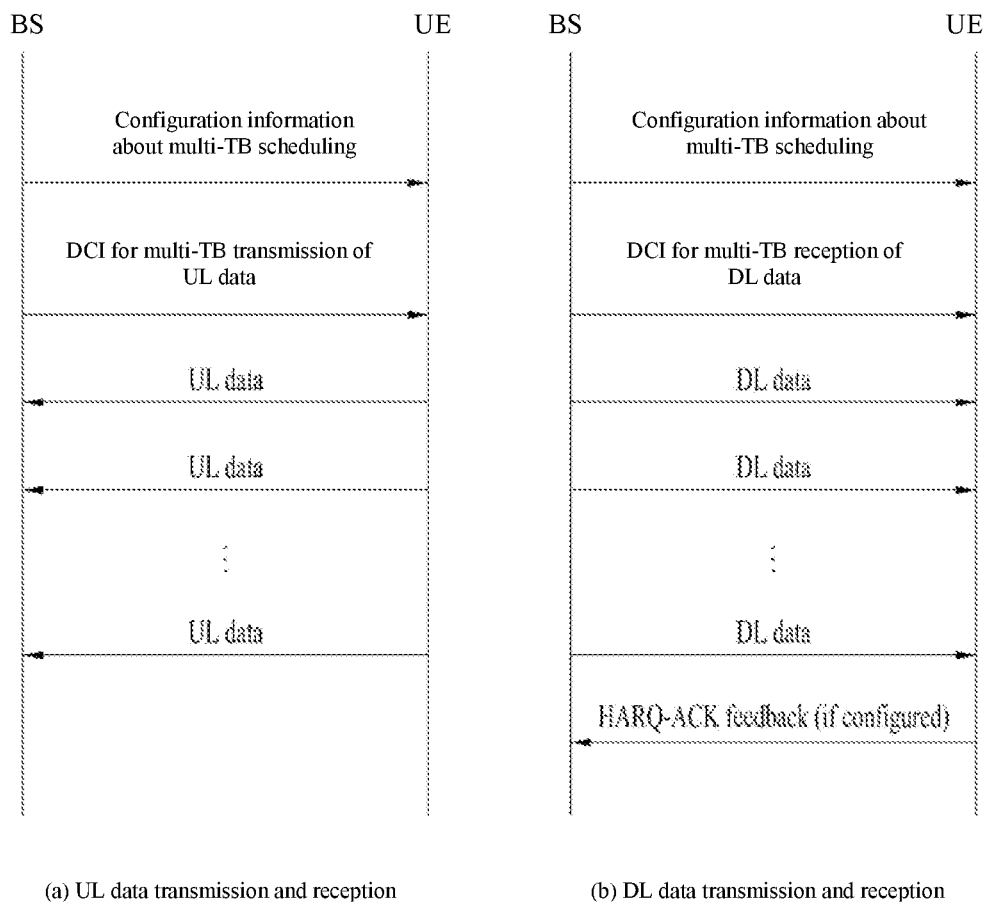
FIG. 24 illustrates an interaction process between a UE and a BS.

FIG. 22 illustrates operation sequences of UL transmission and DL reception at a UE supporting the multi-TB scheduling structure. FIG. 23 illustrates operation sequences of UL reception and DL transmission at a BS supporting the multi-TB scheduling structure. FIG. 24 illustrates an interaction process between the UE and the BS.

Multi-TB scheduling requires a large transmission resource region in the time/frequency domain, compared to single-TB scheduling (e.g., a structure in which the UE acquires scheduling information about one TB through one DCI). In addition, it may be difficult to adaptively reconfigure the transmission resource region once the corresponding transmission resource region is configured by DCI. Thus, in the multi-TB scheduling structure, collision and overlap problems where the transmission resource region overlaps with those for transmission of other signals/channels may occur more frequently, compared to the single-TB scheduling structure.

The present disclosure proposes methods for solving the collision and overlap problems in the multi-TB scheduling structure.

In addition to or independently of the collision and overlap problems, when the multi-TB scheduling is applied, the locations of transmission resources in the time/frequency domain for transmitting a plurality of TBs need to be agreed between the BS and UE. As described above, if the transmission locations of a plurality of TBs are prefixed by DCI or higher layer signaling, there may be collisions and overlaps with other signals/channels. To avoid such a problem, a method of increasing the flexibility of the TB transmission structure based on configuration information through DCI or higher layer signaling may be considered, but this method may increase resource overhead and increase the complexity of the BS and UE.

The present disclosure provides not only methods of determining TB transmission locations that may be equally recognized by both the BS and UE in the multi-TB scheduling structure but also methods of overcoming restrictions on TB transmission caused by the collision and overlap problems.

Figure 25:
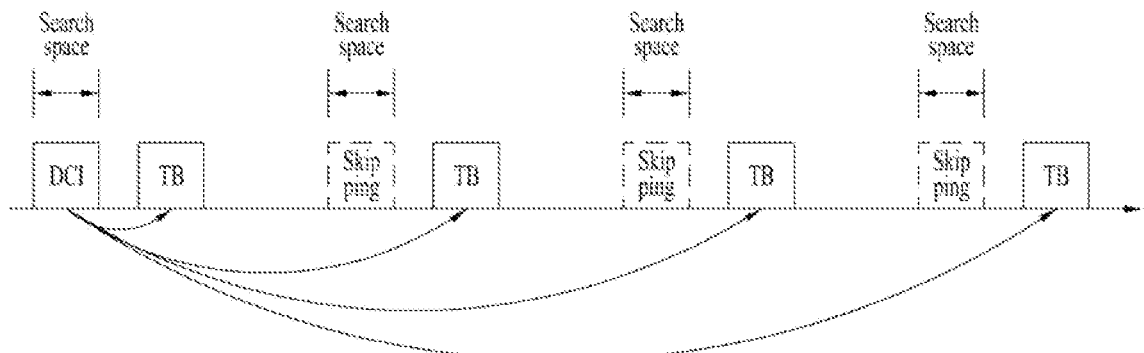
FIG. 25 illustrates methods for operating multi-TB scheduling
Figure 25:
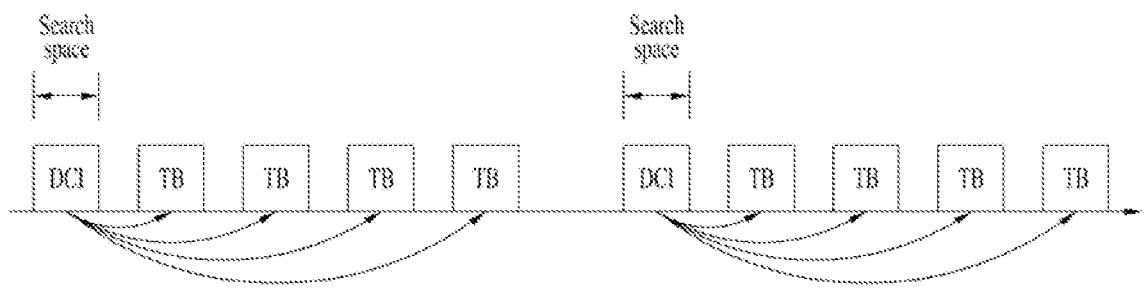
Figure 25:
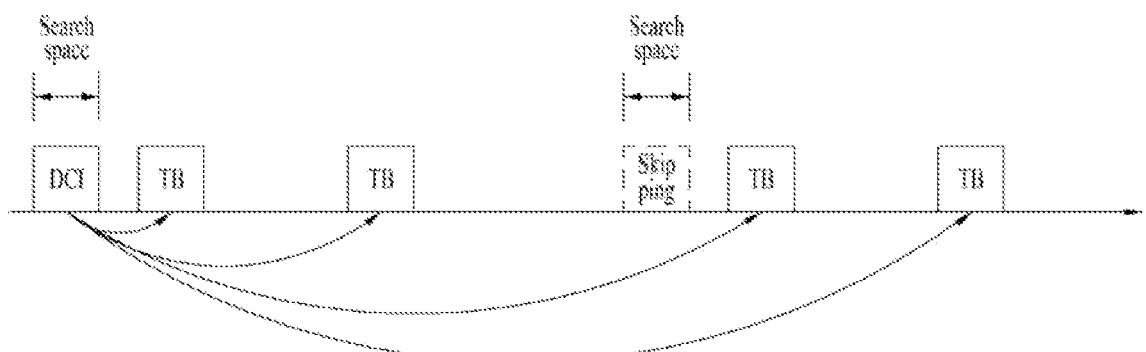

For the multi-TB scheduling proposed in the present disclosure, one of the methods listed below may be performed. FIG. 25 illustrates the listed methods.

(1) DCI skipping: When the UE acquires DCI in a search space at a specific location, the UE may expect that a scheduled TB will be transmitted in the corresponding search space, and at the same time expect that TBs will be transmitted in a plurality of search spaces appearing thereafter, without DCI decoding. For example, as shown in FIG. 25(a), the UE may be scheduled with transmission of TBs in a plurality of search spaces by one DCI, and in this case, the UE may skip additional monitoring of the search spaces related to the scheduled TBs.

(2) One-to-N mapping DCI: When one DCI is related to one or more TBs, scheduling may be performed such that one DCI is related to one TB. For example, as illustrated in FIG. 25(b), the UE is scheduled with transmission of a plurality of TBs in a corresponding search space by one DCI.

(3) Combination of DCI skipping and one-to-N mapping DCI: The above two methods may be combined. For example, as shown in FIG. 25(c), one DCI may schedule a plurality of corresponding TBs. Specifically, the UE may be scheduled with transmission of a plurality of TBs in a plurality of search spaces by one DCI and, in this case, the UE may skip additional monitoring of the search spaces related to the scheduled TBs.

Although the methods proposed in the present disclosure will be described based on NB-IoT operations for convenience of description, it is apparent that the methods are applicable to various communication systems using the multi-TB scheduling structure (e.g., LTE, MTC, NR, etc.) in the same/similar way. In this document, terms such as a symbol, a slot, a subframe, etc. are used to refer to a time-domain transmission/reception unit for a signal or channel in a specific environment. It is obvious that the unit may be replaced by another transmission/reception unit according to the characteristics of a communication system to which the methods proposed in the present disclosure are applicable.

Although each of the methods proposed in the present disclosure may be applied as an independent method, it is apparent that one or more methods may be used in combination.

H.1 Collision between Search Space Skipping and Other Signals/Channels

In section H.1, methods of solving a problem that a search space to be skipped collides with transmission of signals/channels for other purposes when the DCI skipping structure is used in the multi-TB scheduling will be described. While the proposed methods will be described based on the multi-TB scheduling based on the DCI skipping scheme, the methods may also be applicable other multi-TB scheduling methods as long as the spirit of the disclosure is not violated. For example, the proposed methods may be applied even when the one-to-N DCI mapping scheme is used.

According to the multi-TB scheduling method based on the DCI skipping scheme, since it is possible to share search spaces and TBs used by UEs having no multi-TB scheduling capability, i.e., UEs operating in single-TB scheduling mode, UE power saving may be achieved without an increase in resource overhead. In addition, when TB(s) scheduled by one-to-N mapping DCI are configured to be shared with TB(s) expected by the UE operating in the single-TB scheduling mode, the overhead reduction (saving) expected by the DCI skipping method may be achieved. Therefore, both overhead reduction to decrease unnecessary transmission at the BS and power reduction to decrease unnecessary decoding at the UE need be considered in the design of the multi-TB scheduling.

In the multi-TB scheduling, a search space to be monitored by the UE may collide with signals/channels for other purposes in terms of transmission resource locations. If such a signal/channel has a higher priority than the search space, the search space may be dropped. That is, the BS may transmit no DCI in the search space, and the UE may expect no DCI reception in the search space.

The present disclosure proposes how the UE assumes TB transmission in a dropped search space in the case of the multi-TB scheduling based on the DCI skipping or one-to-N mapping when the above problem occurs. Hereinafter, the present disclosure is described on the assumption of the DCI skipping scheme, but the description is equally applicable to the one-to-N mapping scheme even if there is no explanation.

[Method H.1-1]

In the multi-TB scheduling using the DCI skipping scheme, even when DCI transmission/reception is dropped in a specific search space, the UE may expect TB transmission if the UE already obtains DCI before and if the search space of the dropped DCI is related to the DCI skipping. If the UE acquires DCI in the specific search space, the UE may always expect scheduling of TBs in a plurality of search spaces appearing after the search space, regardless of whether the search space is dropped. In this case, even if the BS does not perform (or is incapable of performing) DCI transmission in a search space at a specific location, the BS may perform TB transmission related thereto.

When the multi-TB scheduling based on the one-to-N mapping scheme is used, if DCI is dropped at the location of a search space where single-TB scheduling DCI is capable of being transmitted, the above method may be applied. For example, if the UE already obtains the multi-TB scheduling DCI before, the UE may be configured to expect TB transmission regardless of whether other DCIs scheduling the same TB are dropped.

[Method H.1-2]

When DCI transmission in a specific search space is dropped due to transmission of signals/channels with other purposes and higher priorities, if the UE uses the conventional single-TB scheduling scheme, the UE may not receive scheduling information about a TB related to the dropped DCI. Therefore, for the single-TB scheduling scheme, it may be advantageous that the BS does not transmit the TB related to the dropped DCI in terms of resource overhead saving.

However, as described in [Method H.1-1], if the BS transmits the TB related to the dropped DCI for only a UE with multi-TB scheduling capability, the BS needs to transmit the same TB again for a UE without the multi-TB scheduling capability, which may cause an increase in resource overhead. In order to prevent such a problem, when DCI transmission/reception is dropped in a specific search space, if the UE uses the multi-TB scheduling based on the DCI skipping scheme, the UE may be configured expect no TB transmission in the corresponding search space. Alternatively, when the UE uses the multi-TB scheduling based on the one-to-N mapping DCI scheme, if single-TB scheduling DCI capable of equally scheduling a specific TB is dropped, the UE may be configured not to expect transmission of the corresponding TB. In this case, if the UE acquires DCI in the specific search space, the UE may expect scheduling of TBs in a plurality of search spaces appearing after the specific search space unless the search space is dropped. Even if the BS transmit no DCI in a search space at a specific location, the BS may transmits a TB related thereto. However, when DCI transmission is dropped, the BS may not transmit the TB.

Figure 26:
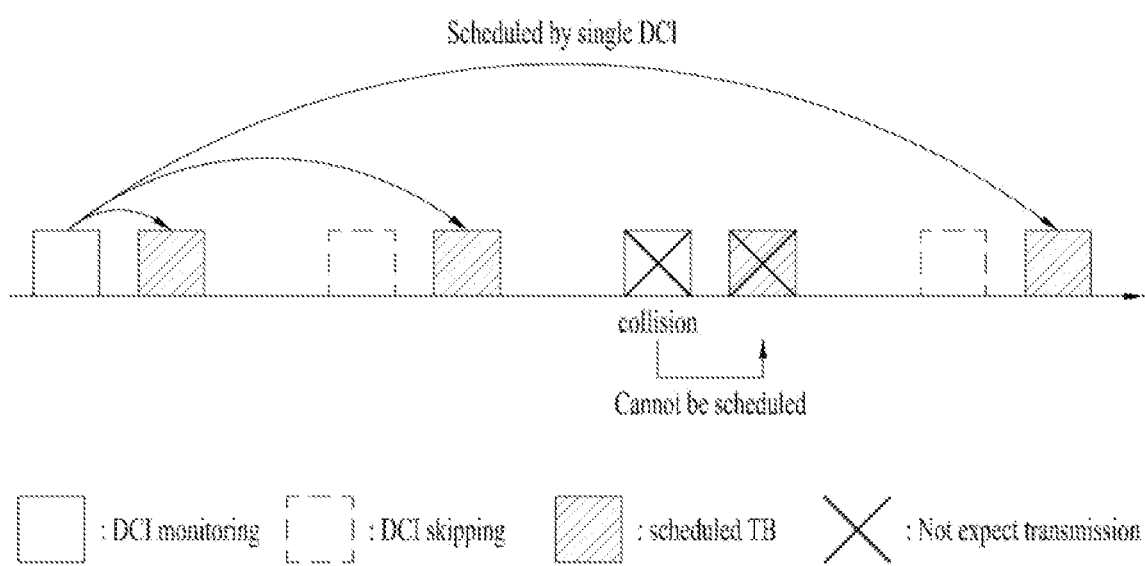
FIG. 26 illustrates a method proposed in the present disclosure.

FIG. 26 schematically illustrates an example of the proposed method.

Referring to FIG. 26, when [Method H.1-2] proposed above is used and the UE is scheduled with N TBs by one DCI, the location of a TB expected not to be transmitted due to dropped DCI may not be reflected in calculation of the size of N. This is advantageous in that the number of TBs that the UE may acquire is always maintained to be the same so that the gain due to the multi-TB scheduling may be preserved. On the contrary, the location of a TB expected not to be transmitted due to dropped DCI may be reflected in calculation of the size of N. The reason for this is to constantly fix a time that the BS should wait for to monitor next DCI after acquiring one DCI. In this case, the UE may update scheduling information about TBs at regular intervals. For example, when change notification information such as Single Cell Point To Multipoint (SC-PTM) is included in DCI, the UE may need to check the change notification information at regular intervals.

In the proposed methods, system information that should be transmitted periodically with no separate control channels such as an SIB may be considered as an example of signals/channels with other purposes and higher priorities. In particular, the proposed methods may be limitedly applied when a physical channel to be transmitted in a search space is dropped due to a collision with a specific signal/channel. If a postpone rule is used, the proposed methods may not be applied.

In the proposed methods, DCI may be limitedly dropped when the entirety of a search space for transmitting the DCI becomes unavailable due to transmission of another signal/channel having a higher priority, which may be equally recognized by both the UE and BS. The reason for this is not to start the DCI skipping by transmitting DCI in a non-dropped search space if a part of the search space is available or to perform TB transmission for UEs using the single-TB scheduling. Alternatively, DCI may be limitedly dropped when the ratio of an unavailable part of a search space for transmitting the DCI to the entirety thereof becomes more than or equal to a predetermined ratio due to transmission of another signal/channel having a higher priority, which may be equally recognized by both the UE and BS. The reason for this is to allow DCI transmission in an non-dropped search space if a part of the search space is available and to prevent degradation of DCI decoding performance if the unavailable part increases more than or equal to the predetermined ratio.

In the proposed methods, when the DCI skipping is used, a search space for determining DCI dropping may be a search space in which both the UE using the multi-TB scheduling and the UE using the single-TB scheduling expect DCI. On the other hand, when the one-to-N mapping is used, the search space for determining the DCI dropping may be limited to a search space in which only the UE using the single-TB scheduling expects DCI.

H.2 Determination of Resource Allocation for Scheduled TB

The present disclosure proposes methods of determining resource allocation of a scheduled TB corresponding to each search space when the multi-TB scheduling is based on the DCI skipping. The proposed methods will be described on the assumption of the multi-TB scheduling based on the DCI skipping, but it is obvious that the proposed methods are applicable to other multi-TB scheduling methods as long as the principles of the proposed methods are not violated. For example, the proposed methods may be applied even when the one-to-N DCI mapping scheme is used.

When the multi-TB scheduling based on the DCI skipping scheme is used, the UE may use information in acquired DCI to simultaneously obtain configuration information about a TB related to the corresponding DCI and configuration information about TBs related to a plurality of subsequent search spaces. In this case, if the DCI includes configuration information about all of the plurality of TBs, the following disadvantages are present: (1) an operation of sharing legacy DCI to support a UE with single-TB capability (single-TB capable or single-TB capability UE) becomes impossible and (2) the DCI size increases even when new DCI for a UE having multi-TB capability (multi-TB capable or multi-TB capability UE) is introduced. In this regard, if the multi-TB scheduling based on the DCI skipping scheme is used, each DCI includes only configuration information about one TB related to a transmitted search space. In addition, the UE may be configured to recognize information about additional TB transmission based on information included in decoded DCI and other additional information.

For some of the information provided by DCI, it may be difficult to apply the same value to a plurality of TBs. For example, a problem related to scheduling of TB transmission locations in NB-IoT may be considered. In NB-IoT, the starting subframe position of a NPDSCH/NPUSCH scheduled by DCI may be determined by the ending subframe position of an NPDCCH used for DCI transmission and a scheduling delay value included in the DCI. In this case, the transmission location of the NPDCCH carrying the DCI is determined as one of search space candidates, and the BS may dynamically determine available search space candidates according to the availability of resources and the radio channel environment.

Figure 27:
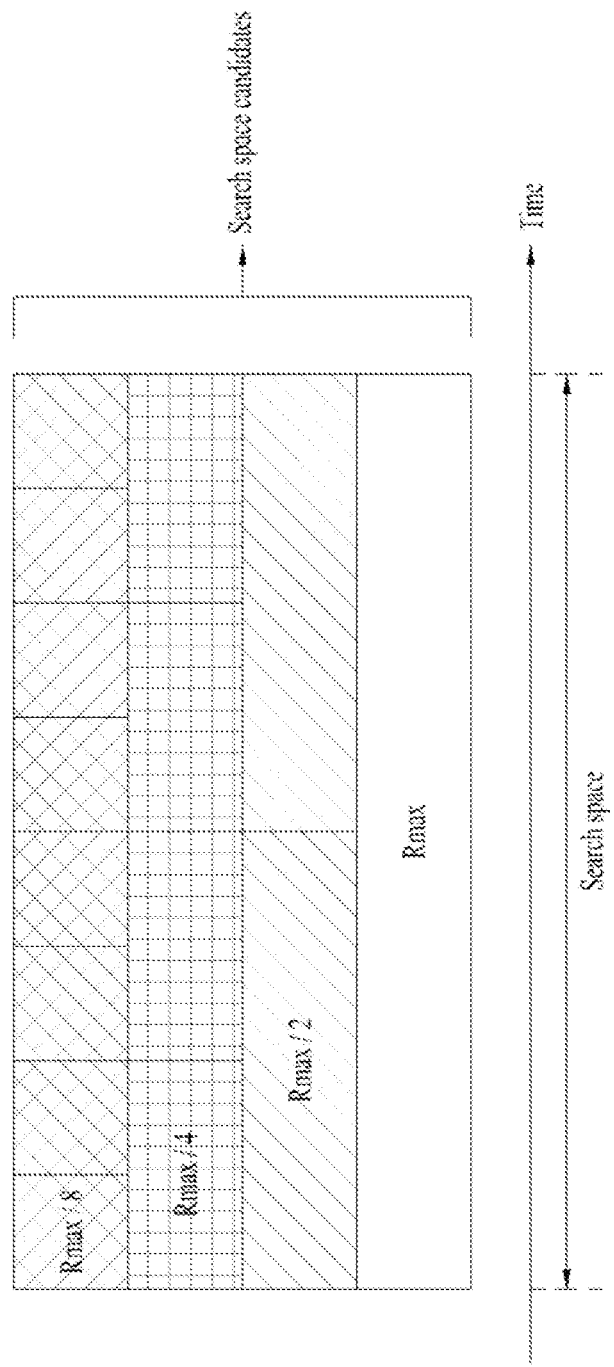
FIG. 27 illustrates a search space and search space candidates.

FIG. 27 schematically illustrates search space candidates used to transmit DCI masked with a group radio network temporary identifier (group RNTI or G-RNTI) in NB-IoT. In the example of FIG. 27, each block corresponds to a search space candidate, and Rmax denotes the maximum subframe level repetition available for transmission. As shown in the example of FIG. 27, the ending subframe of an NPDCCH may vary according to the search space candidate selected by the BS. In addition, according to the current specifications, a scheduling delay value may also be dynamically determined for each DCI transmission. In consideration of such a structure, a prescribed rule may be required for the UE performing the multi-TB scheduling based on DCI skipping scheme to acquire scheduling information about a plurality of TBs from one DCI.

In addition, it may be considered that TB(s) scheduled by the one-to-N mapping DCI scheme are shared with TB(s) scheduled by single-TB scheduling DCI. In this case, the transmission location of the TB designated by the single-TB scheduling DCI may vary depending on the situation. Specifically, the same TB location may be scheduled in different search spaces. Thus, a prescribed rule may be required so that the transmission locations of TBs expected by the UE using the one-to-N mapping DCI scheme are well shared with the transmission locations of TBs scheduled by the single-TB scheduling DCI.

[Method H.2-1]

When the multi-TB scheduling based on the DCI skipping scheme is applied, the same search space candidates may be used during a period in which the DCI skipping is maintained in order to provide scheduling information about a plurality of TBs, and at the same time, the same scheduling delay for TB transmission may be applied at all times. In this case, the UE may assume that the same search space candidates are always fixed and used while performing the DCI skipping after decoding one DCI. In addition, the BS may instruct the UE to fix and use the same search space candidates in a period in which the UE may maintain the DCI skipping. In this case, the same search space candidates mean search space candidates having the same size and the same relative position within a search space.

Figure 28:
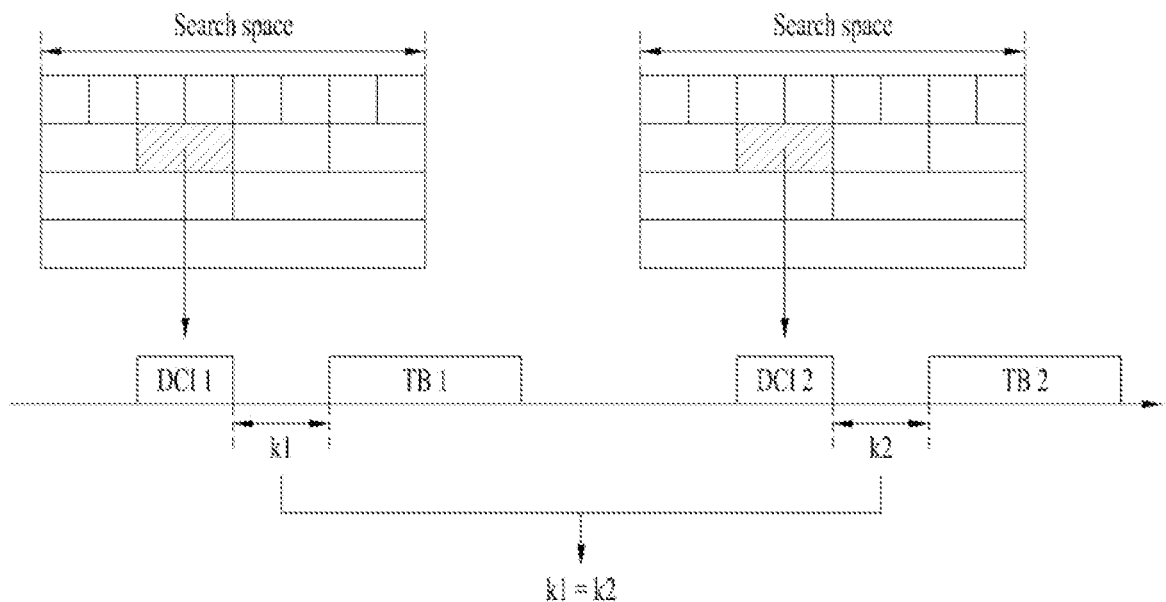
FIGS. 28 to 34 illustrate methods proposed in the present disclosure.

FIG. 28 schematically illustrates an example of the proposed method. Specifically, the example of FIG. 28 shows a method of transmitting DCI using the same search space candidates in two adjacent search spaces and maintaining the same scheduling delay from the ending subframe of each search space candidate to the starting subframe of each TB. For example, referring to FIG. 28, based on that DCI (e.g., DCI 1) is received through a specific search space candidate (e.g., hatched search space candidate) among search spaces for multi-TB scheduling, the starting position (e.g., starting subframe) of a TB (e.g., TB 1) may be determined based on the ending position (e.g., ending subframe) of the specific search space candidate and a scheduling delay (e.g., k1), and the specific search space candidate and the scheduling delay may be equally applied to determination of the starting position (e.g., starting subframe) of a next TB (e.g., TB 2). Thus, the starting position (e.g., starting subframe) of the next TB (e.g., TB 2) may be determined based on the ending position (e.g., ending subframe) of the same specific search space candidate (e.g., hatched search space candidate), which is used to determine the starting position (e.g., starting subframe) of the previous TB (e.g., TB 1), and a scheduling delay (e.g., k2). In this case, the scheduling delay (e.g., k2) for the next TB (e.g., TB 2) may have the same value as the scheduling delay (e.g., k1) for the previous TB (e.g., TB 1).

In the proposed method, the used search space candidate is not predetermined but may be determined by the UE through blind decoding (BD). This method has an advantage in that if the used search space candidate is allowed to be changed, the BS may change the search space candidate depending on the situation without additional signaling overhead. Alternatively, the used search space candidate may be designated by the BS and signaled during the configuration of the multi-TB scheduling. For example, when the multi-TB scheduling is used for transmission of a single-cell multicast traffic channel (SC-MTCH), information about search space candidates of DCI for the SC-MTCH may be configured based on a single-cell multicast control channel (SC-MCCH). This has advantages of not only reducing the power consumption of the UE, which results from the BD, but also ensuring the flexibility of the BS. Alternatively, the used search space candidate may be defined in the specifications. This method has advantages of reducing the signaling overhead of the BS and the power consumption of the UE due to the BD, instead of giving up scheduling flexibility for selecting a search space candidate.

In the proposed method, the used scheduling delay value may be obtained by the UE through DCI decoding. When the BS is capable of adjusting the transmission location of the TB, the scheduling flexibility may be improved if the above operation is allowed. Alternatively, the used scheduling delay value may be designated by the BS and signaled during the configuration of the multi-TB scheduling. For example, when the multi-TB scheduling is used for transmission of an SC-MTCH, information about a scheduling delay for the SC-MTCH may be configured based on an SC-MCCH. In this case, the UE may use a predetermined scheduling delay value as side information during the DCI decoding, thereby improving the decoding performance. Alternatively, the used scheduling delay value may be defined in the specifications. This method has advantages of reducing the signaling overhead of the BS and improving the decoding performance of the UE, instead of giving up the scheduling flexibility capable of adjusting a scheduling delay.

[Method H.2-1] proposed in the present disclosure and additional details thereof may be applied to reduce the power consumption of the UE due to the BD when the UE needs to monitor a plurality of search space candidates. For example, when the UE is capable of recognizing by [Method H.2-1] that a specific search space candidate (or search space candidate group) is to be used among a plurality of search space candidates to be monitored, the UE may monitor only target search space candidates, thereby avoiding unnecessary BD. Such an application scheme may be applied to both the multi-TB scheduling and the single-TB scheduling.

[Method H.2-1-a]

In the methods proposed in [Method H.2-1], a scheduling restriction situation may occur. The scheduling restriction situation means that a search space candidate, which is fixed based on the situation, is not suitable for transmission and reception of DCI. For example, the fixed search space candidate may be dropped due to a collision with the transmission position of another signal/channel having a higher priority at a specific time. In this case, it may be considered that the methods proposed in section H.1 are applied for each search space candidate. For example, it may be assumed that no TB is transmitted in a corresponding search space candidate. Alternatively, the transmission location of a TB may be always determined based on a fixed search space candidate and a scheduling delay, regardless of whether DCI is transmitted due to a collision. This has advantages of reducing complexity by simplifying the operations of the BS and UE.

[Method H.2-1-b]

In the methods proposed in [Method H.2-1], despite of the occurrence of a scheduling restriction situation where a fixed search space candidate is not suitable for transmission and reception of DCI, UEs operating based on the single-TB scheduling scheme may have available search space candidates. In this case, if no DCI is transmitted in a corresponding search space in consideration of only UEs supporting the multi-TB scheduling scheme, the UEs using the conventional single-TB scheduling scheme lose their scheduling opportunities. On the other hand, if any search space candidate is used other than the fixed search space candidate for the UEs operating based on the single-TB scheduling scheme, the UEs supporting the multi-TB scheduling scheme may not recognize the transmission location of a TB related to the search space.

Accordingly, when the fixed search space candidate is not suitable for DCI transmission and reception, another search space candidate may be reselected according to a predetermined rule. In this case, the same scheduling delay may be maintained between the size of the reselected search space candidate (e.g., the repetition level of the search space candidate) and the TB. For example, the reselected search space candidate may be determined as a search space candidate closest to the fixed search space candidate among search space candidates which are capable of DCI transmission and reception located after (or before) the fixed search space candidate.

Figure 29:
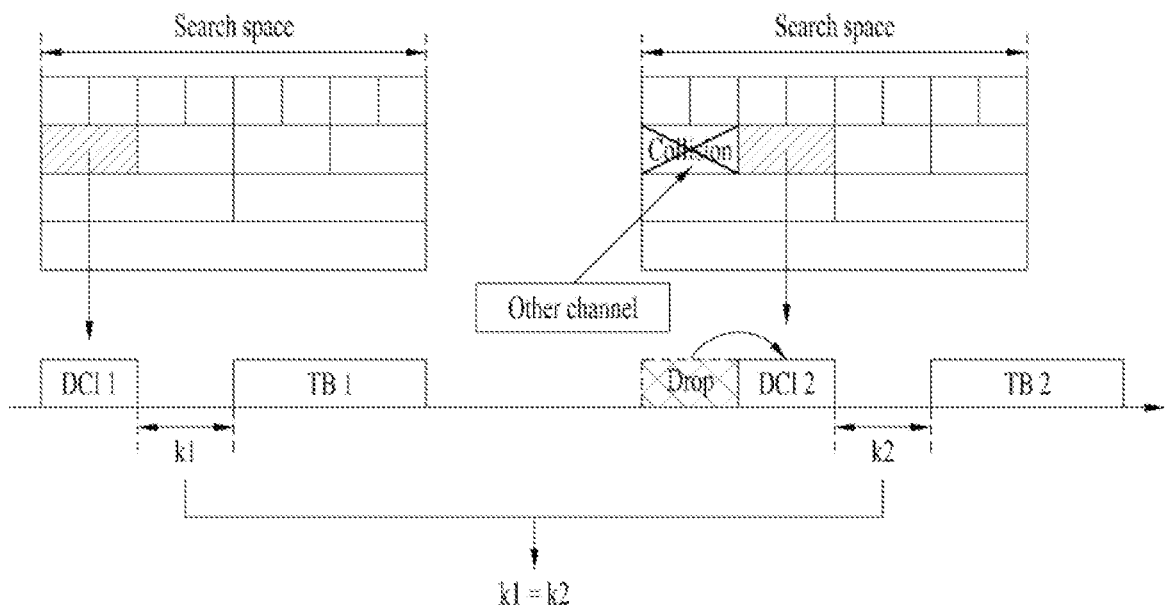

FIG. 29 schematically illustrates an example of the proposed method. For example, referring to FIG. 29, the starting positions of TBs (e.g., DCI 1 and DCI 2) may be determined based on the same search space candidate and the same scheduling delay according to [Method H.2-1]. However, when the same search space candidate (or DCI) is dropped due to a collision with another signal/channel, the starting positions (e.g., starting subframes) of the TBs may be determined based on the ending position (e.g., ending subframe) of a search space candidate adjacent to the same search space candidate (e.g., the adjacent search space candidate may be located after or before the same search space) and the same scheduling delay.

In the proposed method, a search space candidate used after search space candidate reselection due to DCI drop may be restored to a fixed search space candidate, which has been used before the occurrence of a collision. The reason for this is that if the used search space candidate is defined in the specifications or is signaled and determined during the configuration of the multi-TB scheduling, the search space candidate needs to be maintained at a location where no DCI is dropped.

Alternatively, in the proposed method, a search space candidate used after search space candidate reselection due to DCI drop may be maintained as a reselected search space candidate. The reason for this is that when the search space candidate is not predetermined but is detected by the UE through BD, the search space candidate needs to be matched between a UE obtaining DCI at a location where the collision occurs and a UE already performing the DCI skipping.

[Method H.2-1-c]

In the methods proposed in [Method H.2-1], the BS may be allowed to transmit DCI in a random search space candidate other than a fixed search space candidate at the occurrence of a scheduling restriction situation where the fixed search space candidate is not suitable for DCI transmission and reception. In this case, a scheduling delay value included in the transmitted DCI may be different from a previously used value. The UE may perform BD on all search space candidates in the search space to find a location where the DCI is to be transmitted. According to this method, when a search space candidate for DCI transmission is dropped, the BS may dynamically select a suitable search space candidate.

Figure 30:
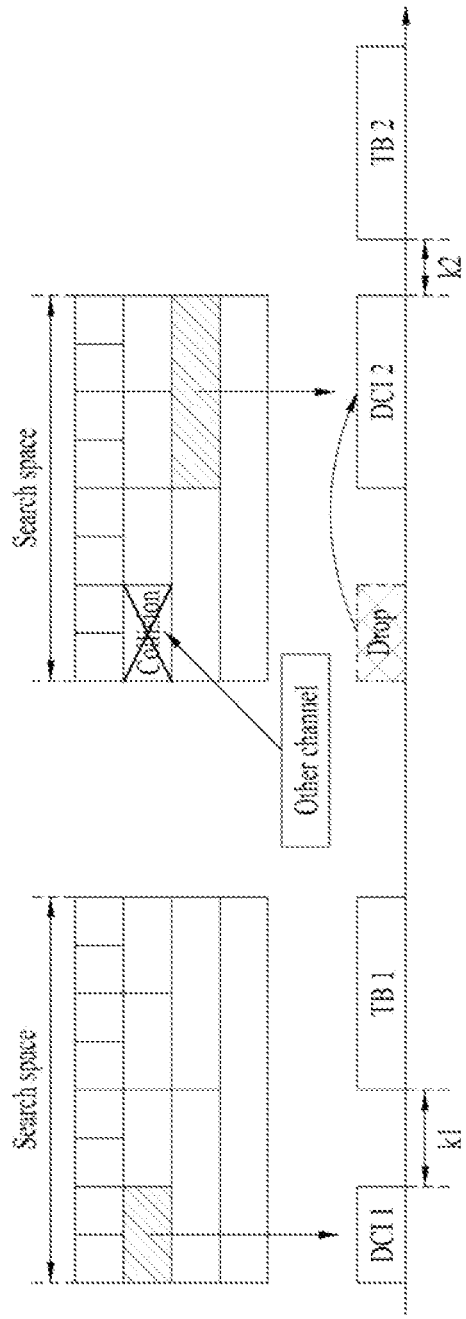

FIG. 30 schematically illustrates an example of the proposed method. For example, referring to FIG. 30, the starting positions of TBs (e.g., DCI 1 and DCI 2) may be determined based on the same search space candidate and the same scheduling delay (e.g., k1 and k2) according to [Method H.2-1]. However, when the same search space candidate (or DCI) is dropped due to a collision with another signal/channel, the starting positions (e.g., starting subframes) of the TBs may be determined based on the ending position (e.g., ending subframe) of a search space candidate (e.g., hatched search space candidate in the right search space of FIG. 30) within a search space related to the TBs other than the same search space candidate and the same scheduling delay.

In the proposed method, a search space candidate used after search space candidate reselection due to DCI drop may be restored to a fixed search space candidate, which has been used before the occurrence of a collision. The reason for this is that if the used search space candidate is defined in the specifications or is signaled and determined during the configuration of the multi-TB scheduling, the search space candidate needs to be maintained at a location where no DCI is dropped.

Alternatively, in the proposed method, a search space candidate used after search space candidate reselection due to DCI drop may be maintained as a reselected search space candidate. The reason for this is that when the search space candidate is not predetermined but is detected by the UE through BD, the search space candidate needs to be matched between a UE obtaining DCI at a location where the collision occurs and a UE already performing the DCI skipping.

[Method H.2-2]

When the multi-TB scheduling based on the DCI skipping scheme is applied, a search space candidate may be selected so that the same distance is always maintained between the starting point of a search space and the ending position of the search space candidate during a period in which the DCI skipping is maintained in order to provide scheduling information about a plurality of TBs, and at the same time, the same scheduling delay for TB transmission may be applied at all times. In this case, after acquiring DCI from a search space at a specific location, the UE may recognize the starting position of the TB transmission within the period to which the DCI skipping is applied based on the ending position of the available search space candidate and the scheduling delay value. The BS may select one of a plurality of search space candidates that satisfy the condition for the ending position of the search space candidate and transmit DCI based on the situation. The proposed method has advantages of ensuring the scheduling flexibility of the BS for selecting a search space candidate and maintaining the same TB transmission location in all search spaces.

Figure 31:
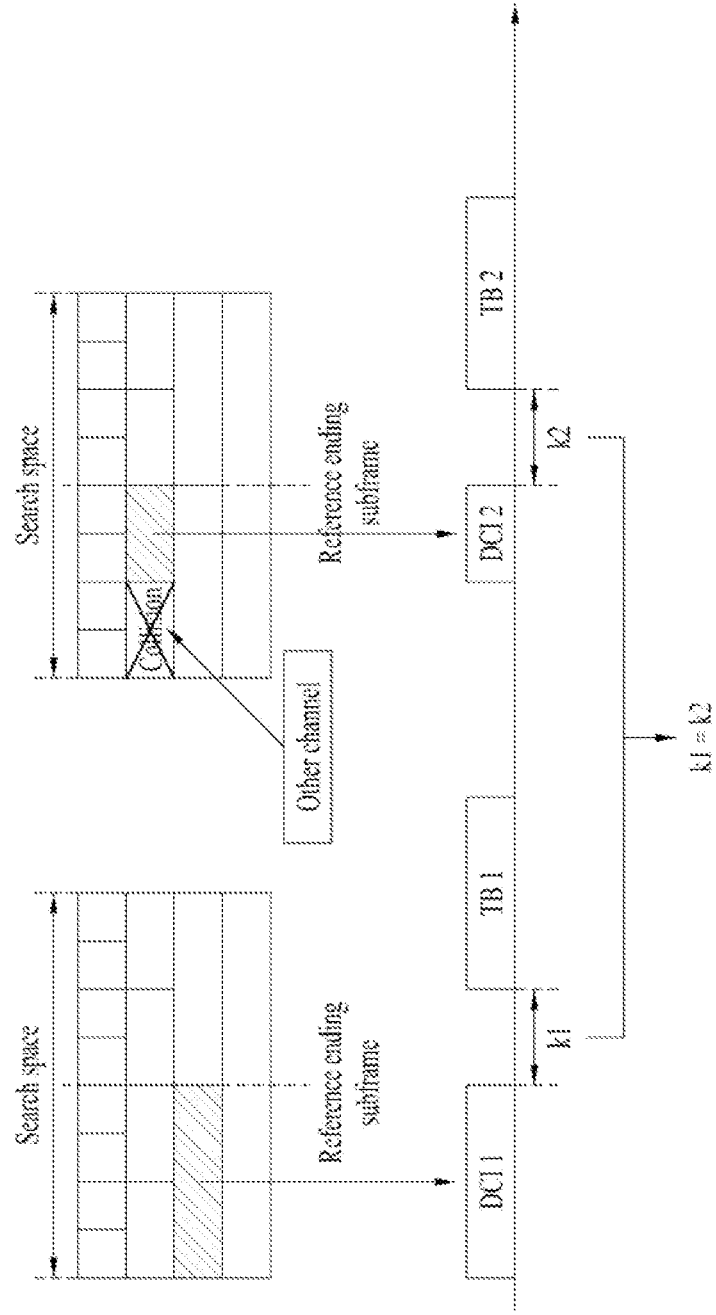

As an example of the proposed method, in NB-IoT, the ending position of a search space candidate may be determined as the ending subframe of the search space candidate. FIG. 31 schematically illustrates an example of the proposed method. Specifically, the example of FIG. 31 shows an operation satisfying the following condition that an available search space candidate ends in the reference ending subframe represented by the (red) dotted line.

In the proposed method, the ending position of the reference search space candidate is not predetermined but may be determined by the UE through BD. This method has an advantage in that if the used search space candidate is allowed to be changed, the BS may change the search space candidate depending on the situation without additional signaling overhead. Alternatively, the BS may determine the ending position of the reference search space candidate and signal the determined ending position during the configuration of the multi-TB scheduling. For example, when the multi-TB scheduling is used for transmission of an SC-MTCH, information about the ending subframe of a search space candidate of DCI for the SC-MTCH may be configured based on an SC-MCCH. This has advantages of not only reducing the power consumption of the UE due to the BD but also ensuring the flexibility of the BS. Alternatively, the used search space candidate may be defined in the specifications. For example, when the multi-TB scheduling is applied for transmission of the SC-MTCH, the ending subframe of a search space candidate of DCI for the SC-MTCH may always be fixed to the ending subframe of a search space. This method has advantages of reducing the signaling overhead of the BS and the power consumption of the UE due to the BD, instead of giving up the scheduling flexibility for selecting a search space candidate.

In the proposed method, the used scheduling delay value may be obtained by the UE through DCI decoding. When the BS is capable of adjusting the transmission location of the TB, the scheduling flexibility may be improved if the above operation is allowed. Alternatively, the used scheduling delay value may be designated by the BS and signaled during the configuration of the multi-TB scheduling. For example, when the multi-TB scheduling is used for transmission of an SC-MTCH, information about a scheduling delay for the SC-MTCH may be configured based on an SC-MCCH. In this case, the UE may use a predetermined scheduling delay value as side information during the DCI decoding, thereby improving the decoding performance. Alternatively, the used scheduling delay value may be defined in the specifications. This method has advantages of reducing the signaling overhead of the BS and improving the decoding performance of the UE, instead of giving up the scheduling flexibility capable of adjusting a scheduling delay.

When [Method H.2-2] proposed above is used, there may be a time point at which no search space candidates satisfy the ending position condition due to transmission/reception of a signal/channel having a higher priority. In this case, the BS and UE may solve the problem based on the principles of other methods proposed in the present disclosure. For example, the problem may be solved by replacing the condition of "search space" with "search space candidates that satisfy the ending position condition" in the methods proposed in [Method H.1-1] or [Method H.1-2] or by adding the condition of "ending position" to the condition of "search space candidates" in [Method H.2-1].

[Method H.2-2] proposed in the present disclosure and additional details thereof may be applied to reduce the power consumption of the UE due to the BD when the UE needs to monitor a plurality of search space candidates. For example, when the UE is capable of recognizing by [Method H.2-2] that a specific search space candidate (or search space candidate group) is to be used among a plurality of search space candidates to be monitored, the UE may monitor only target search space candidates, thereby avoiding unnecessary BD. Such an application scheme may be applied to both the multi-TB scheduling and the single-TB scheduling.

[Method H.2-3]

When the multi-TB scheduling based on the DCI skipping scheme is applied, if the relative position between a search space and a TB is maintained to be the same during a period in which the DCI skipping is maintained in order to provide scheduling information about a plurality of TBs, the BS may select a search space candidate and a scheduling delay. In this case, after acquiring DCI from a search space at a specific location, the UE may assume that the relative position of TB transmission to the search space is fixed within the period in which the DCI skipping is applied. That is, the BS may transmit the DCI by determining the search space candidate and scheduling delay value so that the relative position of the TB to the search space is always fixed. The proposed method has an advantage of ensuring the scheduling flexibility so that the BS is capable of selecting the search space candidate depending on the situation, instead of always fixing the transmission location of the TB.

In the proposed method, the relative position between the search space and TB may be obtained by the UE through DCI decoding. When the BS is capable of adjusting the transmission location of the TB, the scheduling flexibility may be improved if the above operation is allowed. Alternatively, the relative position between the search space and TB may be designated by the BS and signaled during the configuration of the multi-TB scheduling. For example, when the multi-TB scheduling is used for transmission of an SC-MTCH, information about the relative position between a search space and a TB of DCI for the SC-MTCH may be configured based on an SC-MCCH. In this case, the UE may use the relative position between the search space and TB as side information during the DCI decoding, thereby improving the decoding performance. Alternatively, the used relative position between the search space and TB may be defined in the specifications. For example, when the multi-TB scheduling is used for transmission of an SC-MTCH, the transmission location of a TB for the SC-MTCH may be fixed and determined such that the transmission location appears after a predetermined number of subframes from the ending subframe of a DCI search space for the SC-MTCH. This method has advantages of reducing the signaling overhead of the BS and improving the decoding performance of the UE, instead of giving up the scheduling flexibility capable of adjusting a scheduling delay.

Figure 32:
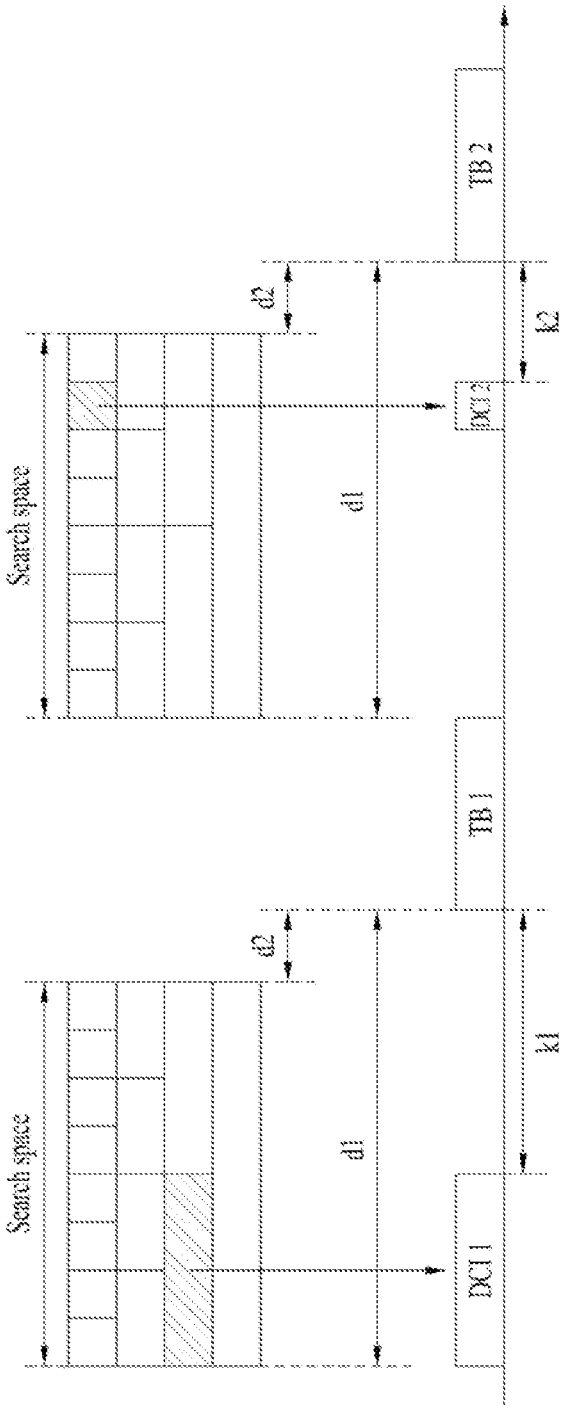

FIG. 32 schematically illustrates an example of the proposed method. Specifically, the example of FIG. 32 shows that the transmission location of a TB is always determined as a position (e.g., d1) relative to the starting subframe of a search space or as a position (e.g., d2) relative to the ending subframe thereof, regardless of search space candidates used for DCI transmission. For example, referring to FIG. 32, the relative position (e.g., d1 or d2) between the search space and TB (e.g., TB1 or TB2) for the multi-TB scheduling may be configured to be fixed. As described above, the fixed relative position may be the relative position (e.g., d1) between the starting position (e.g., starting subframe) of the search space for the multi-TB scheduling and the starting position (e.g., starting subframe) of the TB (e.g., TB1 or TB2), or the relative position (e.g., d2) between the ending position (e.g., ending subframe) of the search space for the multi-TB scheduling and the starting position (e.g., starting subframe) of the TB (e.g., TB1 or TB2). The BS may select a search space candidate and a scheduling delay so that the relative position between the search space for the multi-TB scheduling and the TB are the same, and then transmit DCI indicating the selected scheduling delay to the UE in the selected search space candidate. The UE may determine the location of the TB based on the search space candidate in which the DCI is received and the scheduling delay determined based on the DCI.

[Method H.2-4]

When multiple TBs are capable of being scheduled by one DCI as in the multi-TB scheduling based on the one-to-N mapping structure, the location of a search space for monitoring multi-TB scheduling DCI may be determined relative to the location of a search space of another DCI. Specifically, the other DCI may be single-TB scheduling DCI capable of scheduling the same TB as the multi-TB scheduling DCI. For example, when DCI for supporting new multi-TB scheduling UEs is introduced in a network where UEs capable of monitoring only single-TB scheduling DCI exist, if the two types of UEs expect the same data, the BS may configure different DCIs to schedule the same TB to avoid an increase in overhead due to TB transmission. To support such a scheduling scheme, the method proposed in the present disclosure may be used to efficiently arrange a search space in which the newly added multi-TB scheduling DCI is transmitted.

As a particular method for supporting [Method H.2-4], the location of the search space for transmitting the multi-TB scheduling DCI may be determined relative to the location of a search space for another purpose (e.g., a search space for transmitting the single-TB scheduling DCI). For example, the ending subframe of the search space for transmitting the multi-TB scheduling DCI may be determined relative to the location of the starting subframe of the search space for the other purpose. In this case, the relative location may be determined such that the two search spaces are in contact with each other or separated by a predetermined gap.

When the location of the search space in which the multi-TB scheduling DCI is monitored is determined according to [Method H.2-4], the BS may transmit information about an interval between the ending subframe (or starting subframe) of the search space for the multi-TB scheduling DCI and the starting subframe of the search space for the single-TB scheduling DCI through higher layer signaling. If the two search spaces are contiguous with each other or if the size of the interval is defined in the specifications, the higher layer signaling may not be used.

Figure 33:
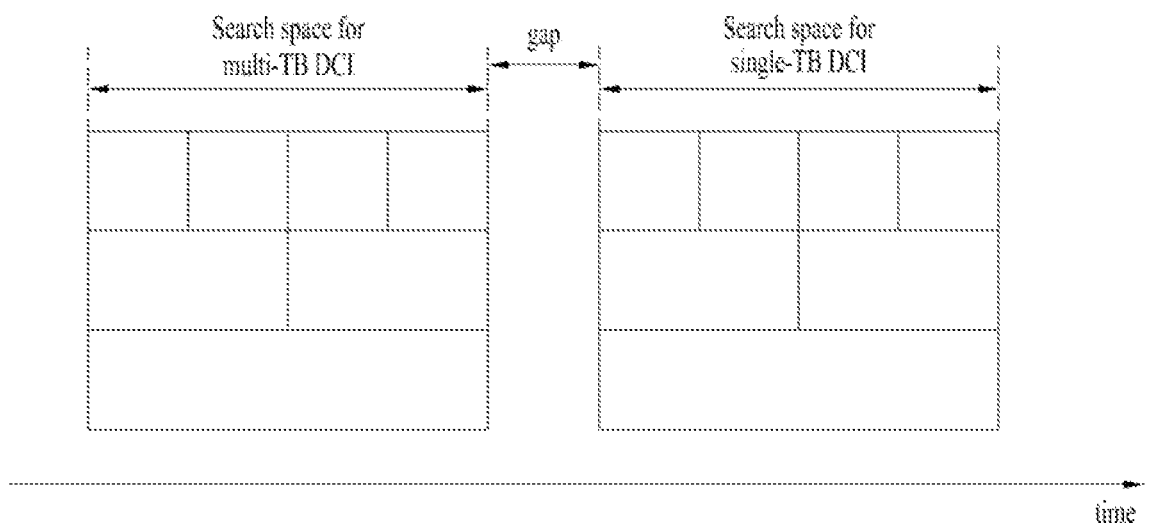

FIG. 33 schematically illustrates an example of the proposed method. Specifically, the example of FIG. 33 shows that the location of a search space for multi-TB scheduling DCI is determined as relative to the location of a search space for single-TB scheduling. In the example of FIG. 33, if the two search spaces are configured to be contiguous, the size of a gap has a value of 0. For example, in FIG. 33, it is assumed that the search space for the multi-TB scheduling and the search space for the single-TB scheduling are configured for the same TB. If [Method H.2-4] is applied to the example of FIG. 32, the location (e.g., the starting position or the ending position) of the search space for the multi-TB scheduling may be determined based on the location (e.g., starting position) of another search space (e.g., search space for the single-TB scheduling) related to a TB. More specifically, according to [Method H.2-4], a gap may be configured between the ending position (e.g., ending subframe) of the search space for the multi-TB scheduling and the starting position (e.g., starting subframe) of the search space for the single-TB scheduling. Alternatively, the ending position (e.g., ending subframe) of the search space for the multi-TB scheduling may be configured to be contiguous with the starting position (e.g., starting subframe) of the search space for the single-TB scheduling (i.e., the size of the gap is 0).

[Method H.2-5]

As described in section H.2.4, when the location of a search space for multi-TB scheduling DCI is determined relative to the location of a search space for single-TB scheduling DCI, a scheduling delay value for determining the starting position of TB transmission scheduled by the multi-TB scheduling DCI may be different from a scheduling delay value of DCI scheduling the single-TB scheduling DCI. In consideration of the above structure, the present disclosure proposes that the starting position of the TB transmission scheduled by the multi-TB scheduling DCI is determined by combining a scheduling delay indicated by DCI with Rmax. In this case, the scheduling delay indicated by the DCI may be a value indicated by the multi-TB scheduling DCI, and more particularly, the scheduling delay may be set to the number of subframes or an absolute time (in the unit of millisecond (ms)). The value of Rmax is the maximum number of times that one DCI is capable of being repeated and transmitted, and it may be the same as the length of a search space (or the maximum length of a search space candidate). As a particular example of the proposed method, after obtaining the multi-TB scheduling DCI, the UE may be configured to determine the transmission time of the TB by adding the length (e.g., Rmax) of the search space for the single-TB scheduling and the size of the gap (if the two search spaces are contiguous, the gap is not added) to the scheduling delay value included in the obtained DCI. If the search space for the single-TB scheduling and the search space for the multi-TB scheduling are assumed to have the same target coverage, the value of Rmax of the search space in which the multi-TB scheduling DCI is transmitted may be used as the Rmax value.

As another example of [Method H.2-5], during a period in which the UE expects a scheduled TB, the UE may determine the transmission time of the scheduled TB based on another search space in which the same TB is scheduled. For example, when DCI available for only single-TB scheduling and DCI available for multi-TB scheduling are capable of scheduling the same TB, the transmission time of a TB indicated by the multi-TB scheduling DCI may be determined based on a search space (or search space candidate) in which the single-TB scheduling DCI is transmitted. The reason for this is to share TB transmission in the following cases: when new multi-TB scheduling capable UEs are added to a network using the conventional single-TB scheduling scheme; and when there are common data to be transmitted (e.g., multicast information such as an SC-PTM). In particular, the transmission time of the TB indicated by the multi-TB scheduling DCI may be determined based on a search space for another purpose (or search space candidates belonging to the search space for the other purpose).

Regarding the transmission times of subsequent TBs, it may be assumed that the TBs are periodically transmitted with respect to the location of the first scheduled TB. Alternatively, the transmission times of the TBs may be determined based on search spaces (or search space candidates) for other purpose and the first scheduled scheduling delay value. Particularly, this method may be combined and used with other methods proposed in the present disclosure.

Figure 34:
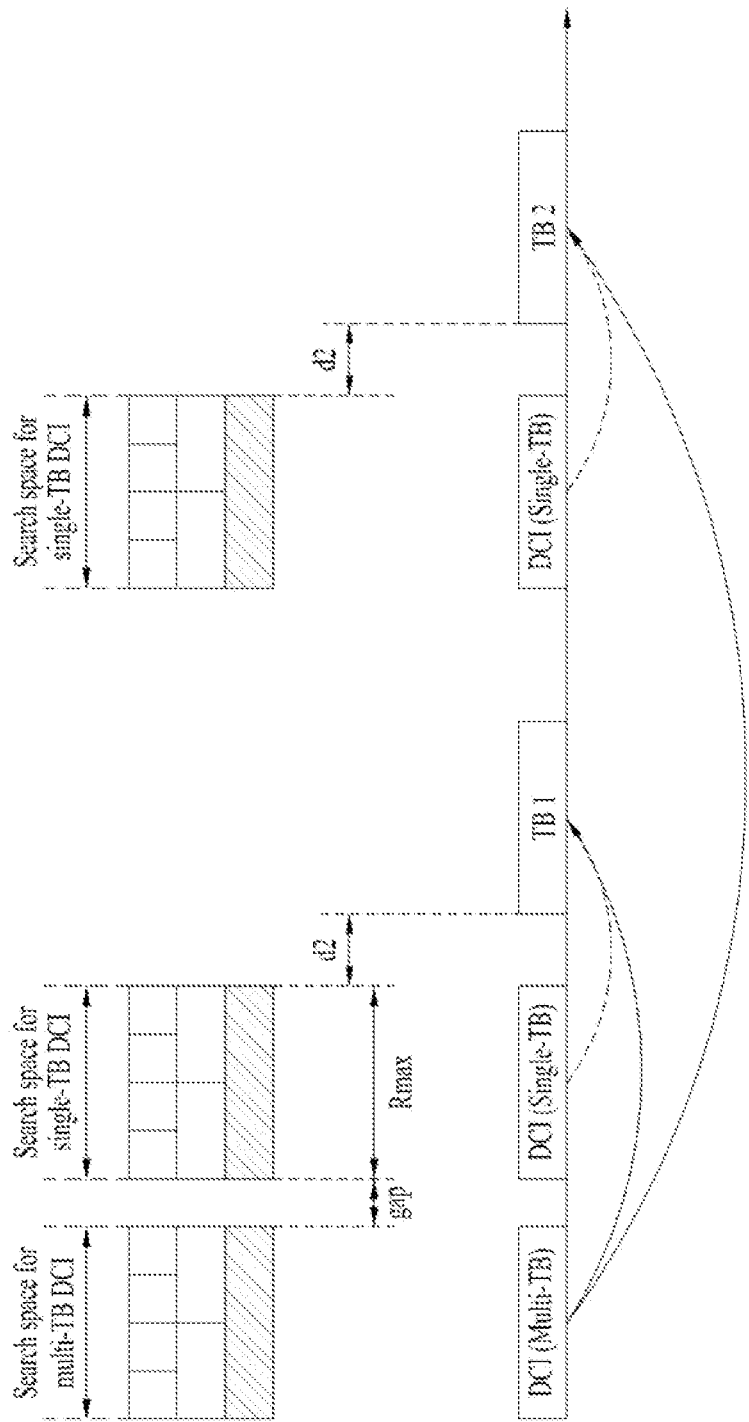

FIG. 34 schematically illustrates an example of the proposed method. Specifically, the example of FIG. 34 shows that the location of a search space for multi-TB scheduling DCI is determined relative to the location of a search space for single-TB scheduling. In addition, the example also shows that the transmission location of a TB scheduled by the multi-TB scheduling DCI is determined based on the search space for the single-TB scheduling. For example, referring to FIG. 34, the location of the search space for the multi-TB scheduling may be determined based on the location of another search space (e.g., search space for the single-TB scheduling) related to the TB according to [Method H.2-4]. When [Method H.2-5] is applied to this example, the starting position of the TB may be determined based on a scheduling delay indicated by DCI (not shown) and Rmax. In this case, the value of Rmax may denote the maximum number of times that one DCI is repeated (i.e., the maximum number of DCI repetitions in a search space or the length of the search space). More specifically, the Rmax value may indicate the length of the search space for the multi-TB scheduling or the maximum number of DCI repetitions in the search space for the multi-TB scheduling as described above. Alternatively, the Rmax value may indicate the length of the search space for the single-TB scheduling or the maximum number of DCI repetitions in the search space for the single-TB scheduling. For example, as illustrated in FIG. 34, the starting position of a TB (e.g., TB 1) may be determined by adding the Rmax value to the scheduling delay (not shown) indicated by the DCI for the multi-TB scheduling or by adding the Rmax value and the gap size to the scheduling delay (not shown) indicated by the DCI for the multi-TB scheduling.

[Method H.2-6]

When the location of a search space for multi-TB scheduling DCI is determined relative to the location of a search space for single-TB scheduling DCI as described in [Method H.2-4] and when the transmission location of a TB is determined based on a search space (or search space candidate) for the single-TB scheduling DCI as described in [Method H.2-5], one of the methods proposed in [Method H.2-1], [Method H.2-2], or [Method H.2-3] may be used to determine the transmission location of the TB. Specifically, after obtaining the multi-TB scheduling DCI, the UE may estimate the transmission location of the TB based on the search space (or search space candidate) for monitoring the single-TB scheduling DCI that schedules the same TB by applying one of the methods proposed in [Method H.2-1], [Method H.2-2], or [Method H.2-3].

If [Method H.2-1] is used, the BS may select a search space candidate for transmitting the single-TB scheduling DCI, and the UE may anticipate the search space candidate after obtaining the multi-TB scheduling DCI, thereby increasing the scheduling flexibility.

If [Method H.2-2] is used, the BS may select a search space candidate for transmitting the single-TB scheduling DCI under the condition that the ending subframe is the same. In addition, after obtaining the multi-TB scheduling DCI, the UE may determine the transmission time of the TB based on the same search space candidate at all time regardless thereof.

If [Method H.2-3] is used, the BS may freely select a search space candidate for transmitting the single-TB scheduling DCI under the condition that the determined TB transmission location is capable of being represented by a scheduling delay. After obtaining the multi-TB scheduling DCI, the UE may determine the same transmission time at all times regardless thereof.

I. Communication System and Apparatus to which Proposed Methods of the Present Disclosure are Applied The various details, functions, procedures, proposals, methods, and/or operational flowcharts related to the methods described above in this document may be applied to, without being limited to, a variety of fields that require wireless communication/connection (e.g., 5G) between devices.

Hereinafter, a description will be given in detail with reference to the drawings. In the following drawings/descriptions, the same reference numerals may denote the same or corresponding hardware blocks, software blocks, or functional blocks unless described otherwise.

Figure 35:
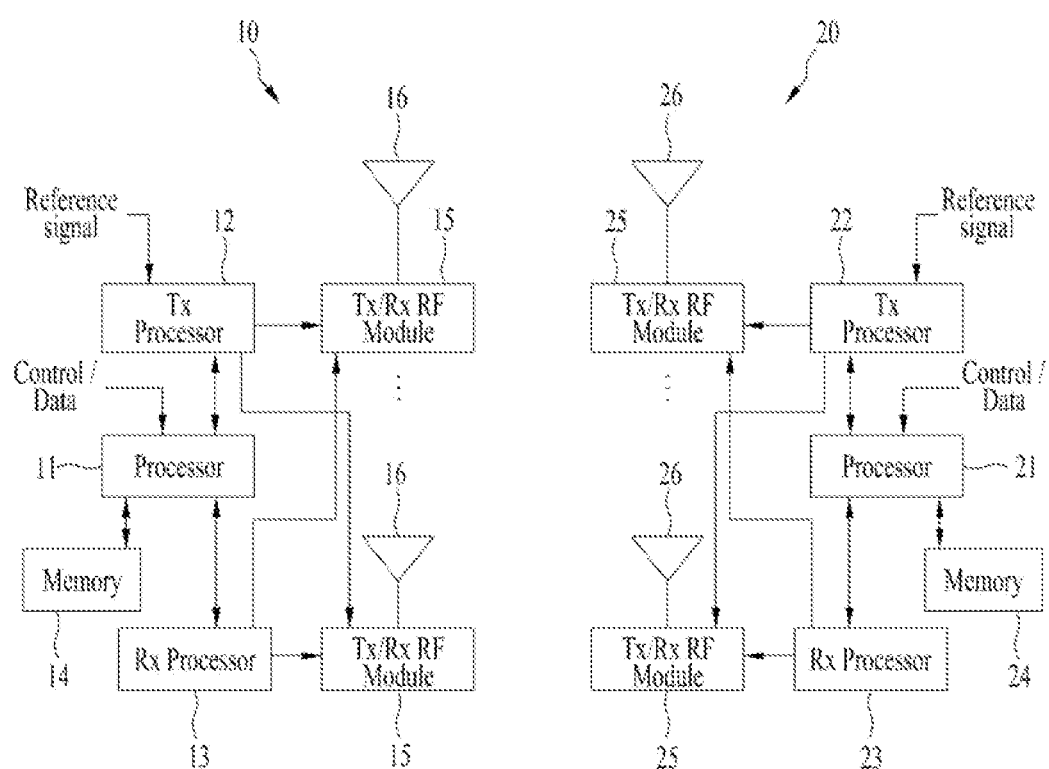
FIGS. 35 to 40 illustrate systems and communication apparatuses to which the methods proposed in the present disclosure are applicable.

FIG. 35 is a block diagram illustrating wireless communication apparatuses to which the methods proposed in the present disclosure are applicable.

Referring to FIG. 35, a wireless communication system includes a BS 10 and multiple UEs 20 located within the coverage of the BS 10. The BS 10 and the UE 20 may be referred to as a transmitter and a receiver, respectively, and vice versa. The BS 10 includes a processor 11, a memory 14, at least one transmission/reception (Tx/Rx) radio frequency (RF) module (or at least one RF transceiver) 15, a Tx processor 12, an Rx processor 13, and an antenna 16. The UE 20 includes a processor 21, a memory 24, at least one Tx/Rx RF module (or at least one RF transceiver) 25, a Tx processor 22, an Rx processor 23, and an antenna 26. The processors are configured to implement the above-described functions, processes and/or methods. Specifically, for DL transmission (communication from the BS to the UE), higher layer packets from a core network are provided by the processor 11. The processor implements the functionality of layer 2 (L2). For DL transmission, the processor provides the UE 20 with multiplexing between logical and transmission channels and radio resource allocation. That is, the processor is in charge of signaling to the UE. The Tx processor 12 implements various signal processing functions of layer 1 (L1) (i.e., physical layers). The signal processing functions facilitate forward error correction (FEC) at the UE, and includes coding and interleaving. Coded and modulated symbols may be divided into parallel streams. Each stream may be mapped to an OFDM subcarrier, multiplexed with an RS in the time and/or frequency domain, and then combined together by an inverse fast Fourier transform (IFFT) to create a physical channel carrying a time-domain OFDMA symbol stream. The OFDM stream is spatially precoded to produce multiple spatial streams. Each spatial stream may be provided to a different antenna 16 through each Tx/Rx module (or transceiver) 15. Each Tx/Rx module may modulate each spatial stream into an RF carrier for transmission. From the perspective of the UE, each Tx/Rx module (or transceiver) 25 receives a signal through each antenna 26 thereof. Each Tx/Rx module recovers information, which is modulated into an RF carrier, and provides the information to the RX processor 23. The Rx processor implements various signal processing functions of layer 1. The Rx processor may perform spatial processing on the information to recover any spatial stream toward the UE. If multiple spatial streams are toward the UE, the multiple spatial streams may be combined by multiple Rx processors into a single OFDMA symbol stream. The Rx processor converts the OFDMA symbol stream from the time domain to the frequency domain through a fast Fourier transform (FFT). A frequency-domain signal includes a different OFDMA symbol stream for each subcarrier of an OFDM signal. The symbols and RS on each subcarrier are recovered and demodulated by determining the most probable signal constellation points transmitted by the BS. Such soft decisions may be based on channel estimation values. The soft decisions are decoded and deinterleaved to recover data and control signals originally transmitted by the BS over the physical channel. The corresponding data and control signals are provided to the processor 21.

UL transmission (communication from the UE to the BS) is processed by the BS 10 in a similar way to that described in regard to the receiver functions of the UE 20. Each Tx/Rx module (or transceiver) 25 receives a signal through each antenna 26. Each Tx/Rx module provides an RF carrier and information to the Rx processor 23. The processor 21 may be connected to the memory 24 configured to store program code and data. The memory may be referred to as a computer-readable medium.

The above described proposed methods may be performed by the BS 10 and UE 20, wireless communication apparatuses described with reference to FIG. 35.

Figure 36:
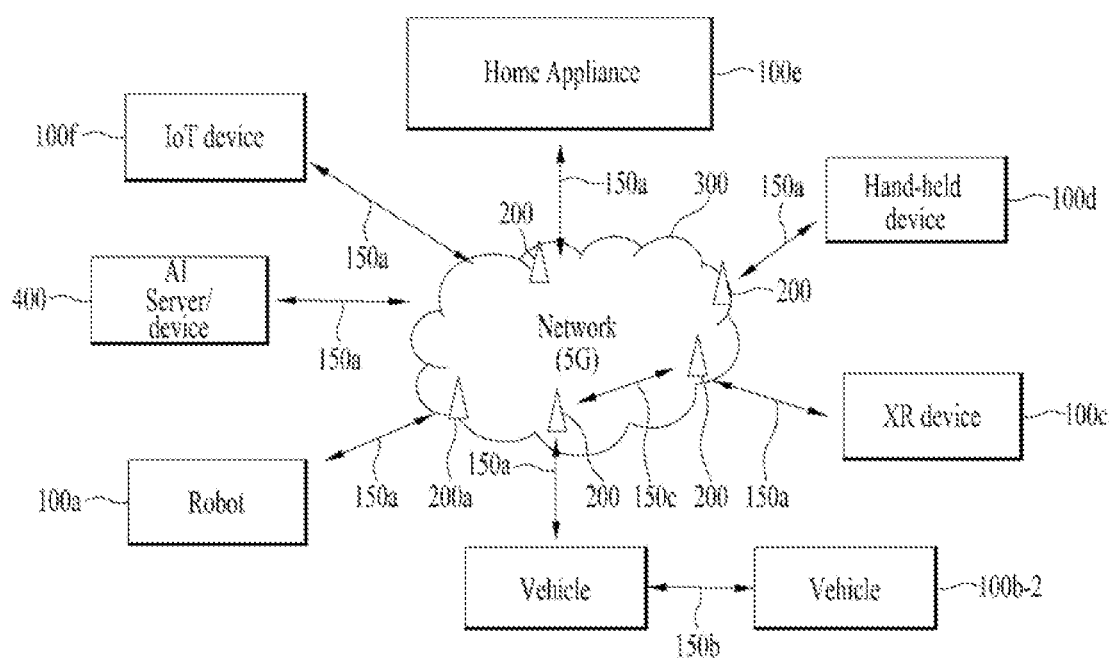

FIG. 36 illustrates a communication system 1 applied to the present disclosure.

Referring to FIG. 36, the communication system 1 applied to the present disclosure includes wireless devices, BSs, and a network. The wireless devices refer to devices performing communication by radio access technology (RAT) (e.g., 5G New RAT (NR) or LTE), which may also be called communication/radio/5G devices. The wireless devices may include, but no limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle equipped with a wireless communication function, an autonomous driving vehicle, and a vehicle capable of performing vehicle-to-vehicle (V2V) communication. The vehicles may include an unmanned aerial vehicle (UAV) (e.g., a drone). The XR device may include an augmented reality (AR)/virtual reality (VR)/mixed reality (MR) device, and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smart glasses), and a computer (e.g., a laptop). The home appliance may include a TV, a refrigerator, and a washing machine. The IoT device may include a sensor and a smart meter. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured by using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f and the BSs 200, or between the BSs 200. Herein, the wireless communication/connections may be established through various RATs (e.g., 5G NR) such as UL/DL communication 150a, sidelink communication 150b (or, D2D communication), or inter-BS communication 150c (e.g. relay, integrated access backhaul (IAB)). A wireless device and a BS/a wireless devices, and BSs may transmit/receive radio signals to/from each other through the wireless communication/connections 150a, 150b, and 150c. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 37:
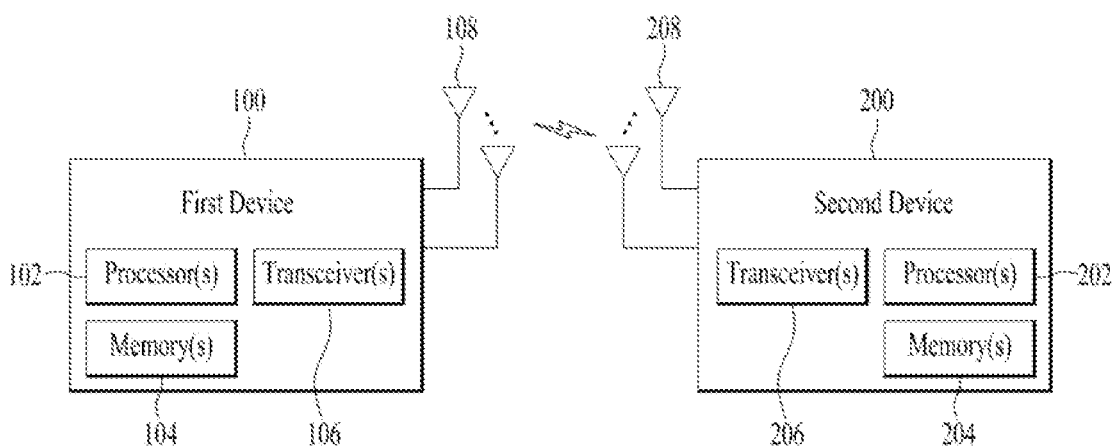

FIG. 37 illustrates wireless devices applicable to the present disclosure.

Referring to FIG. 37, a first wireless device 100 and a second wireless device 200 may transmit radio signals through a variety of RATs (e.g., LTE and NR). Herein, {the first wireless device 100 and the second wireless device 200} may correspond to {the wireless devices 100a to 100f and the BSs 200} and/or {the wireless devices 100a to 100f and the wireless devices 100a to 100f} of FIG. 36.

The first wireless device 100 may include at least one processor 102 and at least one memory 104, and may further include at least one transceiver 106 and/or at least one antenna 108. The processor 102 may control the memory 104 and/or the transceiver 106 and may be configured to implement the descriptions, functions, procedures, proposals, methods, and/or operational flowcharts disclosed in this document. For example, the processor 102 may process information within the memory 104 to generate first information/signal and then transmit a radio signal including the first information/signal through the transceiver 106. The processor 102 may receive a radio signal including second information/signal through the transceiver 106 and then store information obtained by processing the second information/signal in the memory 104. The memory 104 may be coupled to the processor 102 and store various types of information related to operations of the processor 102. For example, the memory 104 may store software code including commands for performing a part or all of processes controlled by the processor 102 or for performing the descriptions, functions, procedures, proposals, methods, and/or operational flowcharts disclosed in this document. Herein, the processor 102 and the memory 104 may be a part of a communication modem/circuit/chip designed to implement an RAT (e.g., LTE or NR). The transceiver 106 may be coupled to the processor 102 and transmit and/or receive radio signals through the at least one antenna 108. The transceiver 106 may include a transmitter and/or a receiver. The transceiver 106 may be interchangeably used with an RF unit. In the present disclosure, a wireless device may refer to a communication modem/circuit/chip.

The second wireless device 200 may include at least one processor 202 and at least one memory 204, and may further include at least one transceiver 206 and/or at least one antenna 208. The processor 202 may control the memory 204 and/or the transceiver 206 and may be configured to implement the descriptions, functions, procedures, proposals, methods, and/or operational flowcharts disclosed in this document. For example, the processor 202 may process information within the memory 204 to generate third information/signal and then transmit a radio signal including the third information/signal through the transceiver 206. The processor 202 may receive a radio signal including fourth information/signal through the transceiver 206 and then store information obtained by processing the fourth information/signal in the memory 204. The memory 204 may be coupled to the processor 202 and store various types of information related to operations of the processor 202. For example, the memory 204 may store software code including commands for performing a part or all of processes controlled by the processor 202 or for performing the descriptions, functions, procedures, proposals, methods, and/or operational flowcharts disclosed in this document. Herein, the processor 202 and the memory 204 may be a part of a communication modem/circuit/chip designed to implement an RAT (e.g., LTE or NR). The transceiver 206 may be coupled to the processor 202 and transmit and/or receive radio signals through the at least one antenna 208. The transceiver 206 may include a transmitter and/or a receiver. The transceiver 206 may be interchangeably used with an RF unit. In the present disclosure, a wireless device may refer to a communication modem/circuit/chip.

Hereinafter, hardware elements of the wireless devices 100 and 200 will be described in greater detail. One or more protocol layers may be implemented by, but not limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more protocol data units (PDUs) and/or one or more service data units (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented in hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented in firmware or software, which may be configured to include modules, procedures, or functions. Firmware or software configured to perform the descriptions, functions, procedures, proposals, methods, and/or operational flowcharts disclosed in this document may be included in the one or more processors 102 and 202, or may be stored in the one or more memories 104 and 204 and executed by the one or more processors 102 and 202. The descriptions, functions, procedures, proposals, methods, and/or operational flowcharts disclosed in this document may be implemented as code, instructions, and/or a set of instructions in firmware or software.

The one or more memories 104 and 204 may be coupled to the one or more processors 102 and 202 and store various types of data, signals, messages, information, programs, code, instructions, and/or commands. The one or more memories 104 and 204 may be configured as read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be coupled to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be coupled to the one or more processors 102 and 202 and transmit and receive radio signals. For example, the one or more processors 102 and 202 may control the one or more transceivers 106 and 206 to transmit user data, control information, or radio signals to one or more other devices. The one or more processors 102 and 202 may control the one or more transceivers 106 and 206 to receive user data, control information, or radio signals from one or more other devices. The one or more transceivers 106 and 206 may be coupled to the one or more antennas 108 and 208 and configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 38:
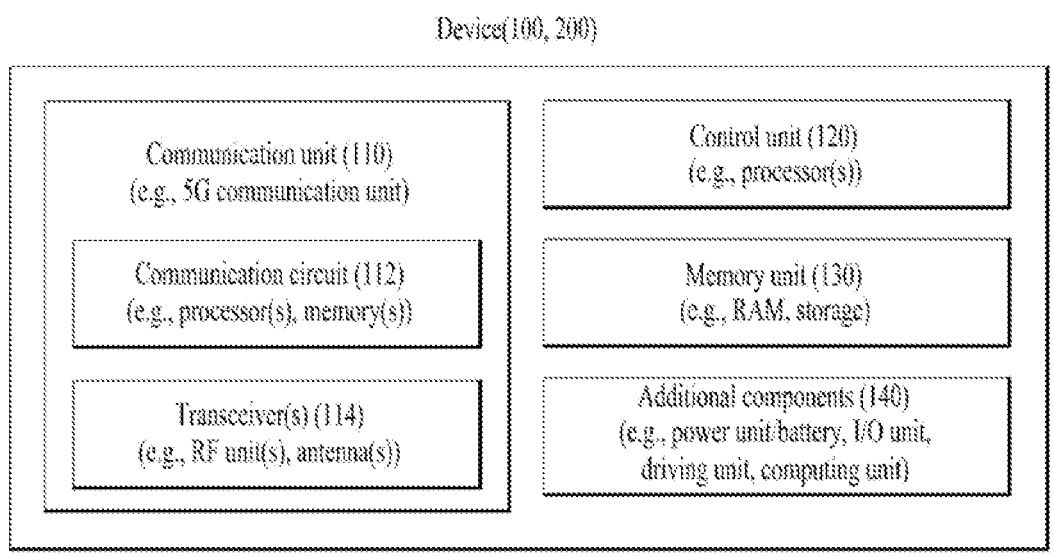

FIG. 38 illustrates another example of wireless devices applied to the present disclosure. The wireless devices may be implemented in various forms according to use-cases/services (refer to FIG. 36).

Referring to FIG. 38, wireless devices 100 and 200 may correspond to the wireless devices 100 and 200 of FIG. 37 and may be configured as various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114.

For example, the communication circuit 112 may include the one or more processors 102 and 202 and/or the one or more memories 104 and 204 of FIG. 37. For example, the transceiver(s) 114 may include the one or more transceivers 106 and 206 and/or the one or more antennas 108 and 208 of FIG. 37. The control unit 120 is electrically coupled to the communication unit 110, the memory unit 130, and the additional components 140 and provides overall control to operations of the wireless devices. For example, the control unit 120 may control an electric/mechanical operation of the wireless device based on programs/code/commands/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to the types of wireless devices. For example, the additional components 140 may include at least one of a power unit/battery, an input/output (I/O) unit, a driver, and a computing unit. The wireless device may be configured as, but not limited to, the robot (100a of FIG. 36), the vehicles (100b-1 and 100b-2 of FIG. 36), the XR device (100c of FIG. 36), the hand-held device (100d of FIG. 36), the home appliance (100e of FIG. 36), the IoT device (100f of FIG. 36), a digital broadcasting terminal, a hologram device, a public safety device, an MTC device, a medicine device, a FinTech device (or a finance device), a security device, a climate/environment device, the AI server/device (400 of FIG. 36), the BSs (200 of FIG. 36), a network node, etc. The wireless device may be mobile or fixed according to a use-case/service.

In FIG. 38, all of the various elements, components, units/portions, and/or modules in the wireless devices 100 and 200 may be coupled to each other through a wired interface or at least a part thereof may be wirelessly coupled to each other through the communication unit 110. For example, in each of the wireless devices 100 and 200, the control unit 120 and the communication unit 110 may be coupled by wire, and the control unit 120 and first units (e.g., 130 and 140) may be wirelessly coupled through the communication unit 110. Each element, component, unit/portion, and/or module within the wireless devices 100 and 200 may further include one or more elements. For example, the control unit 120 may be configured as a set of one or more processors. For example, the control unit 120 may be configured as a set of a communication control processor, an application processor, an electronic control unit (ECU), a graphical processing unit, and a memory control processor. In another example, the memory unit 130 may be configured as a random access memory (RAM), a dynamic RAM (DRAM), a read only memory (ROM), a flash memory, a volatile memory, a non-volatile memory, and/or a combination thereof.

An implementation example of FIG. 38 will be described in detail with reference to the drawings.

Figure 39:
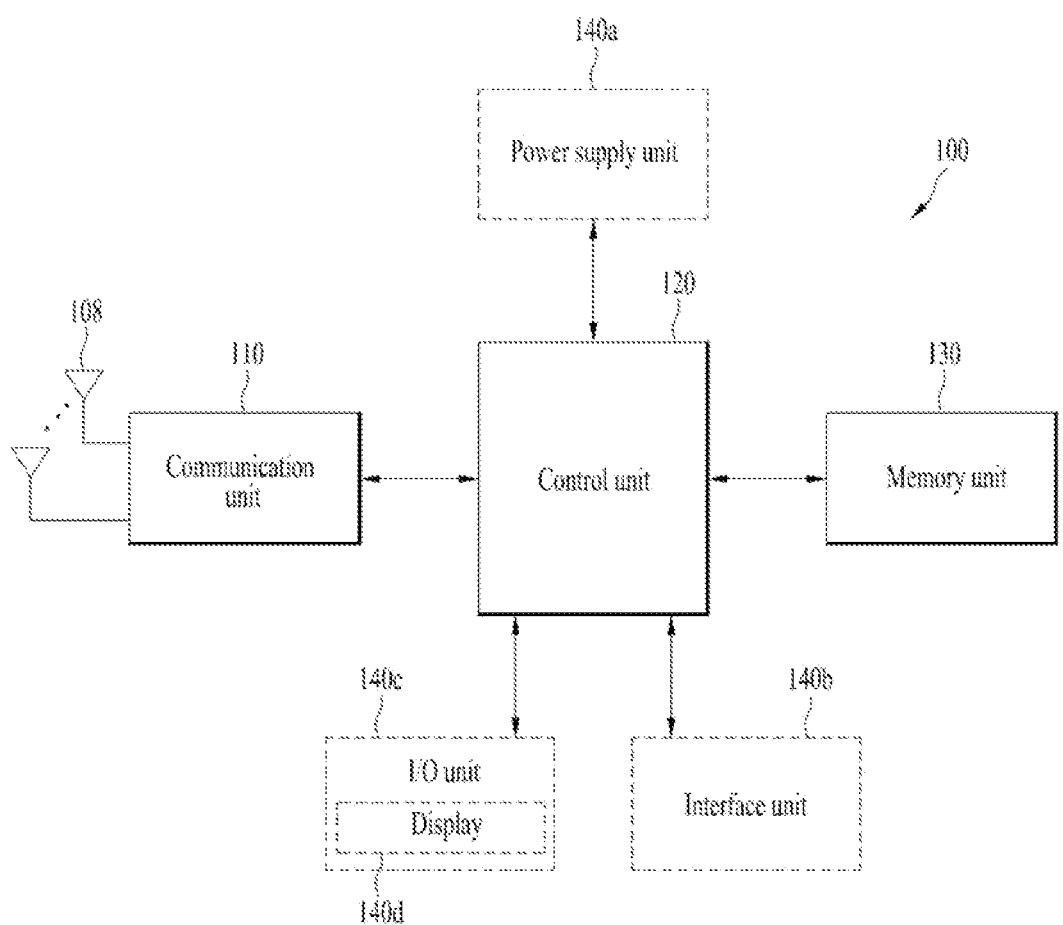

FIG. 39 illustrates a portable device applied to the present disclosure. The portable device may include a smartphone, a smartpad, a wearable device (e.g., a smart watch and smart glasses), and a portable computer (e.g., a laptop). The portable device may be referred to as a mobile station (MS), a user terminal (UT), a mobile subscriber station (MSS), a subscriber station (SS), an advanced mobile station (AMS), or a wireless terminal (WT).

Referring to FIG. 39, a portable device 100 may include an antenna unit 108, a communication unit 110, a control unit 120, a power supply unit 140a, an interface unit 140b, and an I/O unit 140c. The antenna unit 108 may be configured as a part of the communication unit 110. The blocks 110 to 130/140a to 140c correspond to the blocks 110 to 130/140 of FIG. 38, respectively.

The communication unit 110 may transmit and receive signals (e.g., data and control signals) to and from another wireless device and a BS. The control unit 120 may perform various operations by controlling elements of the portable device 100. The control unit 120 may include an application processor (AP). The memory unit 130 may store data/parameters/programs/code/commands required for operation of the portable device 100. Further, the memory unit 130 may store input/output data/information. The power supply unit 140a may supply power to the portable device 100, and include a wired/wireless charging circuit and a battery. The interface unit 140b may include various ports (e.g., an audio I/O port and a video I/O port) for connectivity to external devices The I/O unit 140c may acquire information/signals (e.g., touch, text, voice, images, and video) input by a user, and store the acquired information/signals in the memory unit 130. The communication unit 110 may receive or output video information/signal, audio information/signal, data, and/or information input by the user. The I/O unit 140c may include a camera, a microphone, a user input unit, a display 140d, a speaker, and/or a haptic module.

For example, for data communication, the I/O unit 140c may acquire information/signals (e.g., touch, text, voice, images, and video) received from the user and store the acquired information/signal sin the memory unit 130. The communication unit 110 may convert the information/signals to radio signals and transmit the radio signals directly to another device or to a BS. Further, the communication unit 110 may receive a radio signal from another device or a BS and then restore the received radio signal to original information/signal. The restored information/signal may be stored in the memory unit 130 and output in various forms (e.g., text, voice, an image, video, and a haptic effect) through the I/O unit 140c.

Figure 40:
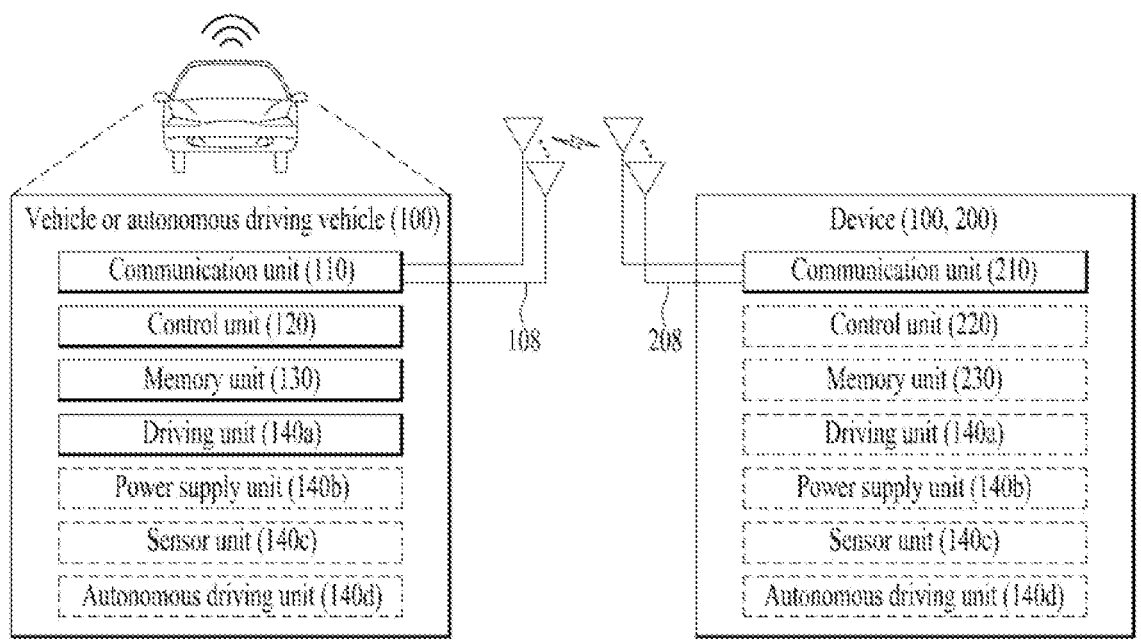

FIG. 40 illustrates a vehicle or an autonomous driving vehicle applied to the present disclosure. The vehicle or autonomous driving vehicle may be configured as a mobile robot, a car, a train, a manned/unmanned aerial vehicle (AV), a ship, or the like.

Referring to FIG. 40, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 38, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to travel on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire vehicle state information, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement a technology for maintaining a lane on which a vehicle is driving, a technology for automatically adjusting speed, such as adaptive cruise control, a technology for autonomously traveling along a determined path, a technology for traveling by automatically setting a path, when a destination is set, and the like.

For example, the communication unit 110 may receive map data, traffic information data, and so on from an external server. The autonomous driving unit 140d may generate an autonomous driving path and a driving plan from the obtained data. The control unit 120 may control the driving unit 140a such that the vehicle or autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain vehicle state information and/or ambient environment information. The autonomous driving unit 140d may update the autonomous driving path and the driving plan based on the newly obtained data/information. The communication unit 110 may transmit information about a vehicle position, the autonomous driving path, and/or the driving plan to the external server. The external server may predict traffic information data using AI technology or the like, based on the information collected from vehicles or autonomous driving vehicles and provide the predicted traffic information data to the vehicles or the autonomous driving vehicles.

The methods described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in the methods of the present disclosure may be rearranged. Some constructions of any one method may be included in another method and may be replaced with corresponding constructions of another method. It is obvious to those skilled in the art that claims that are not explicitly cited in each other in the appended claims may be presented in combination as an embodiment of the present disclosure or included as a new claim by a subsequent amendment after the application is filed.

Those skilled in the art will appreciate that the present disclosure may be embodied in other specific forms than those set forth herein without departing from the spirit and essential characteristics of the present disclosure. The above description is therefore to be construed in all aspects as illustrative and not restrictive. The scope of the present disclosure should be determined by reasonable interpretation of the appended claims and all changes coming within the equivalency range of the present disclosure are intended to be embraced in the scope of the present disclosure.

INDUSTRIAL APPLICABILITY

The present disclosure is applicable to wireless communication devices such as a User Equipment (UE) and a Base Station (BS) operating in various wireless communication systems including 3GPP LTE/LTE-A/5G (or New RAT (NR)).

The invention claimed is:

1. A method of receiving a downlink signal by a user equipment (UE) in a wireless communication system, the method comprising:
   receiving downlink control information (DCI) in a first search space for multi-transport block scheduling; and
   receiving a transport block based on the received DCI,
   wherein a location of the first search space for the multi-transport block scheduling is determined based on a location of a second search space for single-transport block scheduling, and
   wherein an ending position of the first search space for the multi-transport block scheduling is determined based on a gap from a starting position of the second search space for the single-transport block scheduling.

2. The method of claim 1, wherein a size of the gap is determined based on higher layer signaling.

3. The method of claim 1, wherein a relative position between the first search space for the multi-transport block scheduling and the transport block is configured to be fixed.

4. The method of claim 3, wherein information on the relative position between the first search space for the multi-transport block scheduling and the transport block is obtained from the DCI.

5. The method of claim 3, further comprising:
   receiving configuration information for the multi-transport block scheduling, and
   wherein the information on the relative position between the first search space for the multi-transport block scheduling and the transport block is obtained from the configuration information for the multi-transport block scheduling.

6. The method of claim 3, wherein the relative position between the first search space for the multi-transport block scheduling and the transport block has a predetermined value.

7. The method of claim 3, wherein the relative position between the first search space for the multi-transport block scheduling and the transport block represents a relative position between a starting position of the first search space and a starting position of the transport block.

8. The method of claim 3, wherein the relative position between the first search space for the multi-transport block scheduling and the transport block represents a relative position between an ending position of the first search space and a starting position of the transport block.

9. A user equipment (UE) configured to receive a signal in a wireless communication system, the UE comprising:
   a radio frequency (RF) transceiver; and
   a processor operatively connected to the RF transceiver,
   wherein the processor is configured to control the RF transceiver to:
   receive downlink control information (DCI) in a first search space for multi-transport block scheduling; and
   receive a transport block based on the received DCI,
   wherein a location of the first search space for the multi-transport block scheduling is determined based on a location of a second search space for single-transport block scheduling, and wherein an ending position of the first search space for the multi-transport block scheduling is determined based on a gap from a starting position of the second search space for the single-transport block scheduling.

* * * * *